(12) United States Patent
Zenoff

(10) Patent No.: US 10,649,500 B2
(45) Date of Patent: May 12, 2020

(54) CENTRALIZED CONTENT DISTRIBUTION IN A WEARABLE DISPLAY DEVICE NETWORK

(71) Applicant: Beam Authentic, Inc., San Anselmo, CA (US)

(72) Inventor: Andrew R. Zenoff, San Anselmo, CA (US)

(73) Assignee: Beam Authentic, Inc., San Anselmo, CA (US)

( * ) Notice: Subject to any disclaimer, the term of this patent is extended or adjusted under 35 U.S.C. 154(b) by 0 days.

(21) Appl. No.: 16/257,486

(22) Filed: Jan. 25, 2019

(65) Prior Publication Data

US 2019/0235581 A1 Aug. 1, 2019

Related U.S. Application Data

(60) Continuation-in-part of application No. 15/897,160, filed on Feb. 15, 2018, now Pat. No. 10,606,543, which is a continuation-in-part of application No. 14/811,733, filed on Jul. 28, 2015, now Pat. No. 10,416,947, and a continuation of application No. 14/827,101, filed on Aug. 14, 2015, now abandoned, and a continuation-in-part of application No. 14/805,386, filed on Jul. 21, 2015, now abandoned, and a continuation-in-part of application No. 14/805,436, filed on Jul. 21, 2015, now abandoned.

(Continued)

(51) Int. Cl.
| | |
|---|---|
| *G06F 1/16* | (2006.01) |
| *G06F 3/041* | (2006.01) |
| *G06F 3/0484* | (2013.01) |
| *G06F 3/0488* | (2013.01) |

(52) U.S. Cl.
CPC ............ *G06F 1/1671* (2013.01); *G06F 1/163* (2013.01); *G06F 3/0412* (2013.01); *G06F 3/0416* (2013.01); *G06F 3/0488* (2013.01); *G06F 3/04845* (2013.01)

(58) Field of Classification Search
CPC ...... G06F 1/163; G06F 1/1671; G06F 3/0412; G06F 3/0416; G06F 3/04845; G06F 3/0488; G06Q 30/02; G06Q 30/0241
See application file for complete search history.

(56) References Cited

U.S. PATENT DOCUMENTS

| | | | |
|---|---|---|---|
| 9,183,612 B2 * | 11/2015 | Rabii | ........................ G06T 1/20 |
| 2015/0193102 A1 * | 7/2015 | Lanier | ..................... G06F 3/017 |
| | | | 715/746 |

* cited by examiner

*Primary Examiner* — Stacy Khoo
(74) *Attorney, Agent, or Firm* — Snell & Wilmer L.L.P.

(57) ABSTRACT

Wearable digital buttons can be deployed within an enterprise context, allowing for the centralized distribution of viewable media content (such as images and videos) selected for each of one or more enterprise groups. For instance, a first set of media objects can be selected for a sales team within a company, a second set of media objects can be selected for a marketing team, and a third set can be selected for a tech support team. The media can be distributed by a central server, for instance wirelessly or via a USB-connected hub. The central server can include an interface enabling a user to select the media for distribution to each enterprise group, to edit or format the media, to view the locations of each wearable digital button within the enterprise, and to customize enterprise groups (for instance, by creating new groups and adding or removing users from existing groups).

20 Claims, 47 Drawing Sheets

Related U.S. Application Data and a continuation-in-part of application No. 15/410,492, filed on Jan. 19, 2017, now Pat. No. 10,452,105, and a continuation-in-part of application No. 16/175,805, filed on Oct. 30, 2018, which is a division of application No. 14/827,127, filed on Aug. 14, 2015, now abandoned.

(60) Provisional application No. 62/622,710, filed on Jan. 26, 2018, provisional application No. 62/038,047, filed on Aug. 15, 2014, provisional application No. 62/280,429, filed on Jan. 19, 2016, provisional application No. 62/027,059, filed on Jul. 21, 2014, provisional application No. 62/029,913, filed on Jul. 28, 2014, provisional application No. 62/032,306, filed on Aug. 1, 2014, provisional application No. 62/079,483, filed on Nov. 13, 2014, provisional application No. 62/037,994, filed on Aug. 15, 2014, provisional application No. 62/038,002, filed on Aug. 15, 2014, provisional application No. 62/038,034, filed on Aug. 15, 2014, provisional application No. 62/037,974, filed on Aug. 15, 2014, provisional application No. 62/029,913, filed on Jul. 28, 2014, provisional application No. 62/032,306, filed on Aug. 1, 2014, provisional application No. 62/027,059, filed on Jul. 21, 2014, provisional application No. 62/027,059, filed on Aug. 1, 2014, provisional application No. 62/058,554, filed on Oct. 1, 2014, provisional application No. 62/079,483, filed on Nov. 13, 2014, provisional application No. 62/038,053, filed on Aug. 15, 2014.

Modular Band – multi use / adjustable

CENTRALIZED CONTENT DISTRIBUTION IN A WEARABLE DISPLAY DEVICE NETWORK

CROSS REFERENCE TO RELATED APPLICATIONS

This application claims the benefit of U.S. Provisional Application No. 62/622,710, filed Jan. 26, 2018, which is incorporated by reference in its entirety.

BACKGROUND

This invention relates generally to wearable display devices, and more particularly to various applications for taking advantage of the capabilities of a wearable display device systems.

People experience and create all kinds of intentions and expressions which yield different energies and results that affect and impact what their experience of life is like and the results they yield how they feel and what they accomplish throughout their day, week, month and lifetime. Some intentions, expressions and energies are powerful and easily recognizable, while others are more subtle and often only intuitively felt.

The things one says, thinks and expresses do produce energy and results that impacts a person and the people around a person. Creating more positive intentions, expressions and energy leads to improvements, and favorable results in a person's life and to society as a whole.

Negative outcomes and negative and/or not thought out intentions, and negative energy, come in many forms. Developing more positive and focused intentions and expressions, of these intentions and positive energy can take many forms including but not limited to being around positive people, self-talk, uplifting music, inspirational messages, and inspirational books, being around positive people, communicating with positive people, practicing positive affirmations and the like.

When we emit positive intentions and expressions energy, including but not limited to communications, messages, thoughts, feelings, vibrations and the like, we attract more positives to us. Newton's law of action and reaction may be at play here. When we dwell on the negatives, or do not focus on what positive outcomes we want to have happen, we attract negatives, we also are victim to chance circumstance the collective consciousness, and this creates endless cycles of suffering and repetition that sap our energy strength in the process.

There are various ways of increasing our positive outcomes as a society and as an individual. The first thing is becoming clear about how our intentions and expressions impact our lives. The secondly thing is, creating vehicles and methods to support positive intentions, collective conscious expressions, reducing the experience of feeling powerless, having a voice, sharing, feeling connected to the greater whole and a relationship with something bigger than ones small self. Others include, love and accept yourself as you are, free yourself from past resentments and disappointments, letting go of any and all resentment you're hanging onto about everyone and everything else, stop looking for reasons to criticize and blame others for their acts and omissions, letting go of your desire to control others, using your time, energy, and vitality wisely, using creative visualization and imagination to your advantage, not your detriment, developing an attitude of gratitude, being happy, appreciating the moment, and the like.

With consciousness evolving and a need for its evolution, we as people have the ability and power to impact the outcomes that serve our lives and the greater community in which we live. Be it self, family, group affiliations, neighborhood, city, state, country, globe. It may be important to share, give back, feel connected, feel heard, counted and considered while being of service to self and others.

SUMMARY

Wearable digital buttons provide a medium for the publication of content, enabling individual or group expression. In an enterprise context, a centralized content distribution architecture allows for the uniform display of content on wearable digital buttons across one or more enterprise groups. For instance, a content slideshow can play on digital buttons worn by members of a sales team, a video indicating that a particular product is on sale can be played by digital buttons worn by a retail team, and an image with the text "How can I help?" can be displayed on digital buttons worn by members of a service team.

A set of wearable digital buttons can be deployed within an enterprise made up of several enterprise groups. Each button can include a display, a wireless receiver, and a controller configured to display viewable media objects, such as images or videos, received via the wireless receiver on the display of the button. In some embodiments, the digital buttons can receive content via a wired connected, via a direct connection to a centralized distribution system (such as a USB hub), or via any other suitable medium.

A centralized server can provide a set of media objects to the digital buttons within an enterprise group. For instance, the centralized server can display an interface to an enterprise manager, who can select a set of digital buttons (such as the buttons worn by members of the enterprise group) and can select the set of media objects from a database or online repository of media objects. The centralized server can provide the media objects to the buttons of the enterprise group with a set of display instructions, and the digital buttons can be configured to display the provided media objects based on the display instructions. For instance, the display instructions can identify an order of display for the media objects, and can display a length of time for which each media object is to be displayed.

Figure 1:
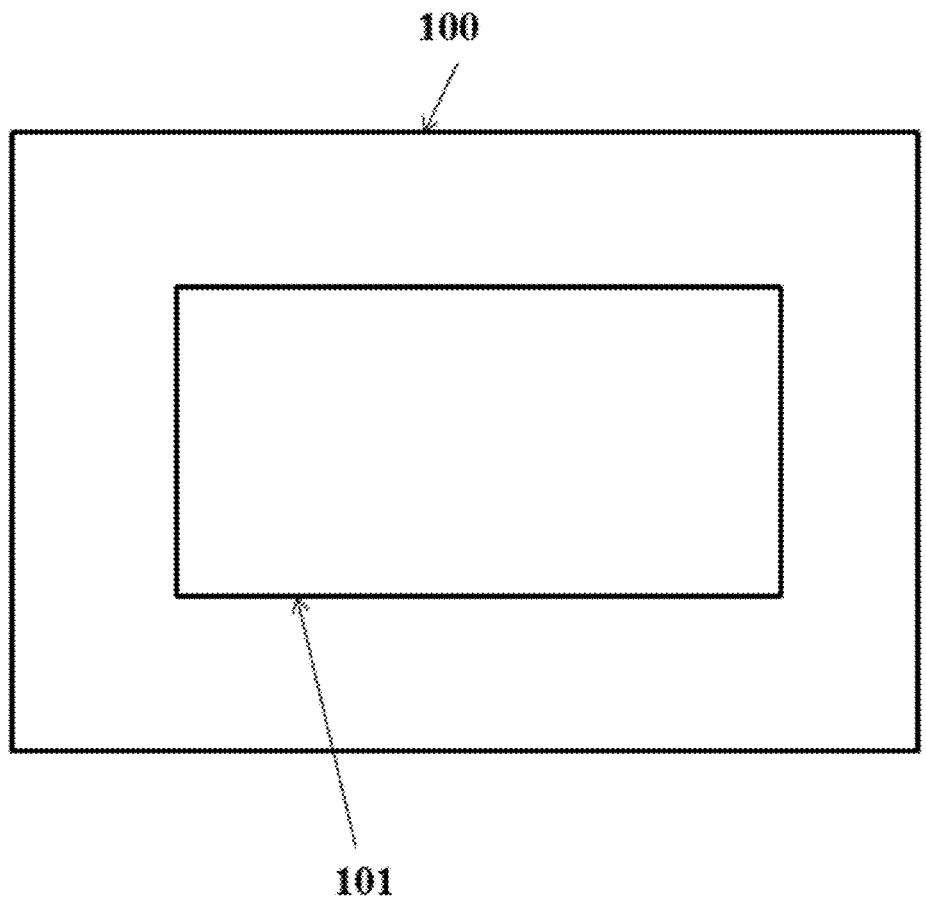
FIG. 1 shows a display device with a display screen.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

The term "media," as used herein, generally refers to text, sounds, image or video. Media can include a combination of text, sounds, image and/or video. Media can include text and image, text and video, or video. Examples of media include text files, audio files, images files, or video files. Media may be editable by a user.

As used herein, the term "engine" refers to software, firmware, hardware, or other component that can be used to effectuate a purpose. The engine will typically include software instructions that are stored in non-volatile memory (also referred to as secondary memory). When the software instructions are executed, at least a subset of the software instructions can be loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

As used herein, the term "database" is used broadly to include any known or convenient approach for storing data, whether centralized or distributed, relational or otherwise.

As used herein, a "mobile device" includes, but is not limited to, a cell phone, such as Apple's iPhone®, other portable electronic devices, such as Apple's iPod Touches®, Apple's iPads®, and mobile devices based on Google's Android® operating system, and any other portable electronic device that includes software, firmware, hardware, or a combination thereof that is capable of at least receiving the signal, decoding if needed, exchanging information with a transaction server to verify the buyer and/or seller's account information, conducting the transaction, and generating a receipt. Typical components of mobile device may include but are not limited to persistent memories like flash ROM, random access memory like SRAM, a camera, a battery, LCD driver, a display, a cellular antenna, a speaker, a BLUETOOTH® circuit, and WIFI circuitry, where the persistent memory may contain programs, applications, and/or an operating system for the mobile device.

As used herein, the terms "social network" and "SNET" comprise a grouping or social structure of devices and/or individuals, as well as connections, links and interdependencies between such devices and/or individuals. Members or actors (including devices) within or affiliated with a SNET may be referred to herein as "nodes", "social devices", "SNET members", "SNET devices", "user devices" and/or "modules". In addition, the terms "SNET circle", "SNET group" and "SNET sub-circle" generally denote a social network that comprises social devices and, as contextually appropriate, human SNET members and personal area networks ("PANs").

A used herein, the term "wearable device" is anything that can be worn by an individual, it can include a back side that in some embodiments contacts a user's skin and a face side. Examples of wearable device include a head display/head covering display regardless of form, including but not limited to a cap, hat, crown, arm band, wristband, garment, belt, t-shirt, a screen which can show words and/or images on it attached to or mounted on a user's head and/or other parts of the body, a holographic display for words or images that can float in front of the forehead, a projected display where the image or words are projected from the bill of the forehead by a projector on a bill, and the like. A wearable device can also include a bag, backpack, or handbag. The term "wearable device" can also be a monitoring device if it includes monitoring elements.

As used herein, the term "computer" is a device that can be programmed to carry out a finite set of arithmetic or logical operations. The computer can be programmed for a tailored function or purpose. Since a sequence of operations can be readily changed, the computer can solve more than one kind of problem. A computer can include of at least one processing element, typically a central processing unit (CPU) with one form of memory. The processing element carries out arithmetic and logic operations. A sequencing and control unit can be included that can change the order of operations based on stored information. Peripheral devices allow information to be retrieved from an external source, and the result of operations saved and retrieved.

As used herein, the term "Internet" is a global system of interconnected computer networks that use the standard Internet protocol suite (TCP/IP) to serve billions of users worldwide. It may be a network of networks that may include millions of private, public, academic, business, and government networks, of local to global scope, that are linked by a broad array of electronic, wireless and optical networking technologies. The Internet carries an extensive range of information resources services, such as the inter-linked hypertext documents of the World Wide Web (WWW) and the infrastructure to support email. The communications infrastructure of the Internet may include its hardware components and a system of software layers that control various aspects of the architecture.

As used herein, the term "extranet" is a computer network that allows controlled access from the outside. An extranet can be an extension of an organization's intranet that is extended to users outside the organization that can be partners, vendors, suppliers, in isolation from all other Internet users. An extranet can be an intranet mapped onto the public Internet or some other transmission system not accessible to the general public, but managed by more than one company's administrator(s). Examples of extranet-style networks include but are not limited to: LANs or WANs belonging to multiple organizations and interconnected and accessed using remote dial-up; LANs or WANs belonging to multiple organizations and interconnected and accessed using dedicated lines; Virtual private network (VPN) that is comprised of LANs or WANs belonging to multiple organizations, and that extends usage to remote users using special "tunneling" software that creates a secure, in some cases encrypted network connection over public lines, sometimes via an ISP.

As used herein, the term "Intranet" is a network that is owned by a single organization that controls its security policies and network management. Examples of intranets include but are not limited to: a local area network (LAN); wide-area network (WAN) that may be comprised of a LAN that extends usage to remote employees with dial-up access; WAN that is comprised of interconnected LANs using dedicated communication lines; virtual private network (VPN) that is comprised of a LAN or WAN that extends usage to remote employees or networks using special "tunneling" software that creates a secure, in some cases encrypted connection over public lines, sometimes via an Internet Service Provider (ISP).

For purposes of the present disclosure, the Internet, extranets and intranets collectively are referred to as ("Network Systems").

As used herein, the term "user" includes, but is not limited to, a person that uses devices, systems and methods of the present disclosure. A user may be a person interested in maintaining health, interested in maintaining a healthy lifestyle and/or physiologic balance, interested in monitoring lifestyle conditions, including but not limited to, the way a person goes about daily living including but not limited to, habits, exercise, diet, medical conditions and treatments, career, financial, emotional status, and the like. The user may be under a physician's care.

As used herein, the term "sensors" include those devices used for collecting data, such as from a user or an environment of the user. For example, a sensor can be for cardiac monitoring, which generally refers to continuous electrocardiography with assessment of the user's condition relative to their cardiac rhythm. A small monitor worn by an ambulatory user for this purpose is known as a Holter monitor. Cardiac monitoring can also involve cardiac output monitoring via an invasive Swan-Ganz catheter. As another example, a sensor can be used for Hemodynamic monitoring, which monitors the blood pressure and blood flow within the circulatory system. Blood pressure can be measured either invasively through an inserted blood pressure transducer assembly, or noninvasively with an inflatable blood pressure cuff. As another example, a sensor can be used for respiratory monitoring, such as pulse oximetry which involves measurement of the saturated percentage of oxygen in the blood, referred to as SpO2, and measured by an infrared finger cuff, capnography, which involves CO2 measurements, referred to as EtCO2 or end-tidal carbon dioxide concentration. The respiratory rate monitored as such is called AWRR or airway respiratory rate). As another example, a sensor can be used for respiratory rate monitoring through a thoracic transducer belt, an ECG channel or via capnography, and/or neurological monitoring, such as of intracranial pressure. Special user monitors can incorporate the monitoring of brain waves electroencephalography, gas anesthetic concentrations, and bispectral index (BIS), blood glucose monitoring using glucose sensors and the like. As another example, a sensor can be used for childbirth monitoring. This can be performed using sensors that monitor various aspects of childbirth. As another example, a sensor can be used for body temperature monitoring which in one embodiment is through an adhesive pad containing a thermoelectric transducer, and/or stress monitoring to provide warnings when stress levels signs are rising before a human can notice it and provide alerts suggestions. As another example, a sensor can be used for epilepsy monitoring, toxicity monitoring, and/or monitoring general lifestyle parameters.

Visual Displays

An aspect of the present disclosure provides a system for displaying or projecting media selected by a user, comprising a support member that is removably mountable on a body of a user, and a display mounted on the support member. The display can be configured to display or project the media selected by the user in a manner that is viewable by one or more observers. The media can include at least one of text, image and video. The support member can be removably mountable on an article of clothing on the body of the user (e.g., shirt, pants or hat), or other object mounted on the body of the user, such as, for example, a strap or bag. The system can comprise a controller in communication with the display. The controller can be programmed to direct the display to display or project the media according to a display and/or location preference or schedule of the user. The display, when mounted on the support member, can yield a display device.

The display and/or location preference or schedule of the user can be a display schedule, location schedule, or both. The user may use the display and/or location preference or schedule to set the manner in which media is displayed or projected. For example, the user may wish media to be displayed or projected during the day, at night, or at other times during the day, week, month, or year. The user may wish media to be displayed or projected at random points, upon manual input by the user, or both. The user may wish the media to be displayed or projected in response to an action or trigger, such as the user receiving electronic mail (email), a text message, having a meeting, or other action or trigger. The media may be displayed based on a context of the user.

The user may wish media to be displayed or projected when the user is at a given location, as may be determined by a geolocation device of the user. The geolocation device may be part of the system or display device.

The display can have various shapes and sizes. The display can be triangular, circular, oval, square, rectangular, or partial shapes or combinations of shapes thereof.

In some examples, the display is a visual curvilinear display with circular or oval, or has circular or oval features. For example, the display is circular or substantially circular, or is of another shape (e.g., square or rectangular) with sides or corners that are partially or fully circular.

The support member can have various shapes and sizes. The support member can be triangular, circular, oval, square, rectangular, or partial shapes or combinations of shapes thereof. The support member can be a button. The support member can include a pin, clip, hook, loop, lanyard or magnetically attractable lock.

The support member can be a cap, hat, screen, pin, belt, belt buckle, arm band, wristband, necklace, choker necklace, headband, visor, visor protective flap(s), screen camera, or band. The support member can be a surface or support object that is mountable (e.g., removably mountable) on a cap, hat, screen, pin, belt, belt buckle, arm band, wristband, necklace, choker necklace, headband, visor, visor protective flap(s), screen camera, or band.

The support member can be mountable on a head or torso of the user. In some cases, the support member is not mountable on a wrist, hand and/or arm of the user. The support member can be mountable and removable from the body with a single hand of the user. In an example, the user can mount or remove the support member solely with the user's left or right hand, thus enabling the support member to be readily mounted or removed with little or minimal effort by the user.

The display can have a thickness that is less than or equal to about 100 millimeter (mm), 50 mm, 40 mm, 30 mm, 20 mm, 10 mm, 5 mm, or 1 mm. The support member can have a thickness that is less than or equal to about 100 mm, 50 mm, 40 mm, 30 mm, 20 mm, 10 mm, 5 mm, or 1 mm. When the display is mounted on the support member to yield the display device, the overall thickness of the device can be less than or equal to about 100 mm, 50 mm, 40 mm, 30 mm, 20 mm, 10 mm, 5 mm, or 1 mm. In some examples, the overall thickness is from 2 mm to 15 mm, or 5 mm to 10 mm. As an example, the overall thickness is less than or equal to 15 mm, 14 mm, 13 mm, 12 mm, 11 mm or 10 mm.

The display can have a cover glass with a substantially small curvature. The display can be formed of sapphire glass. The display can be circular, oval, triangular, square or rectangular, for example. The display can include a backlight and/or a masked front glass. The display can be flexible.

The display can be a touchscreen, such as a capacitive or resistive touchscreen. This can enable the user to select media, scroll through media, or access other features or functions of the device.

The device can include one or more buttons to enable a user to access various features or functions of the device. The one or more buttons can be on a side portion of the display or the support member. The one or more buttons can be coupled to the controller.

The support member can include a pin that pierces an article of clothing (e.g., shirt or hat) or other object (e.g., bag), which can enable the support member to secure against the article of clothing or other object. The pin can have a lock that secures the pin and support member in place. The pin can enable the support member to rotate. As an alternative, the support member can include a magnetically attractable lock. For example, the support member can include a metallic plate that is polarized with one pole of a permanent magnet and a lock that is polarized with another pole of a magnet). When the metallic plate and lock are brought in proximity to one another, a magnetic field force can draw them together, holding the support member in place, such as, for example, against an article of clothing. As an alternative, the support member can be mountable on an inanimate object, such as a vehicle. This can enable the display device to display or project the medial on the vehicle. For example, the display device can be a bumper sticker, such as a digital bumper sticker.

The display can be modular. This can enable the display to couple with other components, such as other displays. In some cases, the system can include one or more additional displays. The one or more additional displays can be in communication with the display. For example, each additional display can be mountable on the support member or a separate support member. If a separate support member is employed, the separate support member may be mountable on the support member, or vice versa. For example, support members can include mounting members (e.g., clips or interlocks) on their sides that enable the support members to be coupled to one another to form larger display devices. Once coupled, the individual display devices can provide separate media or communicate with one another to provide the same media or portions of the same media. For example, portions of a single image can be displayed through the individual devices.

Figure 15A:
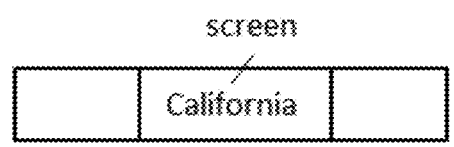
FIGS. 15A-15C illustrate various modular bands that can have multi use and be adjustable in various embodiments of the present disclosure.
Figure 15B:
Figure 15C:
Figure 16A:
FIGS. 16A-16B illustrate modular hats with a removable screen band and separate removable parts in various embodiments of the present disclosure.
Figure 16B:
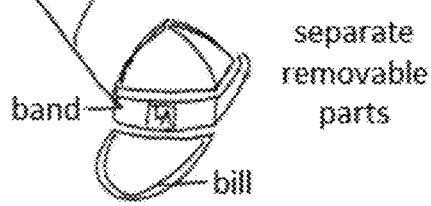

Modular displays can be coupled to various support members. FIGS. 15A-15C illustrate various modular bands that can have multi use and be adjustable. FIGS. 16A-16B illustrate modular hats with a removable screen band and separate removable parts.

The display and/or support member can be flexible. This can enable a user to bend or twist the display and/or support member, as desired. The user can shape the display and/or support member into any desired or predetermined shape or configuration.

Figure 3:
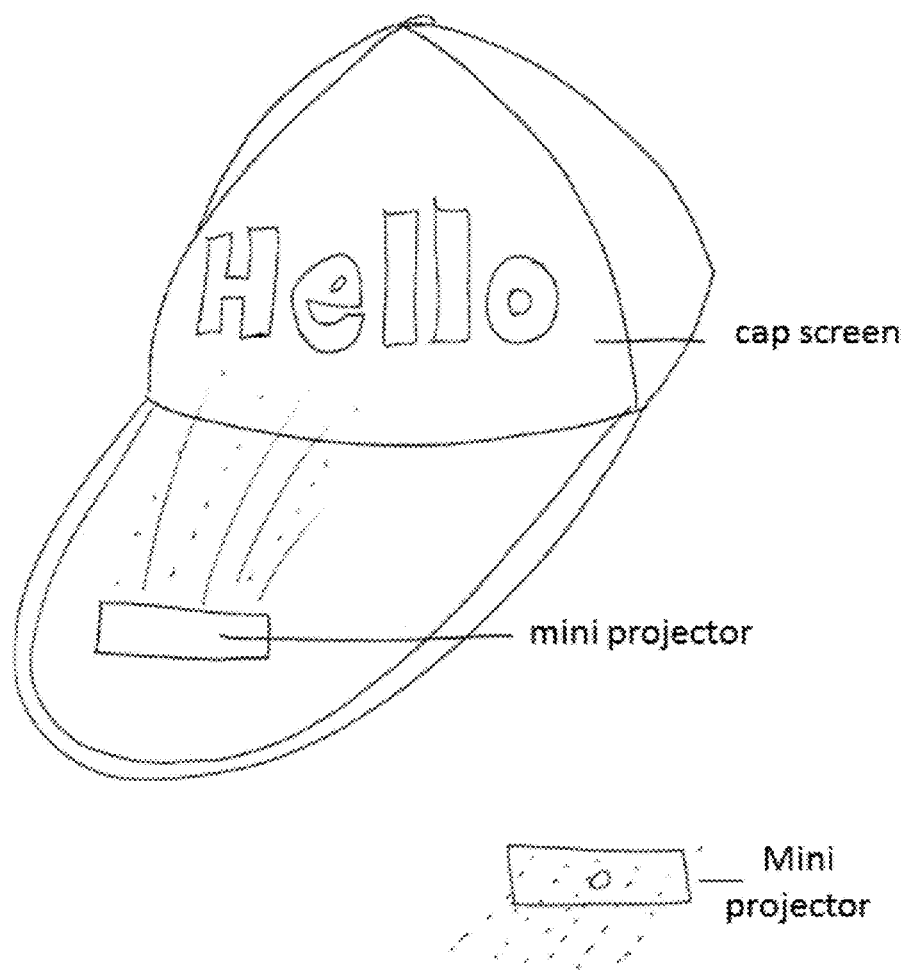
FIG. 3 illustrates a projector bill on a cap.

In some examples, the support member is formed of a polymeric material, such as a thermoplastic. The display can be formed of a light emitting diode (LED), such as an organic LED (OLED). The controller can include a printed circuit board (PCB) that can be flexible. As an alternative, the display is a projector that can project the media to a display surface, such as an article of clothing or other object (e.g., display screen). For example, the display can include a projector bill on a cap, as shown in FIG. 3.

The system can include an energy storage device, such as a battery, operatively coupled to the display and/or the controller. The battery can be a solid state battery, such as a lithium ion battery. The battery can be chargeable, such as through a charging port of the system, e.g., through a universal serial bus (USB) port. As an alternative or in addition to, the battery can be inductively chargeable.

The display can be removable from the support member. As an alternative, the display is not removable from the support member.

The system can include a communications bus for bringing the display in communication with the controller. The communications bus can be a circuit board, such as a PCB. The communications bus can be mounted on the support member. In some examples, the communications bus includes a communications interface (e.g., Bluetooth or WiFi) that brings the display in wireless communication with the controller.

The controller can be mounted on the support member. In some examples, the controller is unitary or integrated with the support member. As an alternative, the controller can be separable from the support member.

The system can include one or more sensors. A sensor among the one or more sensors can be an optical, pressure or proximity sensor. The sensor can be in communication with the controller.

The system can include a camera in communication with the controller. The camera can be a charge-coupled camera (CCD). The camera can enable capture of images or video of the user or other objects, such other individuals. This can enable the system to gauge response to the media.

The controller can be programmed to orient the media such that it is displayed or projected through the display at an orientation selected by the user. This can enable the user to mount the support member on a body of the user without concern for the media being displayed or projected in an intended manner. As an alternative or in addition to, the controller can be programmed to orient the media such that it is displayed or projected through the display along a direction that is parallel to the gravitational acceleration vector.

The system can include a gyroscope. The gyroscope can enable the controller to determine the orientation of the display.

The system can include an acceleration member that measures proper acceleration. The acceleration member can be an accelerometer. The acceleration member can be operatively coupled (e.g., in communication with) the controller.

The system can enable the user to create media. For example, the user can select a picture and modify the picture to generate media for display. The media can be created on a mobile electronic device of the user, such as a portable computer or Smart phone.

Display devices (e.g., wearable devices) of the present disclosure can include various features. A display device can have a display with a touchscreen (e.g., capacitive touchscreen), a GPS, and an accelerometer. The accelerometer may be used, for example, for movement detection and power management, as well as making sure that an image (or expression) on the display is always properly oriented (e.g., north/south or up/down). The display can be for customizable self-expression and connecting to a platform to allow for connection options. The display device may be readily mountable on the user or other object, and may be readily removable from the user or other object. The display device may be mountable with a magnet, which can allow the user to mount and remove the display device without having to take of the magnets. The display device can have an energy storage unit, such as a battery. The display device may be at least partially or fully powered by solar energy. In such a case, the display device can include solar cells. The display device may have an electronic paper display ("E ink") which may have electrophoretic ink. Such a display may be a bistable display that may be usable for reduced or low power consumption.

Reference will now be made to the figures, wherein like numerals refer to like parts throughout. It will be appreciated that the figures and features therein are not necessarily drawn to scale.

FIG. 1 shows a display device 100 with a display screen 101. The display device 100 can be as described above. The display screen 101 can have various shapes and sizes. For example, the display screen 101 can be curvilinear (e.g., circular or oval). The display device 100 and the display screen 101 can have various form factors. For example, the display device 100 can be in the form of a pin or button.

Figure 2:
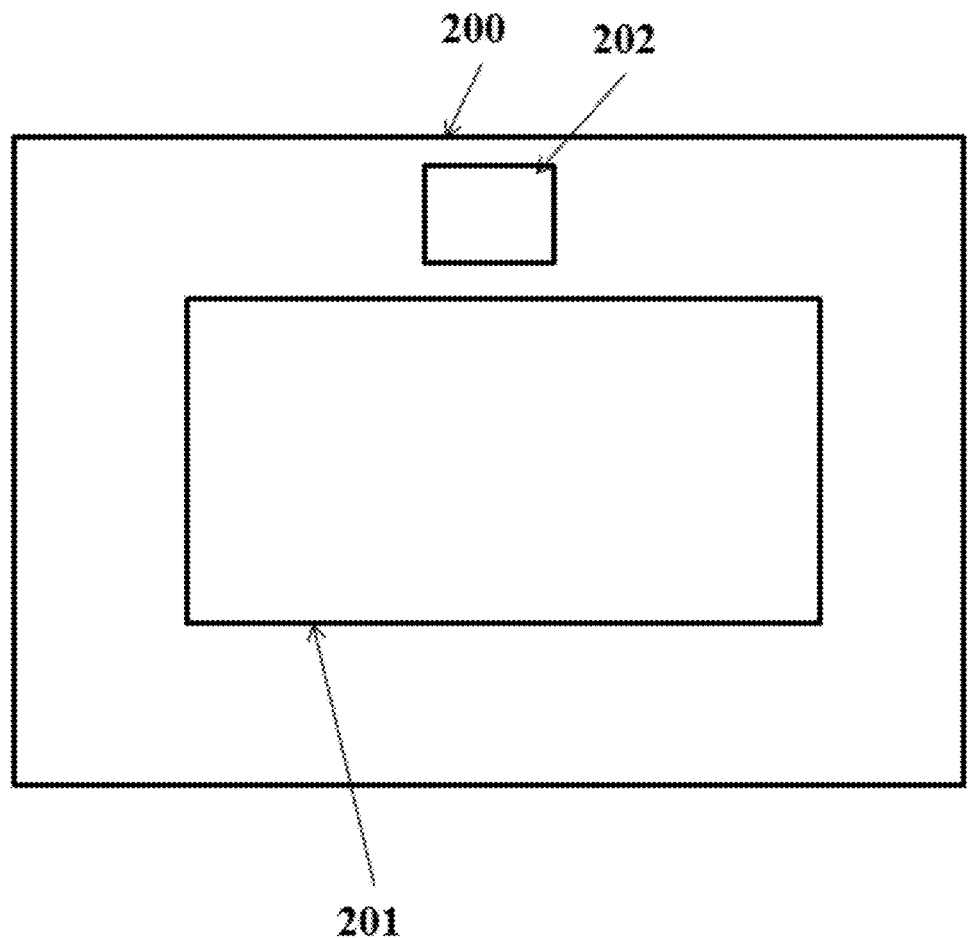
FIG. 2 shows another display device with a display screen.

FIG. 2 shows a display device 200 with a display screen 201. The display device 200 can be as described above. The display screen 201 can have various shapes and sizes. For example, the display screen 201 can be curvilinear (e.g., circular or oval). The display device 200 further includes a sensor 202. The sensor 202 can capture various signals from the user or an environment of the user, such as light or sound. The sensor 202 can be a camera, which can capture images or video from the user or other objects, such as other individuals. The display device 200 and the display screen 201 can have various form factors. For example, the display device 200 can be in the form of a pin or button.

The present disclosure provides a wearable device that can provide the ability to have self-expression, with the self-expression being changeable, and is in the form of words, images and combinations thereof.

In an embodiment, the wearable device provides the ability to have individual creative self-expression, with the self-expression being changeable, and is in the form of words, images and combinations thereof.

In another embodiment, the wearable device provides the ability to have dynamic individual creative self-expression, in the form of words, images and combinations thereof, and enables connection.

In another embodiment, the present disclosure provides a wearable device that provides an ability to have dynamic individual creative self-expression, in the form of words, images and combinations thereof, and enables manifestation in a variety of different forms.

In one embodiment, the present disclosure provides a wearable, customizable digital display device that combines technology and fashion to offer the user an opportunity for creative self-expression, connection and manifestation. A wearable device of the present disclosure can provide a tangible delivery system of a message and/or figure to create expression.

The wearable device can display images, complex words and messages, and text, uploads, displays, ends wirelessly. The wearable device can use a user's or a third party's mobile device to communicate. The wearable device is in communication with the mobile device.

In one embodiment the wearable device is a crown that may change color based on information received. Sensors can be included in the wearable device.

In various embodiments the wearable device can include a display or screen that can be flexible. In other embodiments the wearable device can be utilized by a wearable device user with an ability to impact positive social and environmental change through intentionally and expression from personal to global. In one embodiment the wearable distal is a customizable worn for the purpose of self-expression and the greater good. It can be used to express, connect and manifest positive change.

Display devices of the present disclosure can provide individuals with the opportunity to voice and express what is important to them via wearable devices, and in their vehicles, mini customizable billboards. Display devices of the present disclosure can provide individuals with the opportunity to be heard, counted and has their opinions and intentions mean something through creative customizable self-expression which they can wear or use in their vehicles.

Display devices of the present disclosure can support individuals collectively creating outcomes for their lives. Such devices can also enable individuals to have positive experiences and create all kinds of intentions and expressions which yield different energies and results that effect and impact what their experience of life is like, the results of how they feel and what they accomplish throughout their day, week, month and lifetime. Some intentions, expressions and energies are powerful and easily recognizable, while others are more subtle and often only intuitively felt.

Wearable devices of the present disclosure can provide the opportunity to support connection, being counted, in an aggregate dashboard of all the users of our device to reflect the collective mood and different expressions of the users. In one embodiment users of the device connect with potential revenue streams based on what they are expressing on their devices, including but not limited to a walking or traveling billboard. Organizations may be able to connect with users of wearable devices for the purpose of communal expressions.

The present disclosure provides a digital LED, nanotechnology and other related display technology-based button that can combine technology and fashion to offer the user an opportunity for creative self-expression, connection and manifestation. The user has the ability to impact positive social and environmental change through intentionally and expression from personal to global. In one embodiment the digital LED, nanotechnology and other related display technology based wrist band is a customizable digital cap worn for the purpose of self-expression and the greater good. It can be used to express, connect and manifest positive change.

The present disclosure provides a digital LED, nanotechnology and other related display technology-based button that can provide: (i) a tangible delivery system of a message and the psychological spiritual intention of the messenger him/herself; (ii) a sense of identity, a pride, uniqueness, a cool factor and the like, (iii) a sense of self, belonging, connection, meaning, purpose, fulfillment, being heard and considered; and (iv) an ability to impact the outcomes that serve their lives and the greater community in which they live.

The digital LED, nanotechnology and other related display technology based wrist band displays images and text, uploads, displays, ends wirelessly. The digital LED, nanotechnology and other related display technology based wrist band can use a user's or a third party's mobile device to communicate. The digital LED, nanotechnology and other related display technology based wrist band is in communication with the mobile device.

Sensors can be included in the digital LED, nanotechnology and other related display technology based wrist band. In one embodiment color codes are utilized with the wristband that are displayed to reflect what causes the user is affiliated with and cares about.

The wristband can be uploaded with mobile devices, desktop computers, other devices including but not limited to BEAM devices.

As non-limiting examples, the wristband can display a variety of different messages, cause-based intentions such as a breast cancer ribbon, rainbow GLTG, and the like.

The present disclosure provides a digital LED, nanotechnology and other related display technology-based wrist band that can combine technology and fashion to offer the user an opportunity for creative self-expression, connection and manifestation. The user has the ability to impact positive social and environmental change through intentionally and expression from personal to global. In one embodiment the digital LED, nanotechnology and other related display technology based wrist band is a customizable digital cap worn for the purpose of self-expression and the greater good. It can be used to express, connect and manifest positive change.

The present disclosure provides a digital LED, nanotechnology and other related display technology-based wrist band that provides: (i) a tangible delivery system of a message and the psychological spiritual intention of the messenger him/herself; (ii) a sense of identity, a pride, uniqueness, a cool factor and the like, (iii) a sense of self, belonging, connection, meaning, purpose, fulfillment, being heard and considered; and (iv) an ability to impact the outcomes that serve their lives and the greater community in which they live.

The digital LED, nanotechnology and other related display technology based wrist band displays images and text, uploads, displays, ends wirelessly. The digital LED, nanotechnology and other related display technology based wrist band can use a user's or a third party's mobile device to communicate. The digital LED, nanotechnology and other related display technology based wrist band is in communication with the mobile device.

Sensors can be included in the digital LED, nanotechnology and other related display technology based wrist band.

In one embodiment color codes are utilized with the wristband that are displayed to reflect what causes the user is affiliated with and cares about.

The wristband can be uploaded with mobile devices, desktop computers, other devices including but not limited to BEAM devices.

As non-limiting examples, the wristband can display a variety of different messages, cause based intentions such as a breast cancer ribbon, rainbow GLTG, and the like.

In another aspect, a method for displaying or projecting media selected by a user comprises providing a display device that comprises (i) a support member that is removably mounted on a body of a user, and (ii) a display mounted on the support member, wherein the display is configured to display or project the media selected by the user in a manner that is viewable by one or more observers, which media includes at least one of text, image and video. Next, a display and/or location preference or schedule of the user is accessed in computer memory. The display can then be used to display or project the media according to the display and/or location preference or schedule of the user.

The media can be oriented such that it is displayed or projected through the display at an orientation selected by the user. The median can be oriented such that it is displayed or projected through the display along a direction that is parallel to the gravitational acceleration vector.

The method can include receiving input from the user to display or project the media. The input can be received on the display or an electronic device of the user.

The method can include receiving the display and/or location preference or schedule from the user. The display and/or location preference or schedule can be stored in the computer memory. The display and/or location preference or schedule can be received from a mobile electronic device of the user.

The method can include detecting motion of the user. The media can be displayed or projected upon detecting the motion.

Flexible Displays

The flexible displays may be composed of one or more flexible layers and may be mounted on top of or under a cover layer. For example, a flexible display may be mounted on top of a rigid support member or may be mounted on the underside of a rigid cover layer. The display may be mounted on a rigid surface or a surface that is not rigid.

Electronic devices may also be provided with user interface components (input-output components) such as buttons, microphones, speakers, piezoelectric actuators (for receiving electrical input from a user or tactile feedback to users), or other actuators such as vibrators, pressure sensors, and other components. These components may be mounted under portions of a flexible display.

During operation of the electronic device, the flexibility of the display may allow a user to interact with the component through the display. For example, sound waves from a speaker or localized vibrations from an actuator in an electronic device may pass through the flexible display. The flexible display may also allow an internal microphone, pressure sensor, or force sensor (or other internal components) to receive external input. For example, a user may deflect a flexible display using a finger or other external object, barometric pressure may be monitored through the flexible display, or sound waves may be received through the flexible display.

Components may receive input or may supply output through a physically deformed portion of the flexible display (e.g., a deformation that occurs when a user presses on the display to compress the component). In some configurations, a portion of the flexible display may serve as a membrane that forms part of a microphone, speaker, pressure sensor, or other electronic component.

The ability of a user to compress a component such as a button switch by deforming the flexible display may allow the area of a device available for visual display to be enlarged. For example, the active area of a flexible display may overlap a component such as a button or speaker.

If desired, a flexible display may be deformed by an internal component to provide audio or tactile feedback to a user. For example, structures inside an electronic device may be pressed against portions of a flexible display to temporarily create an outline for a virtual on-screen button or to temporarily create a grid of ridges that serve to delineate the locations of keys in a keyboard (keypad).

Display Components

In another aspect, a system for analyzing response to media from a user can comprise a support member that is removably mountable on a body of a user, and a display member mounted on the support member, wherein the display member is configured to display or project the media selected by the user, which media includes at least one of text, image and video. The system can include a sensor that collects one or more signals that are indicative of a response of at least one individual to the media displayed or projected by the display member. The system can include a controller in communication with the display member and the sensor, wherein the controller is programmed to (i) direct the display member to display or project the media, (ii) receive the one or more signals from the sensor and (iii) determine the response based at least in part on the one or more signals received from the sensor. The at least one individual can include the user.

The support member can be removably mountable on a hat or a shirt of the user. The display member can be a display screen. The display screen can be curvilinear or flexible.

The system can include a camera in communication with the controller. The controller can be programmed to determine a score indicative of a quality of a relationship value between the user and the at least one other individual based at least in part on the response. The controller can be programmed to determine one or more waypoints between transitions from one quality of relationship value to another quality of relationship value. The quality of relationship value can be selected from the group consisting of trust, confidence, engagement, value creation, breakdown, lethargy, apathy and compliance. The controller can be programmed with a relationship analysis engine that determines or quantifies a quality of one or more relationships between the user and one or more other persons or entities.

In another aspect, a method for analyzing response to media from a user can comprise providing (i) a support member that is removably mounted on a body of a user, (ii) a display member mounted on the support member, wherein the display member is configured to display or project the media selected by the user, which media includes at least one of text, image and video, and (iii) a sensor that collects one or more signals that are indicative of a response of at least one individual to the media displayed or projected by the display member. Next, the display member can be used to display or project the media. The one or more signals can be received from the sensor and the response can be determined based at least in part on the one or more signals received from the sensor.

The method can include determining a score indicative of a quality of a relationship value between the user and the at least one individual based at least in part on the response. One or more waypoints can be determined between transitions from one quality of relationship value to another quality of relationship value.

The present disclosure provides various displays for use with systems and methods of the present disclosure. In one embodiment, the display includes an electronic circuit stratum with signal transmitting components for transmitting user input signals to a display signal generating device for controlling display information transmitted from the display signal generating device. Signal receiving components receive the display information transmitted from the display signal generating device. Display driving components drive the display layer according to the received display information. A user input receives user input and generates the user input signals. A battery provides electrical energy to the electronic circuit stratum, the user input and display components. The signal receiving components may include first radio frequency receiving components for receiving a first display signal having first display information carried on a first radio frequency and second radio frequency receiving components for receiving a second display signal having second display information carried on a second radio frequency. The display driving components may include signal processor components for receiving the first display signal and the second display signal and generating a display driving signal for simultaneously displaying the first display information at a first location on the display and the second display information at a second location on the display stratum. At least some of the components in the battery, display, user input and electronic circuit stratums are formed by printing electrically active material to form circuit elements including resistors, capacitors, inductors, antennas, conductors and semiconductor devices.

The battery may comprise a first current collector layer; an anode layer; an electrolyte layer; a cathode layer and a second current collector layer. The electrolyte material may be microencapsulated, which may make the battery particularly suitable for formation by a printing method, such as inkjet printing, laser printing, magnetically reactive printing, electrostatically reactive printing, or other printing methods that are adaptable to the use of microencapsulated materials. The battery is formed substantially over the entire top surface of the flexible substrate. By this construction, the inventive wireless display device may be formed as thin as possible, while having suitable battery power density, and while being provided with the advantageous electronic shielding qualities provided by the battery layers. The user input may comprise a grid of conductive elements each conductive elements for inducing a detectable electrical signal in response to a moving magnetic field. The user input may comprise a touch screen formed by printing pressure sensitive or capacitance sensitive elements on an insulating layer.

The display may include conductive leads connected with each light emitting pixel for applying the electrical energy selectively to each light emitting pixel under the control of the display driving components.

The signal receiving components may include first radio frequency receiving components for receiving a first display signal having first display information carried on a first radio frequency and second radio frequency receiving components for receiving a second display signal having second display information carried on a second radio frequency. The display driving components may include signal processor components for receiving the first display signal and the second display signal and generating a display driving signal for simultaneously displaying the first display information at a first location on the display and the second display information at a second location on the display stratum.

At least some of the components in the electronic circuit are formed by printing electrically active material to form circuit elements including resistors, capacitors, inductors, antennas, conductors and semiconductor devices.

A content formatting method of formatting substantially static display content is disclosed that greatly reduces the onboard processing capacity required by the wireless display. This content formatting method is effective for enabling a large number of simultaneous users. The source computer composes the substantially static display content into a video frame of information. The wireless display only needs as much memory as is needed to store the desired number of single frames of video information.

In one embodiment the display includes light emitting pixels for displaying information. In one embodiment the light emitting pixels are formed by printing a pixel layer of light-emitting conductive polymer.

In one embodiment, a user's displayed expression, connection and manifest for positive change. profile is received by one or more processors at the back-end where one or more of the following are performed: (i) extraction of unique features of the expression, connection and manifestation, and being counted as part of an aggregate dashboard reflection; (ii) enhances distinguishing aspects of the expression, connection and manifestation; and (iii) compression of data related to the expression, connection and manifestation. The one or more processors can compare received data from the wearable device with that in a database.

In one embodiment the display/screen is made larger through the use of optical components and creates a projection exterior to the display/screen. In one embodiment the display/screen can project out in front of the wearer's head. The screen may be clear in color, black, white or change colors when not being used.

In one embodiment colors are used for the wearable device as a key code for wearable devices that provide individual creative self-expression, connection, and manifestation. The wearable device can include add-ons, a GPS camera and the like.

The wearable device can have dimensionality to hold a display or screen coupled or included with it. The display or screen may be removable from the wearable device.

As non-limiting examples, the wearable device can be made of a variety of materials including but not limited to: recycled materials, cloth from different things; plastics; natural materials, an eco-friendly material and the like.

In one embodiment the wearable device houses the components, including electronics that drives the display. An energy source, including but limited to one or more batteries, can be included. As non-limiting examples, other energy sources can be utilized including but not limited to: solar; walking or other motion; wind and the like. The wearable can be chargeable, e.g., plugged in. In one embodiment the wearable device is powered via mesh technology.

The display can be positioned on the front, back, side and the like and can be detachable. The display can be made of flexible and non-flexible materials including but not limited to glass, plastics and the like.

The display can be different sizes shapes. In one embodiment the display is light sensitive and change color relative to light. In one embodiment the display includes a frame to help protect it from sun reflection. In one embodiment the frame is up-loadable to change color. The display can be flat, protrude out to some degree, and be a visor and the like to make it more viewable.

The wearable device can adjust to different sizes. The wearable device can be module and also morph into a different product worn in a different way.

In one embodiment the wearable device and/or display/screen can change colors. This can be achieved through the use of LED's and the like. All or a portion of the wearable device can change color. In one embodiment, the wearable device includes one or more sensors that pick up different aspects of the wear's energy, brain function, heartbeat, level of stress and busy thinking, and the like.

In one embodiment the wearable device it can change colors both at the screen level and the entire wearable device or embodiment adjacent to the screen which can be based on sound, and other extremities which can influence the user. This may be identical or similar to a sound responsive sculpture.

The wearable device can include additional electronic components including but not limited to, a camera, in or behind the screen, GPS functionality and the like, and can do everything that a mobile device can do. In one embodiment, the wearable device does not need the full power of a mobile device.

The wearable device can communicate with a telemetry site with a backend. The telemetry site can include a database of identification references, including user activity, performance and reference information for each user, and/or for each sensor and location. The user activity, performance metrics, data and the like captured by system can be recorded into standard relational databases SQL server, and/or other formats and can be exported in real-time. All communication is done wirelessly.

The telemetry system provides a vehicle for a user to: (i) set up its profile which can include their basic information, use wearable devices that provide, individual creative self-expression, connection, manifestation intentions; (ii) create and upload what the user wants to upload such as images, pictures, text and combinations thereof; and (ii) look at third parties self-expression, connections and manifestations.

It is noted that when something has political fire or interest they often change their social network profiles. Wearable devices of the present disclosure may be used for such purposes and as a supplement. Wearable devices of the present disclosure may be used to join a communal expression, political or social, etc.

The present disclosure provides an aggregate dashboard of what people are sharing; takes this natural behavior and implement it in the virtual and physical world; uploads social media information, pictures, messages and images; provides a mechanism to communicate with organizations; and connects all of this to different organizations that can then take action.

Individuals may join community organizations that share similar values and goals, participate in an eco-system of shared expressions, be part of an aggregate dashboard that sees all of this and determines the mood derived from the expressions of users. This may be reflected back into social networks.

Wearable devices of the present disclosure can be used to create revenue streams for the user by logging into and sharing personal information with companies that will pay for their message to be worn for periods of time based no exposure. Walking billboards and revenue flow based on wearers impact for advertiser. This may provide the opportunity for paid and unpaid communal expression and advertising for revenue.

Figure 4:
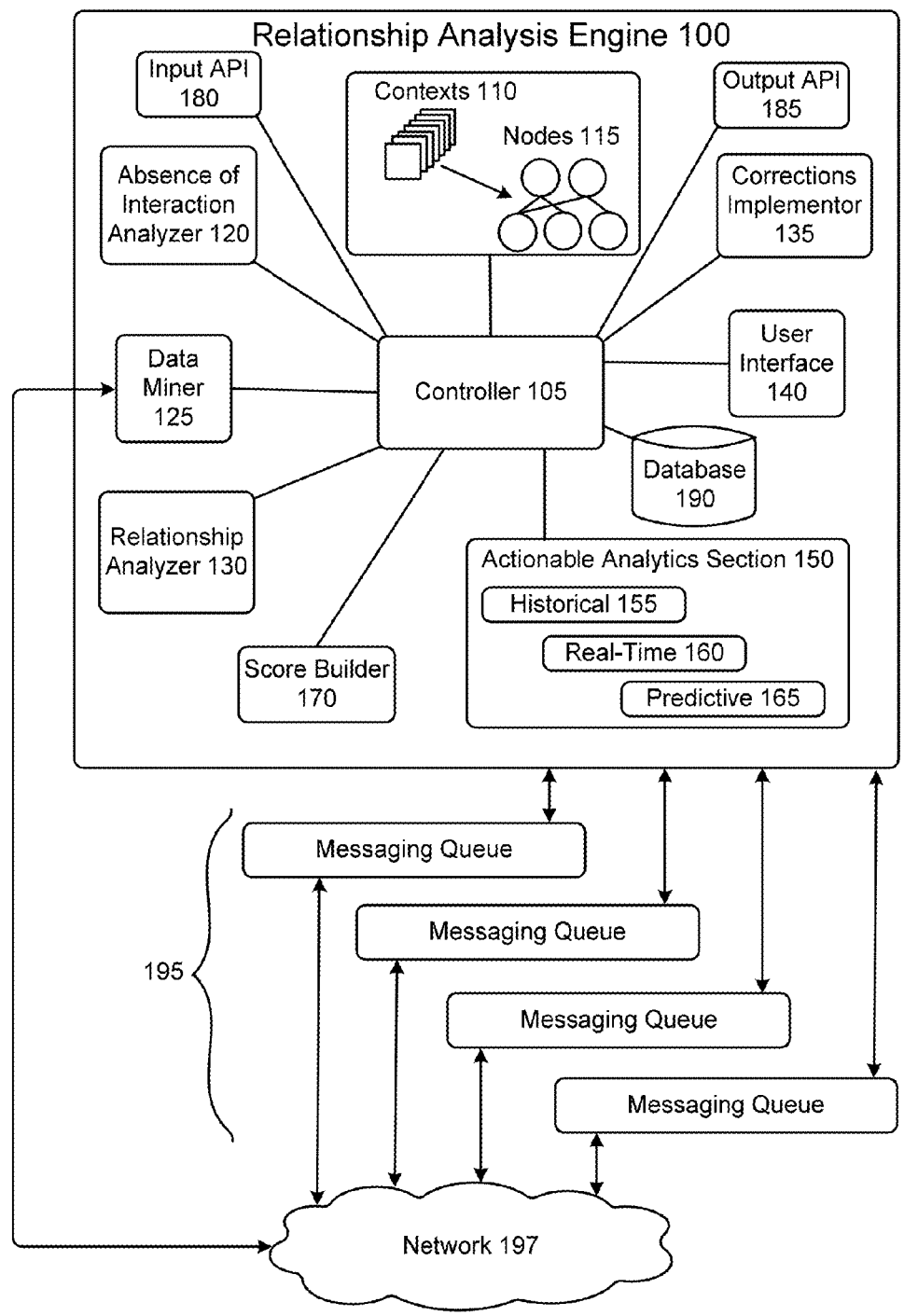
FIG. 4 illustrates a block diagram of a relationship analysis engine according to one embodiment of the present disclosure.

The present disclosure provides software that enables media to be displayed or projected using display devices provided herein. FIG. 4 illustrates a block diagram of a relationship analysis engine 100. The relationship analysis engine 100 can include a controller 105. The controller 105 is coupled to or otherwise associated with several different components, which can contribute to determining and quantifying the quality of one or more relationship between different persons or entities. The controller 105 can include a processor, circuit, software, firmware, and/or any combination thereof. Indeed, any of the components of the relationship analysis engine 100 can include a processor, circuit, software, firmware, and/or any combination thereof. It will be understood that one or more of the components of the relationship analysis engine 100 can be part of or otherwise implemented by the controller 105.

A data miner 125 is coupled to or otherwise associated with the controller 105 and can mine relationship information on a network (e.g., 197), such as Systems Network. The data miner 125 can determine or otherwise define a plurality of sender nodes, such as nodes 115. Each sender node represents a sender of a message, as further described in detail below. In addition, the data minder 125 can determine or otherwise define a plurality of recipient nodes, such as nodes 115. Each recipient node represents a receiver of a message, as further described in detail below.

The data miner 125 can automatically determine one or more contexts 110 in which each message is transmitted between a sender node and a recipient node. A context can include, for example, a work-related context, a personal friendship context, an acquaintance context, a business transaction context, or the like. The data miner 125 can also automatically determine a timing sequence for when each message is transmitted between the sender node and the recipient node.

An actionable analytics section 150 is coupled to or otherwise associated with the controller 105 and can analyze messages that are transmitted between the sender nodes and the recipient nodes. The messages can be received directly from one or more message queues such as message queues 195, analyzed, and returned to the message queues. Alternatively, the messages can be received over the network 197 by the data miner 125. The actionable analytics section 150 can produce historical analytics 155, real-time analytics 160, and predictive analytics 165 associated with at least one relationship based on the analyzed transmitted messages, the mined relationship information, the one or more contexts 110, and/or the timing sequence. The actionable analytics section 150 can also generate a relationship indicator for the relationship, which can include different icons, patterns, and/or colors representing past, present, and predictive quality of relationship values, as further described in detail below.

A relationship analyzer can determine one or more waypoints between transitions from one quality of relationship value to another. Such waypoints can be scored using a score builder 170. In addition, the quality of relationship values themselves can be assigned a score using the score builder 170. The scores can be used in determining the past, present, and predictive quality of relationship values, as further described in detail below. The relationship analyzer can be coupled to or otherwise associated with the controller 105, and can determine whether the relationship is productive or non-productive. The determination of whether the relationship is productive or non-productive can be made based on the context in which the message is sent or received. The relationship analyzer can also determine the weak points and/or the strong points of a relationship.

The analysis engine 100 can include a user interface 140. The user interface 140 can receive input from a user to manually define the sender nodes and the recipient nodes (e.g., 115). In other words, constructs of sender nodes and recipient nodes can be built, which represent the persons or entities that actually send and receive messages. Moreover, the user interface 140 can receive input from a user to manually define one or more contexts 110 in which each message is transmitted between a sender node and a recipient node.

The analysis engine 100 can further include a corrections implementer 135, which can be coupled to or otherwise associated with the controller 105. The corrections implementer 135 can detect one or more inaccuracies in the mined relationship information and automatically correct such inaccuracies. For instance, if weak points of a relationship should have been assessed as strong points, or vice versa, then the corrections implementer 135 can correct such inaccuracies and thereby improve the understanding of the relationship.

In some cases, an absence of interaction can be used to draw certain conclusions. An absence of interaction analyzer can be coupled to or otherwise associated with the controller 105, and can detect such absences of interaction. For instance, if a sender node sends a message to a recipient node, and the recipient node fails to reply to the message, then a conclusion can be drawn by the absence of interaction analyzer. The conclusion can be that the recipient is simply unavailable to respond. Alternatively, the conclusion can be that there is a flaw in the relationship between the sender node and the recipient node.

The actionable analytics section 150 can produce the historical analytics 155, the real-time analytics 160, and the predictive analytics 165 using the corrected inaccuracies of the corrections implementer 135, the absence of interaction detection of the absence of interaction analyzer, and the determination of the relationship analyzer.

An input application programming interface (API) 180 provides an input interface to the relationship analysis engine 100 from one or more third party applications or software. For example, the input API 180 can allow an interface to multiple modes of data feed including video, voice, and/or text information. In addition, an output API 185 provides an output interface from the relationship analysis engine 100 to one or more third party applications or software. For example, the output API 185 can allow third party applications or software to utilize the analysis engine 100 and display information received from the analysis engine 100 in their own user interface. The analysis engine 100 can provide real-time feedback on the quality of relationships between and among the nodes through the user interface 140, the input API 180, and/or the output API 185.

The relationship analysis engine 100 can also include a database 190, which can be coupled to or otherwise associated with the controller 105. The database 190 can store any information related to any of the components of the relationship analysis engine 100, including, for example, relationship information mined by the data miner 125, historical analytics 155, real-time analytics 160, predictive analytics 165, scores generated by the score builder 170, suggestions and tracers to display specific exhibits for the scores, and the like.

The relationship analysis engine 100 can be embodied in various forms. For example, the relationship analysis engine 100 can be operated using a dedicated rack-mount hardware system associated with a datacenter. In some embodiments, the relationship analysis engine 100 operates in association with a computing device or computer. In some embodiments, the relationship analysis engine 100 is a widget that can be installed or otherwise associated with a web page. In some embodiments, the relationship analysis engine 100 is embodied as a smart-phone application. In some embodiments, the relationship analysis engine 100 is an application associated with a social network. In some embodiments, the relationship analysis engine 100 is an add-on for relationship management software such as customer relationship management (CRM) software, vendor resource management (VRM) software, and/or environmental resource management (ERM) software, or the like.

Figure 5:
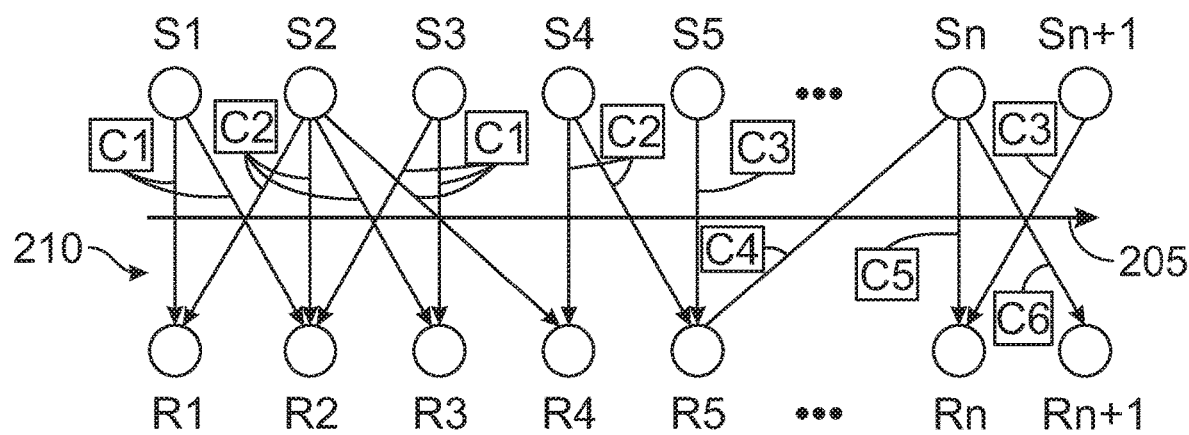
FIG. 5 illustrates a flow diagram of messages transmitted between sender and recipient nodes, in association with different contexts in one embodiment of the present disclosure.

In an example, FIG. 5 illustrates a flow diagram of messages 210 transmitted between sender nodes (e.g., S1, S2, S3, S4, S5, . . . , Sn, Sn+1) and recipient nodes (e.g., R1, R2, R3, R4, R5, . . . , Rn, Rn+1), in association with different contexts (e.g., C1, C2, C3, C4, C5, and C6).

The messages 210 are transmitted between the sender nodes and the recipient nodes in accordance with a timing sequence 205. Each of the messages 210 can have associated therewith a context, which can be different from one message to the next. For example, as shown in FIG. 5, the messages sent between S1 and received by R1 and R2 can have a context C1 associated therewith. By way of another example, the messages sent between Sn and recipients R5, Rn, and Rn+1 can have associated therewith contexts C4, C5, and C6, respectively. It will be understood that messages sent from a given sender node can have the same or different contexts.

The sender nodes are representative of senders of messages, which can be persons, entities, computers, or the like. The recipient nodes are representative of receivers of messages, which can be persons, entities, computers, or the like. Each node can represent a single person or entity, or alternatively, a group of people or entities. For instance, a node can represent a subscriber list to a worldwide audience. The messages 210 can include e-mails, blogs, short message service (SMS) text messages, posts, or the like, and can be organized as threads.

The actionable analytics section 150, FIG. 4, can produce the historical analytics 155, the real-time analytics 160, and the predictive analytics 165 pertaining to one or more relationships based on one or more contexts and the timing sequence.

Figure 6A:
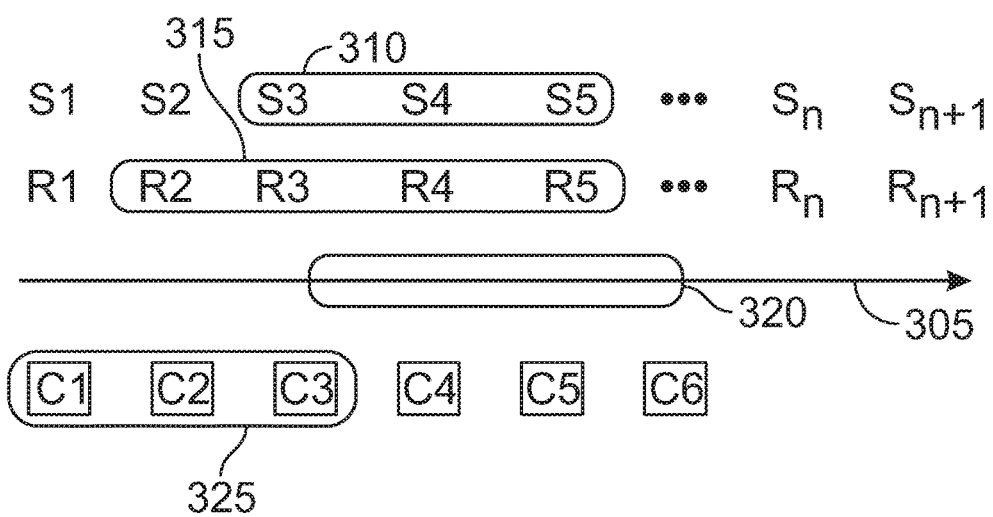
FIG. 6A illustrates selections of parameters for determining one or more relationships according to one embodiment of the present disclosure.

FIG. 6A illustrates selections of parameters for determining one or more relationships according to an example embodiment of the invention. One or more sender nodes can be selected, such as sender nodes 310. One or more receiver nodes can be selected, such as receiver nodes 315. A time interval of interest 320 can be selected on the time sequence 305. One or more contexts can be selected, such as contexts 325. It will be understood that these are exemplary selections, and any combination of parameters can be selected. The selection can be made, for example, through the user interface 140, the input API 180, and/or the output API 185. In some embodiments, the selection is made algorithmically and/or automatically.

Figure 6B:
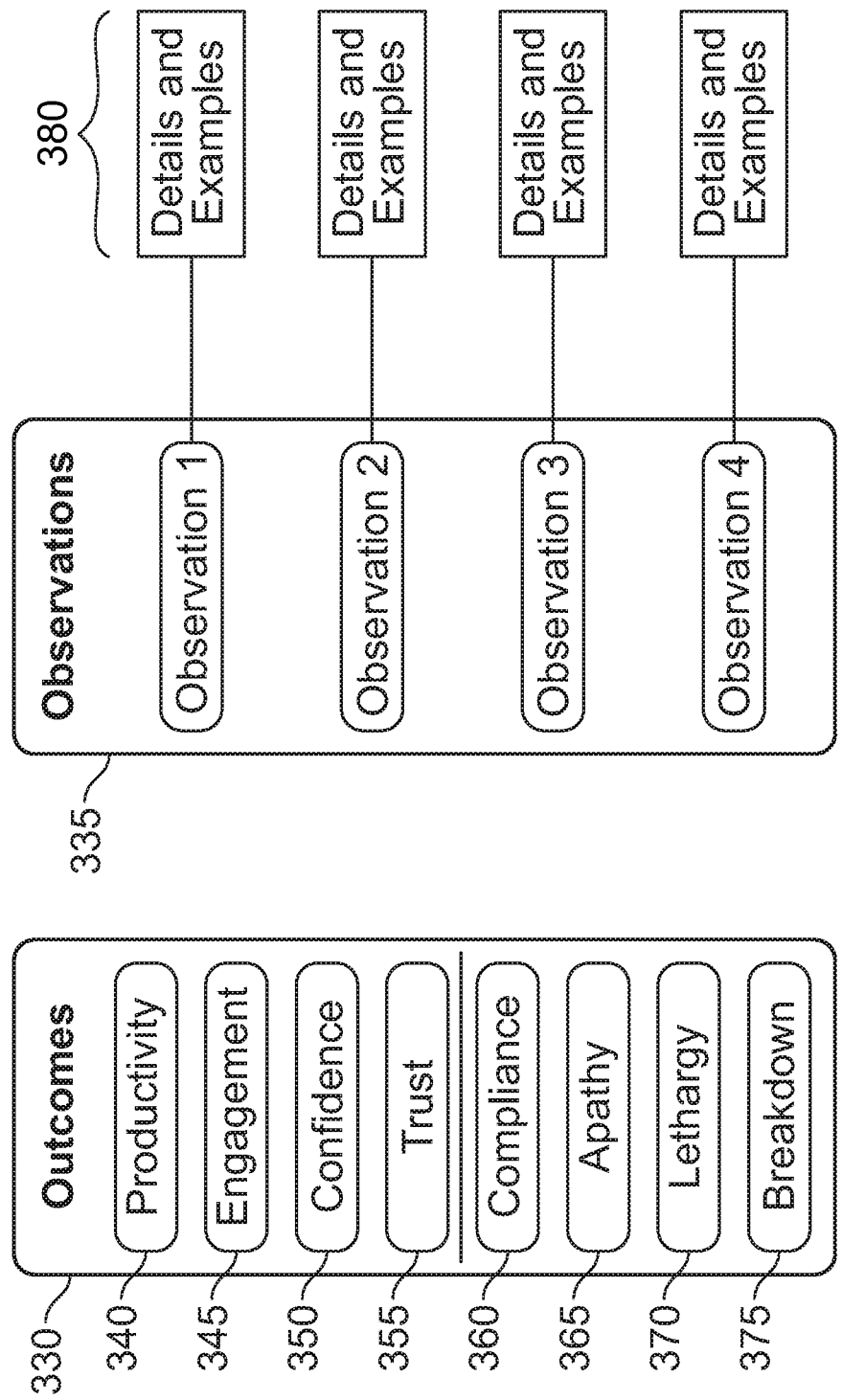
FIG. 6B illustrates an analysis and display of outcomes and observations associated with the selections of FIG. 6A according to one embodiment of the present disclosure.

FIG. 6B illustrates an analysis and display of outcomes and observations associated with the selections of FIG. 6A. After the selection of parameters, outcomes 330 and/or observations 335 can be generated and/or displayed. The outcomes 330 and/or observations 335 are based on the selection of parameters, the mined relationship information, and other determinations as set forth in detail. It will be understood that the relationship analysis engine 100, or components thereof, can produce the outcomes 330 and/or the observations 335.

The outcomes can include one or more quality of relationship values, such as productivity 340, engagement 345, confidence 350, trust 355, compliance 360, apathy 365, lethargy 370, and/or breakdown 375. The observations 335 can include one or more observations. For example, observation 1 can be "Lack of communication of outcome." Observation 2 can be "Emphasis on action items." Observation 3 can be "Partial acknowledgement of purpose." Observation 4 can be "Disconnected action items." It will be understood that these are exemplary observations, and other similar or different kinds of observations can be made.

In addition, details and examples (e.g., 380) can provide further detail and/or examples of the observations 335. The details and examples can include buttons 380, which can be selected so that the further detail and/or examples of the observations 335 and/or outcomes 330 can be displayed.

Figure 7A:
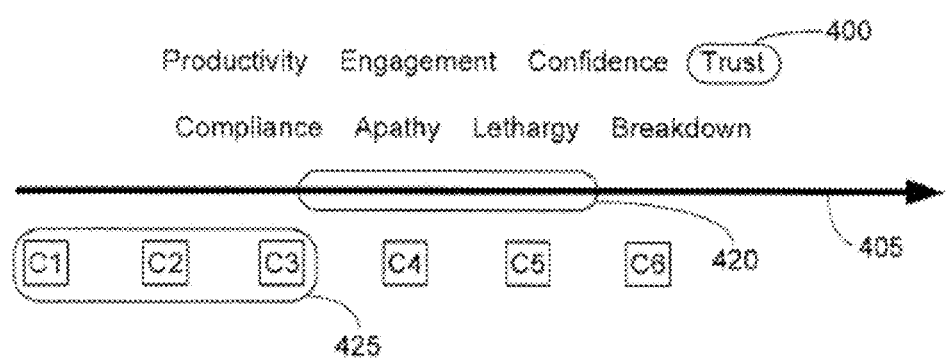
FIG. 7A illustrates selections of parameters for determining one or more relationships according to according to one embodiment of the present disclosure.

FIG. 7A illustrates selections of parameters for determining one or more relationships according to another example embodiment of the invention. One or more quality of relationship values, such as trust 400, can be selected. A time interval of interest 420 can be selected on the time sequence 405. One or more contexts can be selected, such as contexts 425. It will be understood that these are exemplary selections, and any combination of parameters can be selected. The selection can be made, for example, through the user interface 140, the input API 180, and/or the output API 185. In some embodiments, the selection is made algorithmically and/or automatically.

Figure 7B:
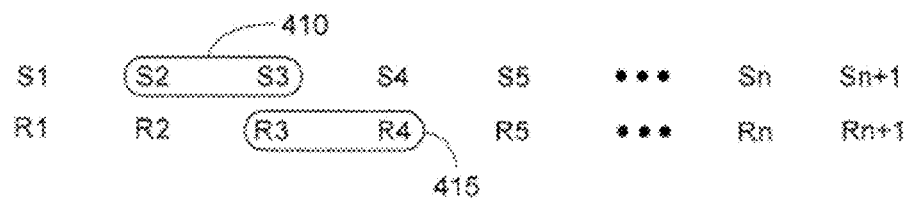
FIG. 7B illustrates an analysis and display of one or more relationship associated with the selections of FIG. 7A according to one embodiment of the present disclosure.

FIG. 7B illustrates an analysis and display of one or more relationship associated with the selections of FIG. 7A. After the selection of parameters, one or more sender nodes, such as sender nodes 410, can be highlighted or otherwise displayed, which correspond to the prior selections. Moreover, one or more recipient nodes, such as recipient nodes 415, can be highlighted or otherwise displayed, which correspond to the prior selections. It will be understood that the highlighted sender nodes 410 and the highlighted recipient nodes 415 are exemplary, and other similar or different kinds of selections and highlights can be made.

The determination for which of the sender nodes and recipient nodes are to be highlighted or otherwise displayed is made based on the selection of parameters, the mined relationship information, and other determinations as set forth in detail above. It will be understood that the relationship analysis engine 100, or components thereof, can produce the highlights or otherwise display the sender nodes 410 and/or the recipient nodes 415. Moreover, the sender nodes 410 and/or the recipient nodes 415 can be highlighted or otherwise displayed in accordance with the determinations of quality of relationships, which conform to the selections described above.

Figure 8:
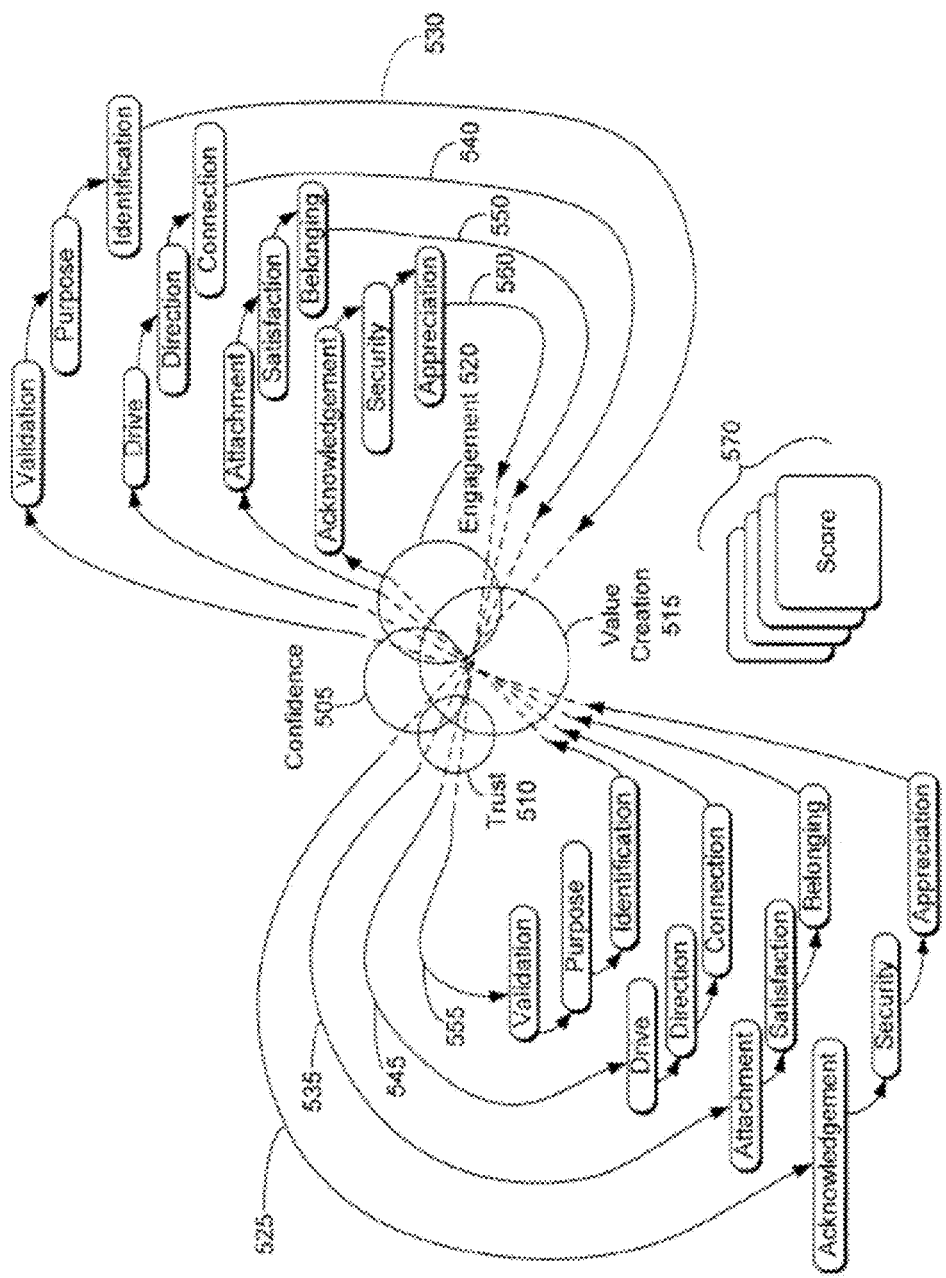
FIG. 8 illustrates a diagram of waypoints between transitions from one quality of relationship value to another quality of relationship value according to one embodiment of the present disclosure.

FIG. 8 illustrates a diagram of waypoints between transitions from one quality of relationship value to another quality of relationship value according to some example embodiments. The quality of relationship values can include, for example, trust 510, confidence 505, engagement 520, and/or value creation 515. These quality of relationship values represent values that are similar to or the same as the outcomes of trust 355, confidence 350, engagement 345, and productivity 340, respectively, discussed above with reference to FIG. 6B.

A relationship can transition from one quality value to any other quality value. For example, the relationship can transition from trust 510 to confidence 505, from confidence 505 to value creation 515, from engagement 520 to trust 510, from confidence 505 to engagement 520, and so forth. In the course of such transitions, the relationship can pass through various waypoints. In other words, the relationship analyzer, FIG. 4, can determine one or more waypoints between transitions from one quality of relationship value to another quality of relationship value.

The waypoints can be arranged along different paths. For instance, path 525 can be associated with value creation 515, and along path 525, the relationship can pass through waypoints of acknowledgement, security, and appreciation. The path 525 can continue to path 530, which can also be associated with value creation 515. Along path 530, the relationship can pass through waypoints of validation, purpose, and identification.

By way of another example, path 535 can be associated with engagement 520, and along path 535, the relationship can pass through waypoints of attachment, satisfaction, and belonging. The path 535 can continue to path 540, which can also be associated with engagement 520. Along path 540, the relationship can pass through waypoints of drive, direction, and connection.

By way of yet another example, path 545 can be associated with confidence 505, and along path 545, the relationship can pass through waypoints of drive, direction, and connection. The path 545 can continue to path 550, which can also be associated with confidence 505. Along path 550, the relationship can pass through waypoints of attachment, satisfaction, and belonging.

By way of still another example, path 555 can be associated with trust 510, and along path 555, the relationship can pass through waypoints of validation, purpose, and identification. The path 555 can continue to path 560, which can also be associated with trust 510. Along path 560, the relationship can pass through waypoints of acknowledgement, security, and appreciation.

It will be understood that the paths and waypoints disclosed herein are exemplary, and other similar paths and waypoints can be associated with the quality of relationship values of trust 510, confidence 505, engagement 520, and/or value creation 515.

The score builder 170, FIG. 4, can assign a score (e.g., 570) to one or more of the waypoints. The scores among the waypoints can be different in comparison one with another. For example, the score for the waypoint of appreciation along path 525 can be higher than the score for the waypoint of attachment along path 550. When a relationship passes through one of the waypoints, the score builder 170 can assign or otherwise add to the relationship the score associated with the given waypoint. The overall score assigned by the score builder 170 to a given relationship can be used in the determinations made by the relationship analyzer, of FIG. 4, and/or other components of the relationship analysis engine 100.

Furthermore, the score builder 170 can assign or otherwise add to the relationship a score (e.g., 570) for each quality of relationship value attained by the relationship. For example, a different score can be associated with each of the quality of relationship values of trust 510, confidence 505, engagement 520, and value creation 515, and the associated score can be assigned to the relationship having the particular quality of relationship value. The overall score assigned by the score builder 170 to a given relationship can include this aspect and be used in the determinations made by the relationship analyzer, of FIG. 4, and/or other components of the relationship analysis engine 100.

For example, the actionable analytics section 150, FIG. 4, can produce the historical analytics 155, the real-time analytics 160, and the predictive analytics 165 pertaining to one or more relationships based on the score of the one or more waypoints, the score for the quality of relationship, and/or the overall score assigned to the relationship. The messages from which relationship information is extracted can be used to determine the different paths and/or waypoints. The messages can be analyzed, categorized, sorted, grouped, and/or tagged in terms of nodes (e.g., sender or receiver), contexts, and/or waypoints.

Figure 9:
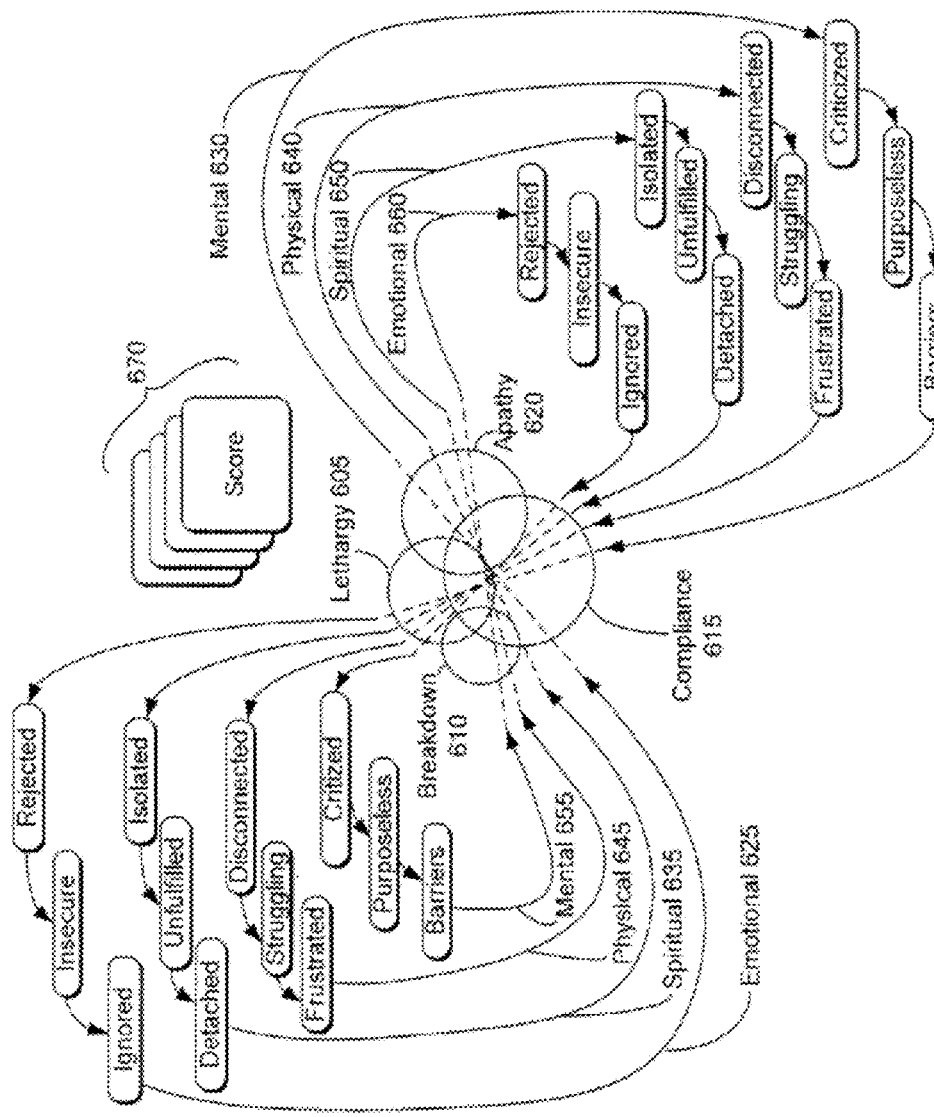
FIG. 9 illustrates another diagram of waypoints between transitions from one quality of relationship value to another quality of relationship value according to one embodiment of the present disclosure.

FIG. 9 illustrates another diagram of waypoints between transitions from one quality of relationship value to another quality of relationship value according to some example embodiments. The quality of relationship values can include, for example, breakdown 610, lethargy 605, apathy 620, and/or compliance 615. These quality of relationship values can represent values that are similar to or the same as the outcomes of breakdown 375, lethargy 370, apathy 365, and compliance 360, respectively, discussed above with reference to FIG. 6B.

A relationship can transition from one quality value to any other quality value. For example, the relationship can transition from breakdown 610 to lethargy 605, from lethargy 605 to compliance 615, from apathy 620 to breakdown 610, from lethargy 605 to apathy 620, and so forth. It will also be understood that the relationship can transition from one quality of relationship value illustrated in FIG. 9 to another quality of relationship value illustrated in FIG. 8. It will also be understood that the relationship can transition from one quality of relationship value illustrated in FIG. 8 to another quality of relationship value illustrated in FIG. 9.

In the course of such transitions, the relationship can pass through various waypoints. In other words, the relationship analyzer, FIG. 4, can determine one or more waypoints between transitions from one quality of relationship value to another quality of relationship value.

The waypoints can be arranged along different paths. For instance, emotional path 625 can be associated with breakdown 610, and along path 625, the relationship can pass through waypoints of rejected, insecure, and ignored. The path 625 can continue to mental path 630, which can also be associated with breakdown 610. Along path 630, the relationship can pass through waypoints of criticized, purposeless, and barriers.

By way of another example, spiritual path 635 can be associated with lethargy 605, and along path 635, the relationship can pass through waypoints of isolated, unfulfilled, and detached. The path 635 can continue to physical path 640, which can also be associated with lethargy 605. Along path 640, the relationship can pass through waypoints of disconnected, struggling, and frustrated.

By way of yet another example, physical path 645 can be associated with apathy 620, and along path 645, the relationship can pass through waypoints of disconnected, struggling, and frustrated. The path 645 can continue to spiritual path 650, which can also be associated with apathy 620. Along path 650, the relationship can pass through waypoints of isolated, unfulfilled, and detached.

By way of still another example, mental path 655 can be associated with compliance 615, and along path 655, the relationship can pass through waypoints of criticized, purposeless, and barriers. The path 655 can continue to emotional path 660, which can also be associated with compliance 615. Along path 660, the relationship can pass through waypoints of rejected, insecure, and ignored.

It will be understood that the paths and waypoints disclosed herein are exemplary, and other similar paths and waypoints can be associated with the quality of relationship values of breakdown 610, lethargy 605, apathy 620, and compliance 615.

The score builder 170, FIG. 4, can assign a score (e.g., 670) to one or more of the waypoints. The scores among the waypoints can be different in comparison one with another. For example, the score for the waypoint of ignored along path 625 can be higher than the score for the waypoint of rejected along path 660. When a relationship passes through one of the waypoints, the score builder 170 can assign or otherwise add to the relationship the score associated with the given waypoint. The overall score assigned by the score builder 170 to a given relationship can be used in the determinations made by the relationship analyzer, FIG. 4, and/or other components of the relationship analysis engine 100.

Furthermore, the score builder 170 can assign or otherwise add to the relationship a score for each quality of relationship value attained by the relationship. For example, a different score can be associated with each of the quality of relationship values of breakdown 610, lethargy 605, apathy 620, and/or compliance 615, and the associated score can be assigned to the relationship having the particular quality of relationship value. The overall score assigned by the score builder 170 to a given relationship can include this aspect and be used in the determinations made by the relationship analyzer, of FIG. 4, and/or other components of the relationship analysis engine 100. It will be understood that the score that is added can be a negative score, thereby negatively affecting the overall score assigned to the relationship.

The actionable analytics section 150, FIG. 4, can produce the historical analytics 155, the real-time analytics 160, and the predictive analytics 165 pertaining to one or more relationships based on the score of the one or more waypoints, the score for the quality of relationship, and/or the overall score assigned to the relationship. The messages from which relationship information is extracted can be used to determine the different paths and/or waypoints. The messages can be analyzed, categorized, sorted, grouped, and/or tagged in terms of nodes (e.g., sender or receiver), contexts, and/or waypoints.

Figure 10:
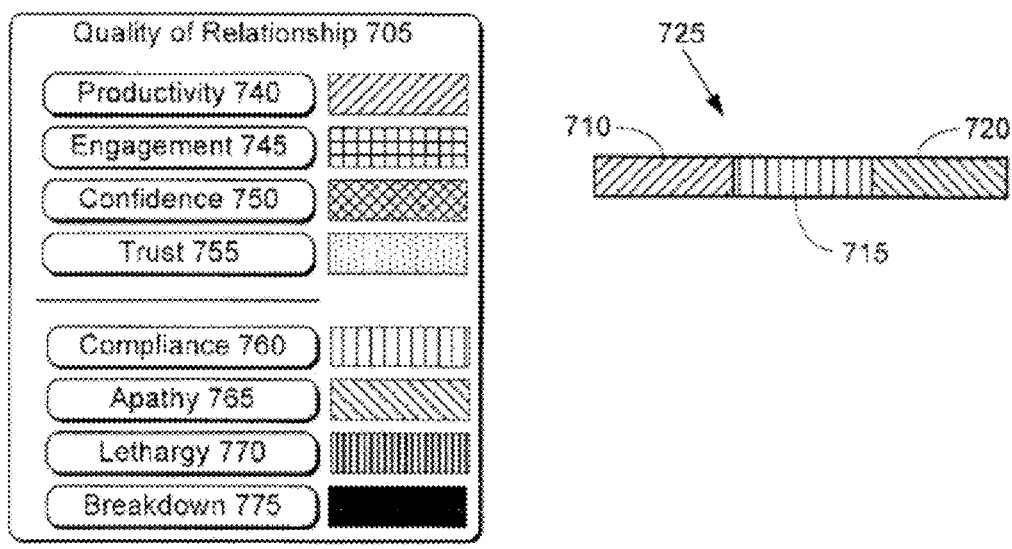
FIG. 10 illustrates quality of relationship values and associated relationship indicator having icons that represent past, present, and predictive values according to one embodiment of the present disclosure.

FIG. 10 illustrates quality of relationship values 705 and an associated relationship indicator 725 having icons (e.g., 710, 715, and 720) that represent past, present, and predictive values, respectively, according to some example embodiments.

The actionable analytics section 150 can generate the relationship indicator (e.g., 725) for one or more relationships. The relationship indicator 725 includes an indicator for a past quality of relationship value 710 associated with the historical analytics 155, a present quality of relationship value 715 associated with the real-time analytics 160, and a predictive quality of relationship value 720 associated with the predictive analytics 165.

The relationship indicator can include three adjacent or proximately located icons. For example, a first icon 710 can indicate the past quality of relationship value, a second icon 715 can indicate the present or real-time quality of relationship value, and a third icon 720 can indicate the predictive quality of relationship value. It will be understood that while the icons show a different pattern for each quality of relationship value, alternatively, each icon can show a different color or shape to distinguish one quality of relationship value from another. In some embodiments, a gradient of colors is used such that an individual color within the gradient of colors represents an individual quality of relationship value. Indeed, any differentiating aspect of the icons can be used to allow an observer to quickly distinguish and identify the quality of relationship value associated with the past, present, and predicted future quality of relationship.

More specifically, the past quality of relationship value indicated by the first icon 710 includes a representation for productivity 740, engagement 745, confidence 750, trust 755, compliance 760, apathy 765, lethargy 770, and/or breakdown 775. Similarly, the present quality of relationship value indicated by the second icon 715 includes a representation for productivity 740, engagement 745, confidence 750, trust 755, compliance 760, apathy 765, lethargy 770, and/or breakdown 775. The predictive quality of relationship value indicated by the third icon 720 includes a representation for productivity 740, engagement 745, confidence 750, trust 755, compliance 760, apathy 765, lethargy 770, and/or breakdown 775.

Back-End

The present disclosure provides a telemetry system that can include a microprocessor with at least one central processing unit (CPU) or multiple CPUs, computer memory, interface electronics and conditioning electronics configured to receive a signal from the wearable device and/or the sensor. In one embodiment, all or a portion of the conditioning electronics are at the wearable device.

In one embodiment, the CPU includes a processor, which can be a microprocessor, read only memory used to store instructions that the processor may fetch in executing its program, a random access memory (RAM) used by the processor to store information and a master dock. The microprocessor is controlled by the master clock that provides a master timing signal used to sequence the microprocessor through its internal states in its execution of each processed instruction. In one embodiment, the microprocessor, and especially the CPU, is a low power device, such as CMOS, as is the necessary logic used to implement the processor design. The telemetry system can store information about the user's messages, display and activities in memory.

This memory may be external to the CPU but can reside in the RAM. The memory may be nonvolatile such as battery backed RAM or electrically erasable programmable read only memory (EEPROM). Signals from the messages, display and/or sensors can be in communication with conditioning electronics that with a filter, with scale and can determine the presence of certain conditions. This conditioning essentially cleans the signal up for processing by CPU and in some cases preprocesses the information. These signals are then passed to interface electronics, which converts the analog voltage or currents to binary ones and zeroes understood by the CPU. The telemetry system can also provide for intelligence in the signal processing, such as achieved by the CPU in evaluating historical data.

In one embodiment, the actions, expressions and the like of the user wearing the wearable device can be used for different activities and can have different classifications at the telemetry system.

The classification can be in response to the user's location, where the user spends it time, messages, and communications, determination of working relationships, family relationships, social relationships, and the like. These last few determinations can be based on the time of day, the types of interactions, comparisons of the amount of time with others, the time of day, a frequency of contact with others, the type of contact with others, the location and type of place where the user is at, and the like. These results are stored in the database.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

Cloud Infrastructure

Figure 11A:
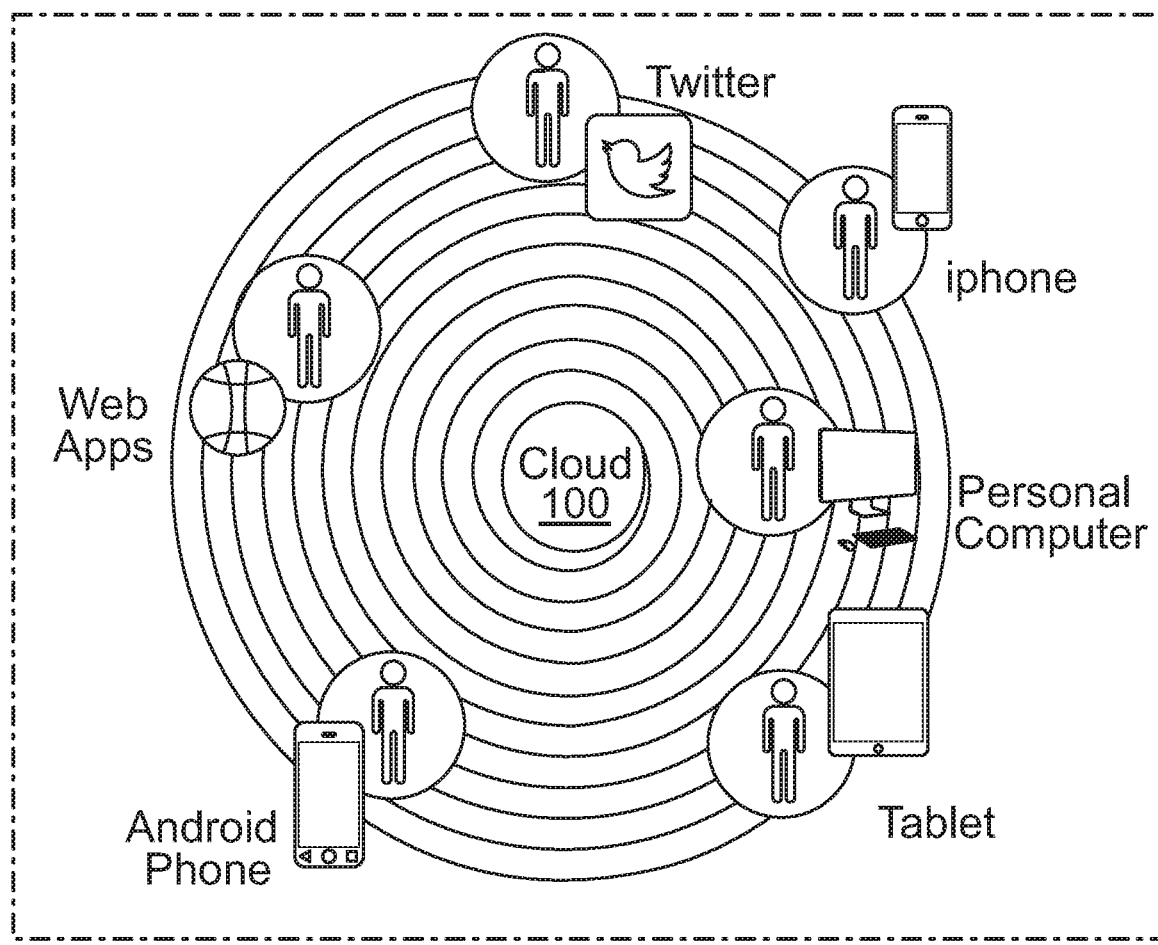
FIGS. 11A-11E illustrate embodiments of a cloud infrastructure that can be used with the wearable device of the present disclosure.

The present disclosure provides a cloud infrastructure. FIG. 11A represents a logical diagram of the cloud infrastructure. As shown, the Cloud encompasses web applications, mobile devices, personal computer and/or laptops and social networks, such as, Twitter®. ("Twitter®" is a trademark of Twitter Inc.). It will be appreciated that other social networks can be included in the cloud and Twitter® has been given as a specific example. Therefore, every component forms part of the cloud which comprises servers, applications and clients as defined above.

With reference to FIGS. 11B through 11E, the cloud based system can facilitate adjusting utilization and/or allocation of hardware resource(s) to remote clients. The system can include a third party service provider that can concurrently service requests from several clients without user perception of degraded computing performance as compared to conventional techniques where computational tasks can be performed upon a client or a server within a proprietary intranet. The third party service provider (e.g., "cloud") supports a collection of hardware and/or software resources. The hardware and/or software resources can be maintained by an off-premises party, and the resources can be accessed and utilized by identified users over Network System. Resources provided by the third party service provider can be centrally located and/or distributed at various geographic locations. For example, the third party service provider can include any number of data center machines that provide resources. The data center machines can be utilized for storing/retrieving data, effectuating computational tasks, rendering graphical outputs, routing data, and so forth.

According to an illustration, the third party service provider can provide any number of resources such as data storage services, computational services, word processing services, electronic mail services, presentation services, spreadsheet services, gaming services, web syndication services (e.g., subscribing to a RSS feed), and any other services or applications that are conventionally associated with personal computers and/or local servers. Further, utilization of any number of third party service providers similar to the third party service provider is contemplated. According to an illustration, disparate third party service providers can be maintained by differing off-premise parties and a user can employ, concurrently, at different times, and the like, all or a subset of the third party service providers.

By leveraging resources supported by the third party service provider, limitations commonly encountered with respect to hardware associated with clients and servers within proprietary intranets can be mitigated. Off-premises parties, instead of users of clients or Network System administrators of servers within proprietary intranets, can maintain, troubleshoot, replace and update the hardware resources. Further, for example, lengthy downtimes can be mitigated by the third party service provider utilizing redundant resources; thus, if a subset of the resources are being updated or replaced, the remainder of the resources can be utilized to service requests from users. According to this example, the resources can be modular in nature, and thus, resources can be added, removed, tested, modified, etc. while the remainder of the resources can support servicing user requests. Moreover, hardware resources supported by the third party service provider can encounter fewer constraints with respect to storage, processing power, security, bandwidth, redundancy, graphical display rendering capabilities, etc. as compared to conventional hardware associated with clients and servers within proprietary intranets.

The system can include a client device, which can be the wearable device and/or the wearable device user's mobile device that employs resources of the third party service provider. Although one client device is depicted, it is to be appreciated that the system can include any number of client devices similar to the client device, and the plurality of client devices can concurrently utilize supported resources. By way of illustration, the client device can be a desktop device (e.g., personal computer), mobile device, and the like.

Further, the client device can be an embedded system that can be physically limited, and hence, it can be beneficial to leverage resources of the third party service provider.

Resources can be shared amongst a plurality of client devices subscribing to the third party service provider. According to an illustration, one of the resources can be at least one central processing unit (CPU), where CPU cycles can be employed to effectuate computational tasks requested by the client device. Pursuant to this illustration, the client device can be allocated a subset of an overall total number of CPU cycles, while the remainder of the CPU cycles can be allocated to disparate client device(s). Additionally or alternatively, the subset of the overall total number of CPU cycles allocated to the client device can vary over time. Further, a number of CPU cycles can be purchased by the user of the client device. In accordance with another example, the resources can include data store(s) that can be employed by the client device to retain data. The user employing the client device can have access to a portion of the data store(s) supported by the third party service provider, while access can be denied to remaining portions of the data store(s) (e.g., the data store(s) can selectively mask memory based upon user/device identity, permissions, and the like). It is contemplated that any additional types of resources can likewise be shared.

The third party service provider can further include an interface component that can receive input(s) from the client device and/or enable transferring a response to such input(s) to the client device (as well as perform similar communications with any disparate client devices). According to an example, the input(s) can be request(s), data, executable program(s), etc. For instance, request(s) from the client device can relate to effectuating a computational task, storing/retrieving data, rendering a user interface, and the like via employing one or more resources. Further, the interface component can obtain and/or transmit data over a Network System connection. According to an illustration, executable code can be received and/or sent by the interface component over the Network System connection. Pursuant to another example, a user (e.g., employing the client device) can issue commands via the interface component.

In one embodiment, the third party service provider includes a dynamic allocation component that apportions resources, which as a non-limiting example can be hardware resources supported by the third party service provider to process and respond to the input(s) (e.g., request(s), data, executable program(s), and the like, obtained from the client device.

Although the interface component is depicted as being separate from the dynamic allocation component, it is contemplated that the dynamic allocation component can include the interface component or a portion thereof. The interface component can provide various adaptors, connectors, channels, communication paths, etc. to enable interaction with the dynamic allocation component.

Figure 11B:
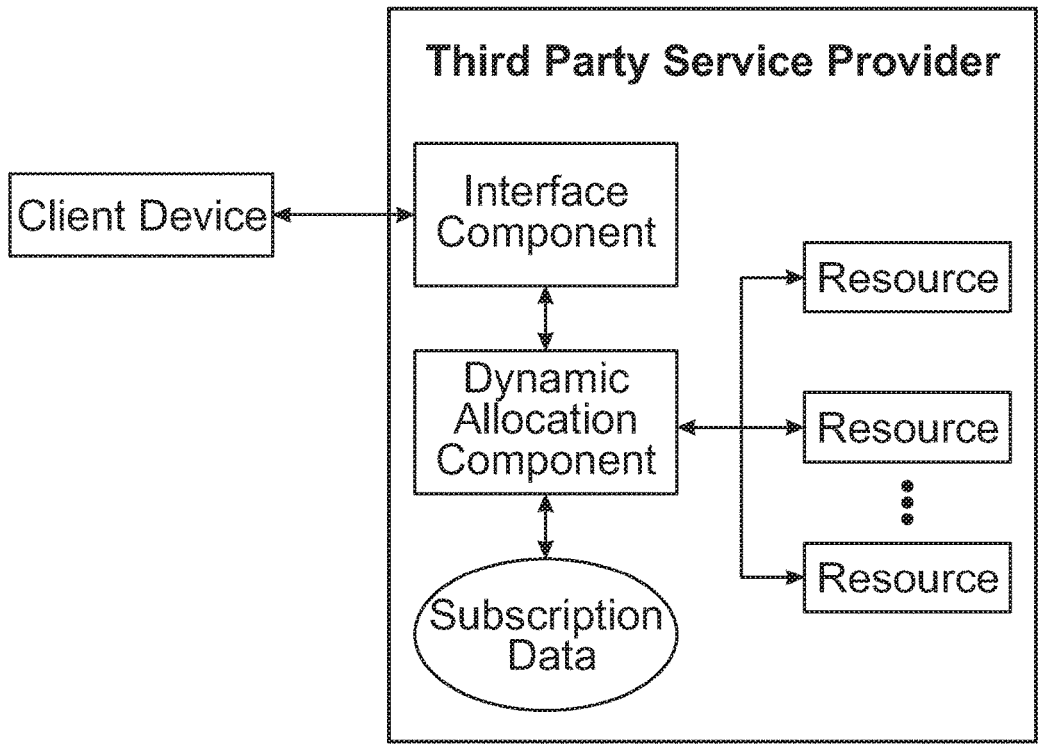
Figure 11C:
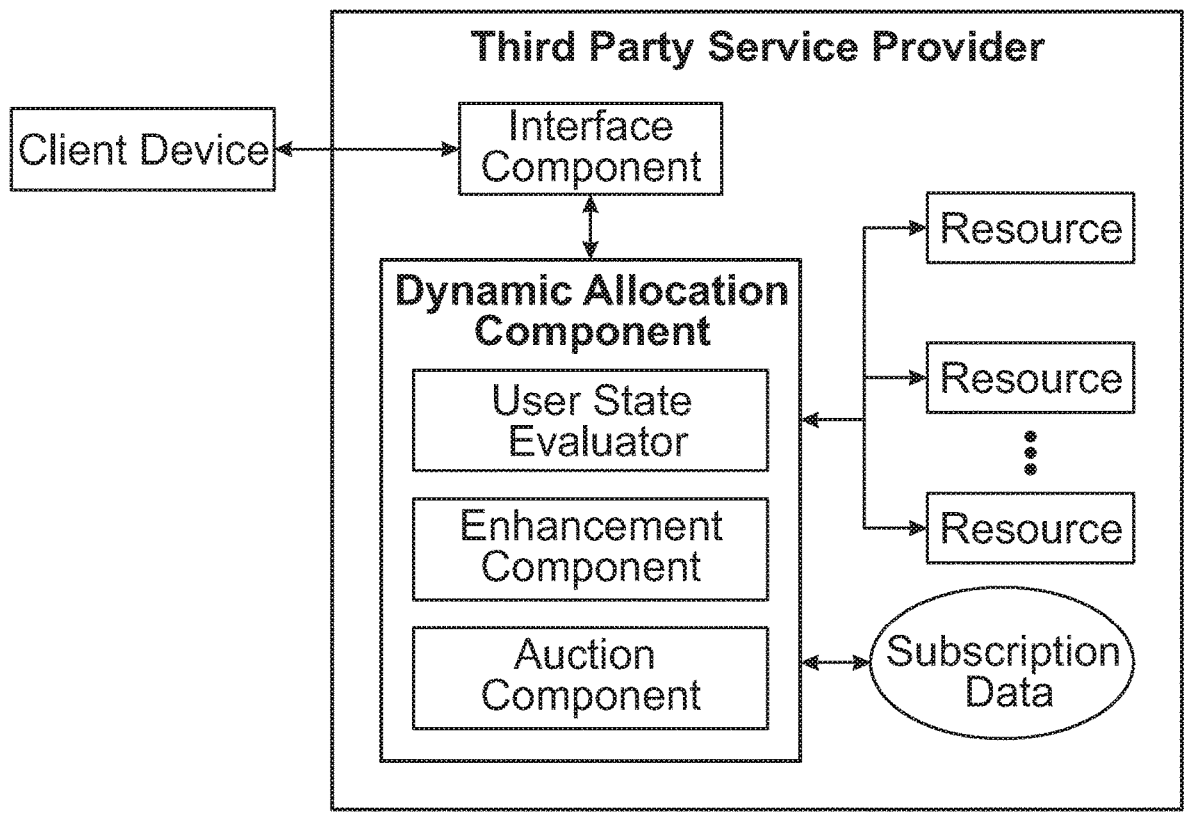

With reference to FIG. 11B, a system includes the third party service provider that supports any number of resources (e.g., hardware, software, and firmware) that can be employed by the client device and/or disparate client device(s) not shown. The third party service provider further comprises the interface component that receives resource utilization requests, including but not limited to requests to effectuate operations utilizing resources supported by the third party service provider from the client device and the dynamic allocation component that partitions resources, including but not limited to, between users, devices, computational tasks, and the like. Moreover, the dynamic allocation component can further include a user state evaluator, an enhancement component and an auction component.

The user state evaluator can determine a state associated with a user and/or the client device employed by the user, where the state can relate to a set of properties. For instance, the user state evaluator can analyze explicit and/or implicit information obtained from the client device (e.g., via the interface component) and/or retrieved from memory associated with the third party service provider (e.g., preferences indicated in subscription data). State related data yielded by the user state evaluator can be utilized by the dynamic allocation component to tailor the apportionment of resources.

In one embodiment, the user state evaluator can consider characteristics of the client device, which can be used to apportion resources by the dynamic allocation component. For instance, the user state evaluator can identify that the client device is a mobile device with limited display area. Thus, the dynamic allocation component can employ this information to reduce resources utilized to render an image upon the client device since the cellular telephone may be unable to display a rich graphical user interface.

Moreover, the enhancement component can facilitate increasing an allocation of resources for a particular user and/or client device.

Figure 11D:
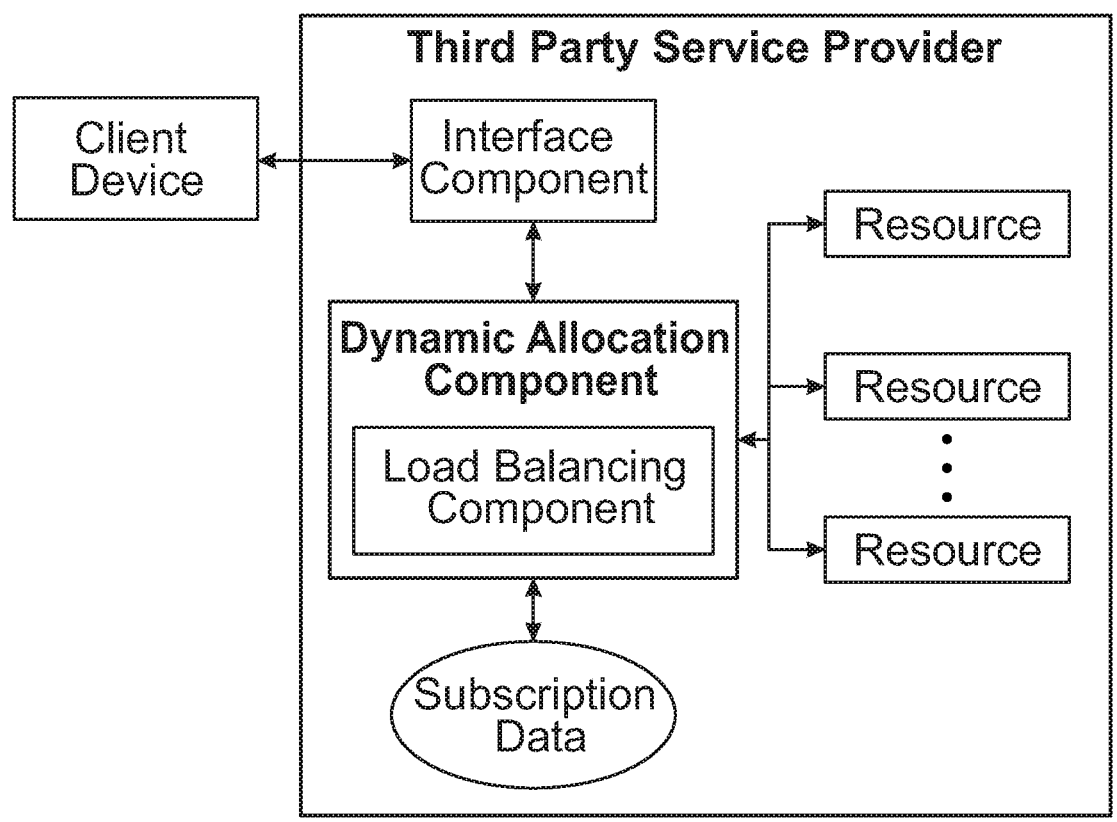

Referring to FIG. 11D, illustrated is a system that employs load balancing to optimize utilization of resources. The system includes the third party service provider that communicates with the client device (and/or any disparate client device(s) and/or disparate third party service provider(s)). The third party service provider can include the interface component that transmits and/or receives data from the client device and the dynamic allocation component that allots resources. The dynamic allocation component can further comprise a load balancing component that optimizes utilization of resources.

In one embodiment, the load balancing component can monitor resources of the third party service provider to detect failures. If a subset of the resources fails, the load balancing component can continue to optimize the remaining resources. Thus, if a portion of the total number of processors fails, the load balancing component can enable redistributing cycles associated with the non-failing processors.

Figure 11E:
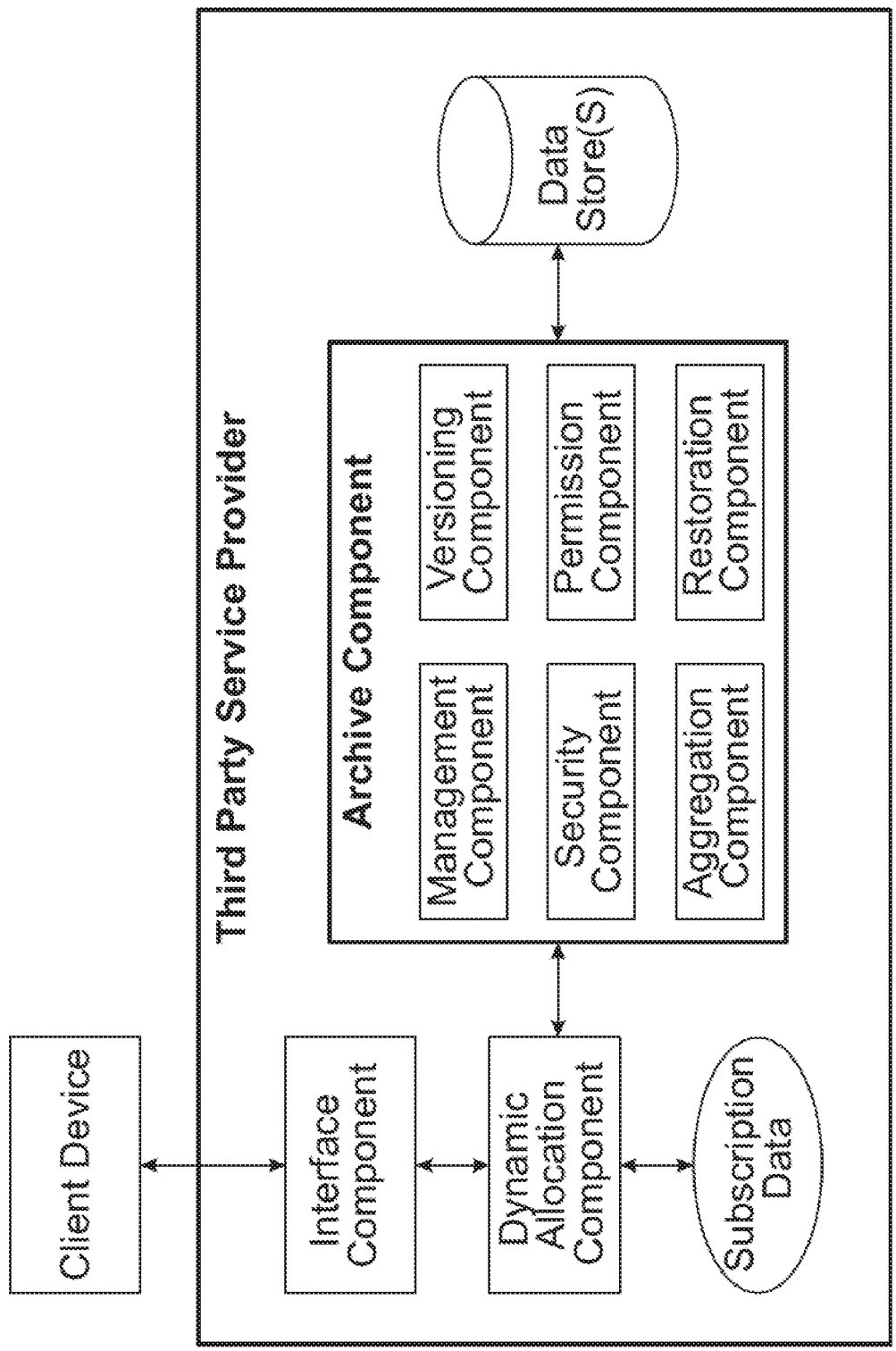

Referring to FIG. 11E, a system is illustrated that archives and/or analyzes data utilizing the third party service provider. The third party service provider can include the interface component that enables communicating with the client device. Further, the third party service provider comprises the dynamic allocation component that can apportion data retention resources, for example. Moreover, the third party service provider can include an archive component and any number of data store(s). Access to and/or utilization of the archive component and/or the data store(s) by the client device (and/or any disparate client device(s)) can be controlled by the dynamic allocation component. The data store(s) can be centrally located and/or positioned at differing geographic locations. Further, the archive component can include a management component, a versioning component, a security component, a permission component, an aggregation component, and/or a restoration component.

The data store(s) can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAIVI), and Rambus dynamic RAM (RDRAM). The data store(s) of the subject systems and methods is intended to comprise, without being limited to, these and any other suitable types of memory. In addition, it is to be appreciated that the data store(s) can be a server, a database, a hard drive, and the like.

The management component facilitates administering data retained in the data store(s). The management component can enable providing multi-tiered storage within the data store(s), for example. According to this example, unused data can be aged-out to slower disks and important data used more frequently can be moved to faster disks; however, the claimed subject matter is not so limited. Further, the management component can be utilized (e.g., by the client device) to organize, annotate, and otherwise reference content without making it local to the client device. Pursuant to an illustration, enormous video files can be tagged via utilizing a cell phone. Moreover, the management component enables the client device to bind metadata, which can be local to the client device, to file streams (e.g., retained in the data store(s)); the management component can enforce and maintain these bindings.

Additionally or alternatively, the management component can allow for sharing data retained in the data store(s) with disparate users and/or client devices. For example, fine-grained sharing can be supported by the management component.

The versioning component can enable retaining and/or tracking versions of data. For instance, the versioning component can identify a latest version of a document (regardless of a saved location within data store(s)).

The security component limits availability of resources based on user identity and/or authorization level. For instance, the security component can encrypt data transferred to the client device and/or decrypt data obtained from the client device. Moreover, the security component can certify and/or authenticate data retained by the archive component.

The permission component can enable a user to assign arbitrary access permissions to various users, groups of users and/or all users.

Further, the aggregation component assembles and/or analyzes collections of data. The aggregation component can seamlessly incorporate third party data into a particular user's data.

The restoration component rolls back data retained by the archive component. For example, the restoration component can continuously record an environment associated with the third party service provider. Further, the restoration component can playback the recording.

Light Emitting Diodes

Figure 17:
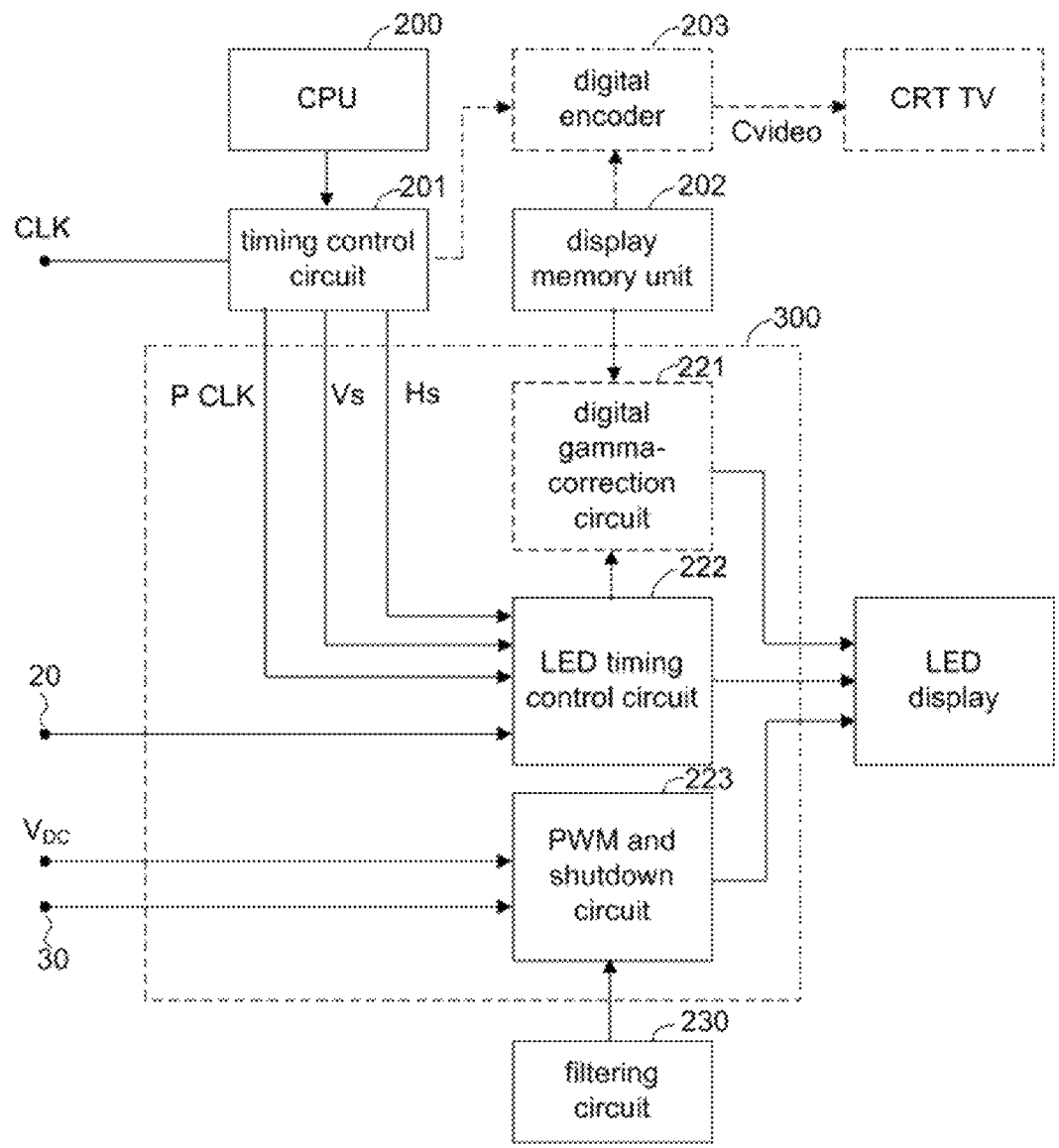
FIG. 17 illustrates a light emitting diode (LED) driving circuit.

FIG. 17 illustrates a light emitting diode (LED) driving circuit, as may be employed for use with displays and display devices of the present disclosure. The LED driving circuit is fabricated in a displaying system which also includes a driving circuit. The driving circuit includes a CPU 200, a timing control circuit 201, a display memory unit 202 and a digital encoder 203, which are operated cooperatively to produce a signal used to drive the display. The output signals of the CPU 200 are transferred via the timing control circuit 201 to the digital encoder 203. Meanwhile, the data of a digital dot matrix stored in the display memory unit 202 are transferred to the digital encoder 203. It is noted that the display memory unit 202, for storing the digital image signals provided by the CPU 200, is an optional device. So under the consideration of saving space or cost, the display memory unit 202can be left out. And the digital dot matrix data can be conveyed to the digital encoder 203 directly from the CPU 200.

In one embodiment the LED driving circuit is the bottom part of the circuit of FIG. 2 that is enclosed in a dashed box indicated by the reference numeral 300. It is devised to drive an LED display to generate the digitized video image stored in the display memory unit 202 under control of the horizontal synchronizing signal Hs, the vertical synchronizing signal Vs and the P-CLK signal from the timing control circuit 201. In practice, the LED driving circuit 300 can be implemented together with the digital LED, nanotechnology and other related display technology based wrist band driving circuit in an LSI integrated circuit. Alternatively, the LED driving circuit 300can be an independent functional unit used to drive an individual LED display.

In one embodiment the LED driving circuit 300 includes a digital gamma-correction circuit 221, an LED timing control circuit 222 and a PWM and shutdown circuit 223.

In operation, the output horizontal synchronizing signal Hs, the vertical Synchronizing signal Vs and the P-CLK signal from the timing control circuit 201 are directly transferred to the LED timing control circuit 222 in the LED driving circuit 300. The LED timing control circuit 222 then processes these signals to thereby generate the various video control signals required to drive the LED display. The LED display can be an organic light emitting diode (OLED) display. The LED display may be flexible.

In one embodiment the LED timing control circuit 222 further includes a resolution setting unit 20 that allows the user to set a desired resolution for the LED display to generate the video image. When a desired resolution is set, the LED timing control circuit 222 can adjust the LED display to the user-set resolution simply by changing the states of logic signals that are used to control the resolution of the LED display. Compared to the prior art of FIG. 1 in which the peripheral components of a circuit may be changed when a different resolution is to be set, it is apparent that the invention is more convenient to use. The circuit may be a phase-locked loop (PLL) circuit.

The digitized video image that is to be displayed on the LED display is transferred directly from the display memory unit 202 to the digital gamma-correction circuit 221. The digital gamma-correction circuit 221 performs a digital gamma-correction process on the digitized video signal.

Furthermore, the LED driving circuit 300 utilizes the PWM and shutdown circuit 223 to provide all the DC voltages needed to power the various parts of the LED display. In operation, the PWM and shutdown circuit 223receives an external voltage VDC and, in conjunction with the filtering circuit 230, converts the voltage VDC into the various DC voltages that are used to power the various parts of the LED display.

The PWM and shutdown circuit 223 further includes a shutdown trigger input port 30. When the LED display has been idle for a preset period, a shutdown trigger signal will be input to the PWM and shutdown circuit 223 via this port 30, causing the PWM and shutdown circuit 223 to shut down the LED display for the purpose of saving power consumption.

In one embodiment the digitized video signals to be directly digitally processed so that the video image can be displayed without much loss in fidelity. It also allows the driving circuit to be more cost-effective to implement and to be constructed with a reduced number of circuit components. The LED driving circuit consumes less power and can be operated without the need to make the many analog adjustments of the prior art.

In one embodiment the digital gamma-correction circuit 221 performs the gamma correction on the video signal in a digital manner instead of analog manner as in the prior art. The gamma correction can thus be performed based on the characteristics of the LED display to provide the optimal and finest correction.

In one embodiment the digital nature of the LED driving circuit of the invention allows the various resolutions of the LED display to be selectable through a digital unit (in this case, the resolution setting unit 20). The resolution setting is therefore more convenient than the prior art in which some peripheral components of the PLL circuit need to be replaced when a different resolution is to be set.

Mobile Devices

Figure 12:
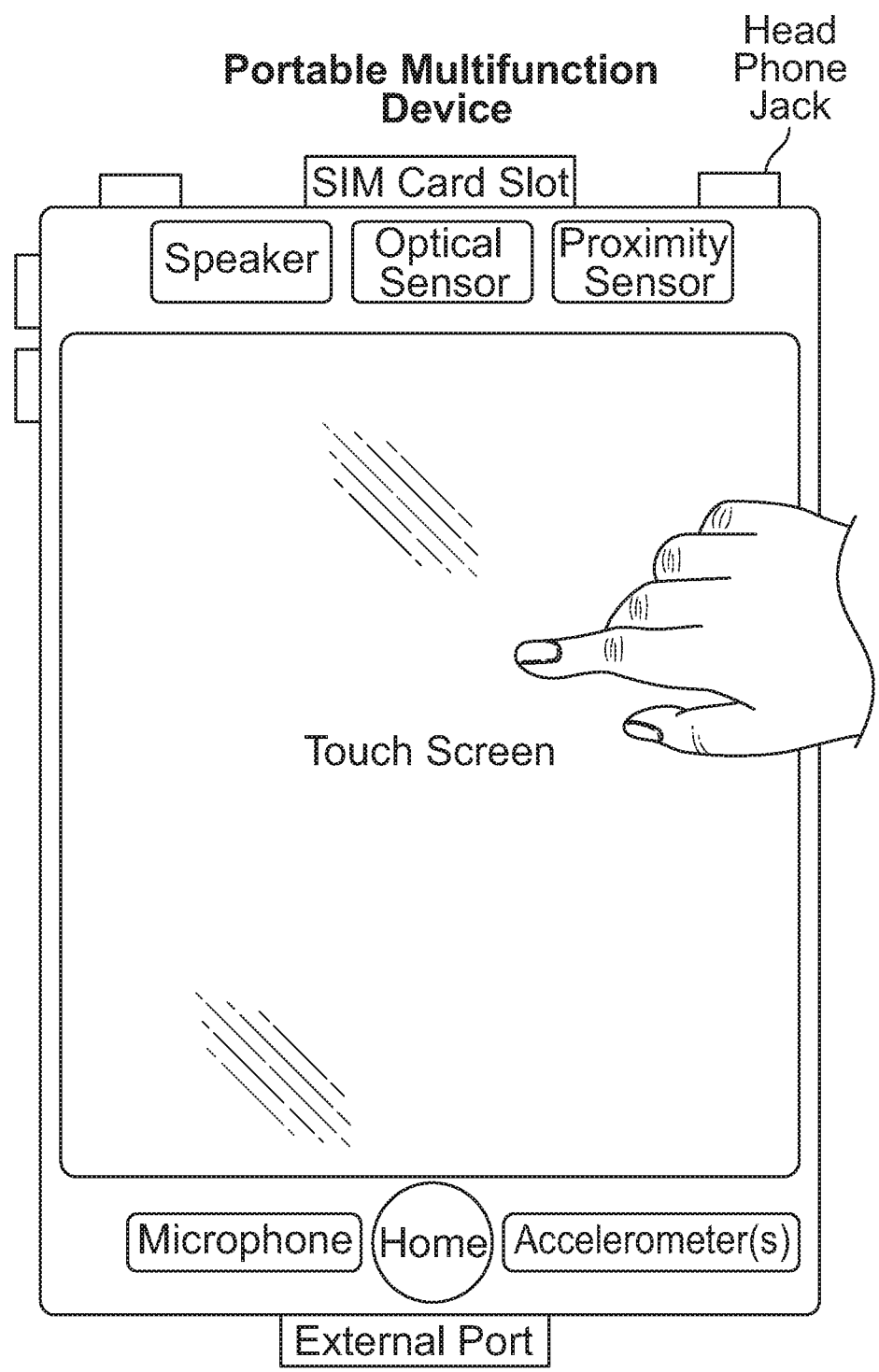
FIGS. 12, 13 and 14 are diagrams illustrating embodiments of a mobile or computing device that can be used with the wearable device of the present disclosure.
Figure 13:
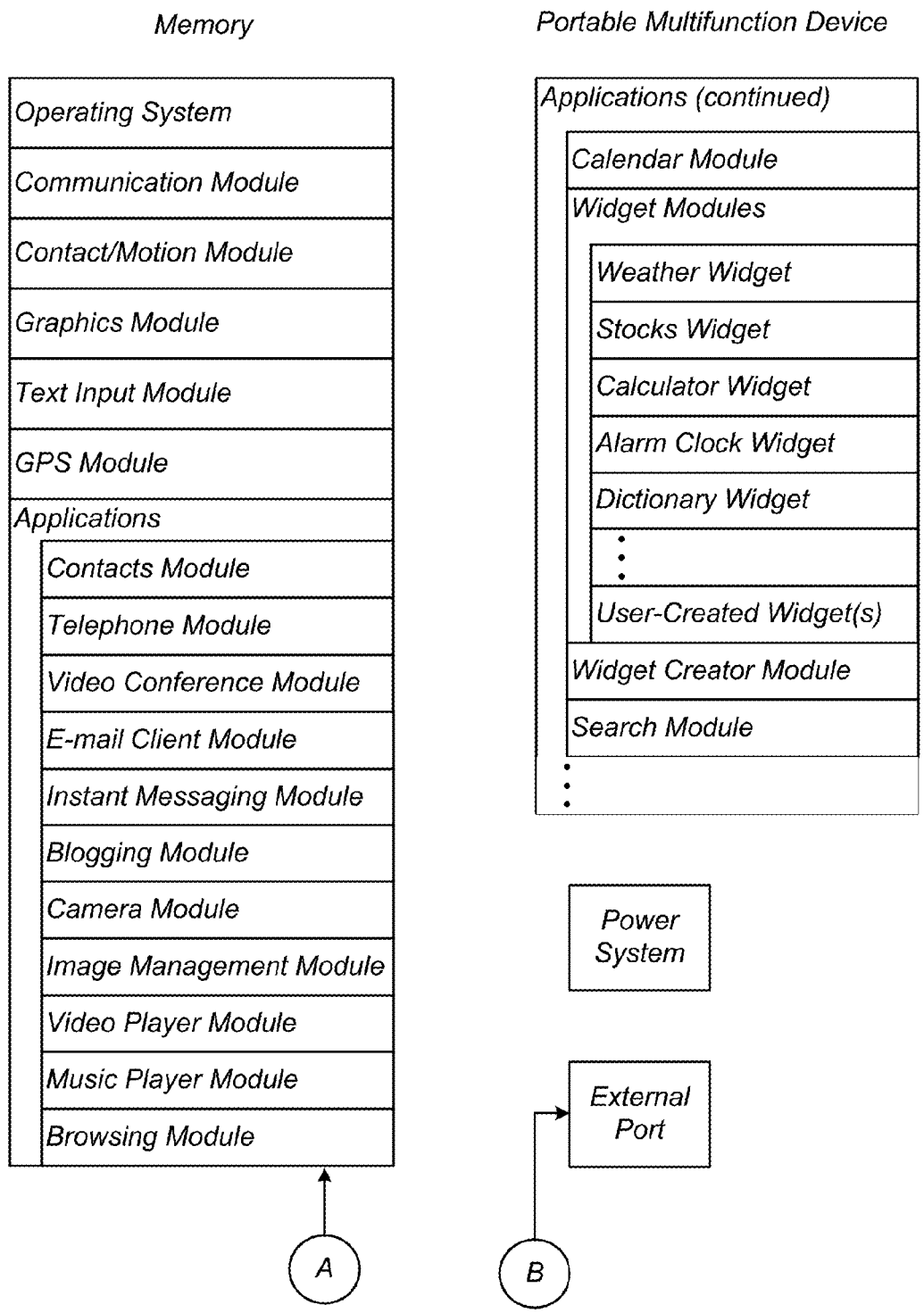
Figure 14:
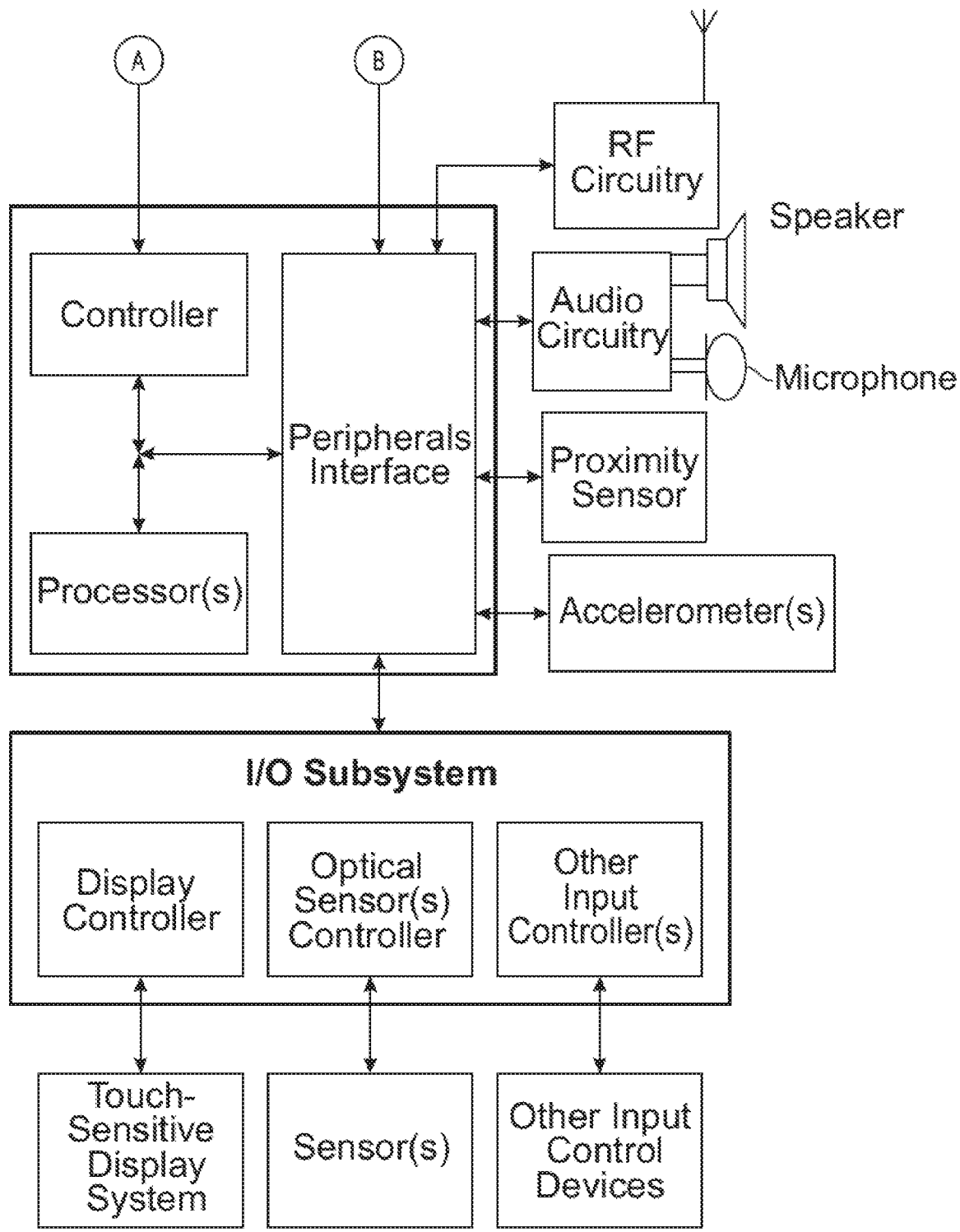

Referring to FIGS. 12, 13 and 14, diagrams are provided illustrating a mobile or computing device that can be used with wearable devices of the present disclosure.

Referring to FIG. 12, the mobile or computing device can include a display that can be a touch sensitive display. The touch-sensitive display is sometimes called a "touch screen" for convenience, and may also be known as or called a touch-sensitive display system. The mobile or computing device may include a memory (which may include one or more computer readable storage mediums), a memory controller, one or more processing units (CPU's), a peripherals interface, Network Systems circuitry, including but not limited to RF circuitry, audio circuitry, a speaker, a microphone, an input/output (I/O) subsystem, other input or control devices, and an external port. In some examples, the touch-sensitive display is a capacitive or resistive display. The mobile or computing device may include one or more optical sensors. These components may communicate over one or more communication buses or signal lines.

It will be appreciated that the mobile or computing device is only one example of a portable multifunction mobile or computing device, and that the mobile or computing device may have more or fewer components than shown, may combine two or more components, or a may have a different configuration or arrangement of the components. The various components shown in FIG. 14 may be implemented in hardware, software or a combination of hardware and software, including one or more signal processing and/or application specific integrated circuits.

Memory may include high-speed random access memory and may also include non-volatile memory, such as one or more magnetic disk storage devices, flash memory devices, or other non-volatile solid-state memory devices. Access to memory by other components of the mobile or computing device, such as the CPU and the peripherals interface, may be controlled by the memory controller.

The peripherals interface couples the input and output peripherals of the device to the CPU and memory. The one or more processors run or execute various software programs and/or sets of instructions stored in memory to perform various functions for the mobile or computing device and to process data.

In some embodiments, the peripherals interface, the CPU, and the memory controller may be implemented on a single chip, such as a chip. In some other embodiments, they may be implemented on separate chips.

The Network System circuitry receives and sends signals, including but not limited to RF, also called electromagnetic signals. The Network System circuitry converts electrical signals to/from electromagnetic signals and communicates with communications Network Systems and other communications devices via the electromagnetic signals. The Network Systems circuitry may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The Network Systems circuitry may communicate with Network Systems and other devices by wireless communication.

The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), BLUETOOTH®, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry, the speaker, and the microphone provide an audio interface between a user and the mobile or computing device. The audio circuitry receives audio data from the peripherals interface, converts the audio data to an electrical signal, and transmits the electrical signal to the speaker. The speaker converts the electrical signal to human-audible sound waves. The audio circuitry also receives electrical signals converted by the microphone from sound waves. The audio circuitry converts the electrical signal to audio data and transmits the audio data to the peripherals interface for processing. Audio data may be retrieved from and/or transmitted to memory and/or the Network Systems circuitry by the peripherals interface. In some embodiments, the audio circuitry can also include a headset jack (FIG. 12). The headset jack provides an interface between the audio circuitry and removable audio input/output peripherals, such as output-only headphones or a headset with both output (e.g., a headphone for one or both ears) and input (e.g., a microphone).

The I/O subsystem couples input/output peripherals on the mobile or computing device, such as the touch screen and other input/control devices, to the peripherals interface. The I/O subsystem may include a display controller and one or more input controllers for other input or control devices. The one or more input controllers receive/send electrical signals from/to other input or control devices. The other input/control devices may include physical buttons (e.g., push buttons, rocker buttons, etc.), dials, slider switches, and joysticks, click wheels, and so forth. In some alternate embodiments, input controller(s) may be coupled to any (or none) of the following: a keyboard, infrared port, USB port, and a pointer device such as a mouse. The one or more buttons may include an up/down button for volume control of the speaker and/or the microphone. The one or more buttons may include a push button. A quick press of the push button may disengage a lock of the touch screen or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button may turn power to the mobile or computing device on or off. The user may be able to customize a functionality of one or more of the buttons. The touch screen is used to implement virtual or soft buttons and one or more soft keyboards.

The touch-sensitive touch screen provides an input interface and an output interface between the device and a user. The display controller receives and/or sends electrical signals from/to the touch screen. The touch screen displays visual output to the user. The visual output may include graphics, text, icons, video, and any combination thereof (collectively termed "graphics"). In some embodiments, some or all of the visual output may correspond to user-interface objects, further details of which are described below.

A touch screen has a touch-sensitive surface, sensor or set of sensors that accepts input from the user based on haptic and/or tactile contact. The touch screen and the display controller (along with any associated modules and/or sets of instructions in memory) detect contact (and any movement or breaking of the contact) on the touch screen and converts the detected contact into interaction with user-interface objects (e.g., one or more soft keys, icons, web pages or images) that are displayed on the touch screen. In an exemplary embodiment, a point of contact between a touch screen and the user corresponds to a finger of the user.

The touch screen may use LCD (liquid crystal display) technology, or LPD (light emitting polymer display) technology, although other display technologies may be used in other embodiments. The touch screen and the display controller may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen.

A touch-sensitive display in some embodiments of the touch screen may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in their entirety. However, a touch screen displays visual output from the portable mobile or computing device, whereas touch sensitive tablets do not provide visual output.

A touch-sensitive display in some embodiments of the touch screen may be as described in the following applications: (1) U.S. patent application Ser. No. 11/381,313, "Multipoint Touch Surface Controller," filed May 12, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen may have a resolution in excess of 1000 dpi. In an exemplary embodiment, the touch screen has a resolution of approximately 1060 dpi. The user may make contact with the touch screen using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the mobile or computing device may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen or an extension of the touch-sensitive surface formed by the touch screen.

In some embodiments, the mobile or computing device may include a physical or virtual click wheel as an input control device. A user may navigate among and interact with one or more graphical objects (henceforth referred to as icons) displayed in the touch screen by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller as well as one or more of the modules and/or sets of instructions in memory. For a virtual click wheel, the click wheel and click wheel controller may be part of the touch screen and the display controller, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The mobile or computing device also includes a power system for powering the various components. The power system may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The mobile or computing device may also include one or more sensors, including, but not limited to, optical sensors. FIG. 14 illustrates how an optical sensor coupled to an optical sensor controller in I/O subsystem. The optical sensor may include charge-coupled device (CCD) or complementary metal-oxide semiconductor (CMOS) phototransistors. The optical sensor receives light from the environment, projected through one or more lens, and converts the light to data representing an image. In conjunction with an imaging module 58 (also called a camera module); the optical sensor may capture still images or video. In some embodiments, an optical sensor is located on the back of the mobile or computing device, opposite the touch screen display on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor can be changed by the user (e.g., by rotating the lens and the sensor in the device housing) so that a single optical sensor may be used along with the touch screen display for both video conferencing and still and/or video image acquisition.

The mobile or computing device may also include one or more proximity sensors. In one embodiment, the proximity sensor is coupled to the peripherals interface. Alternately, the proximity sensor may be coupled to an input controller in the I/O subsystem. The proximity sensor may perform as described in U.S. patent application Ser. No. 11/241,839, "Proximity Detector In Handheld Device," filed Sep. 30, 2005; Ser. No. 11/240,788, "Proximity Detector In Handheld Device," filed Sep. 30, 2005; Ser. No. 13/096,386, "Using Ambient Light Sensor To Augment Proximity Sensor Output"; Ser. No. 13/096,386, "Automated Response To And Sensing Of User Activity In Portable Devices," filed Oct. 24, 2006; and Ser. No. 11/638,251, "Methods And Systems For Automatic Configuration Of Peripherals," which are hereby incorporated by reference in their entirety. In some embodiments, the proximity sensor turns off and disables the touch screen when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

In some embodiments, the software components stored in memory may include an operating system, a communication module (or set of instructions), a contact/motion module (or set of instructions), a graphics module (or set of instructions), a text input module (or set of instructions), a Global Positioning System (GPS) module (or set of instructions), and applications (or set of instructions).

The operating system (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module facilitates communication with other devices over one or more external ports and also includes various software components for handling data received by the Network Systems circuitry and/or the external port. The external port (e.g., Universal Serial Bus (USB), FIREWIRE, etc.) is adapted for coupling directly to other devices or indirectly over Network System. In some embodiments, the external port is a multi-pin (e.g., 30-pin) connector that is the same as, or similar to and/or compatible with the 30-pin connector used on iPod (trademark of Apple Computer, Inc.) devices.

The contact/motion module may detect contact with the touch screen (in conjunction with the display controller) and other touch sensitive devices (e.g., a touchpad or physical click wheel). The contact/motion module includes various software components for performing various operations related to detection of contact, such as determining if contact has occurred, determining if there is movement of the contact and tracking the movement across the touch screen, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module and the display controller also detect contact on a touchpad. In some embodiments, the contact/motion module and the controller detects contact on a click wheel.

Examples of other applications that may be stored in memory include other word processing applications, JAVA-enabled applications, encryption, digital rights management, voice recognition, and voice replication.

In conjunction with touch screen, display controller, contact module, graphics module, and text input module, a contacts module may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone, video conference, e-mail, or IM; and so forth.

Wearable Device Positioned at the Mobile Device

Figure 18:
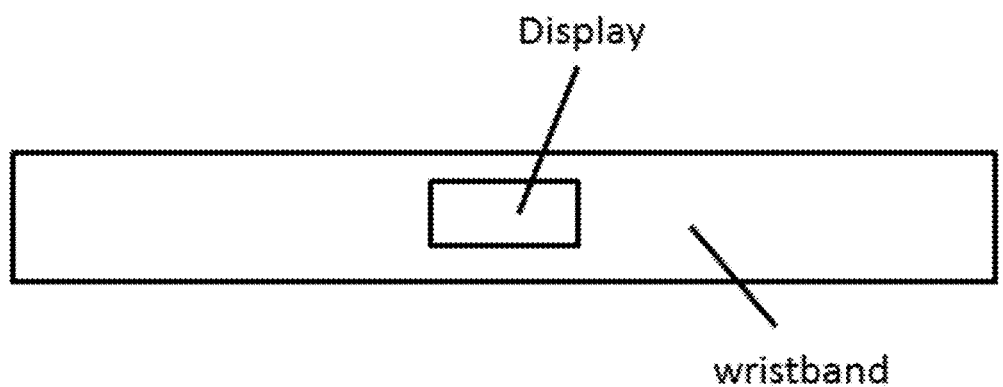
FIG. 18 shows a display mounted on a wristband.

Displays of the present disclosure can be used in various settings. For example, a display can be mounted on a wrist band, as shown in FIG. 18. As another example, a display can be mounted on a mobile device, an article of clothing or other object. FIGS. 19A-19K show a wearable device that can be mounted on various objects, such as a mobile device. In FIGS. 19A-19E, the display device can be mountable on a mobile device as a case. As a non-limiting example the wearable device fits like a case that wraps around and is then coupled to the mobile device, similar to that of a regular mobile device protective case. The case has an OLED and/or flexible OLED. The wearable device communicates with the mobile device. In one embodiment the wearable devices are simple screens expressing photos, images, words just like those displayed on a wearable device.

Figure 19A:
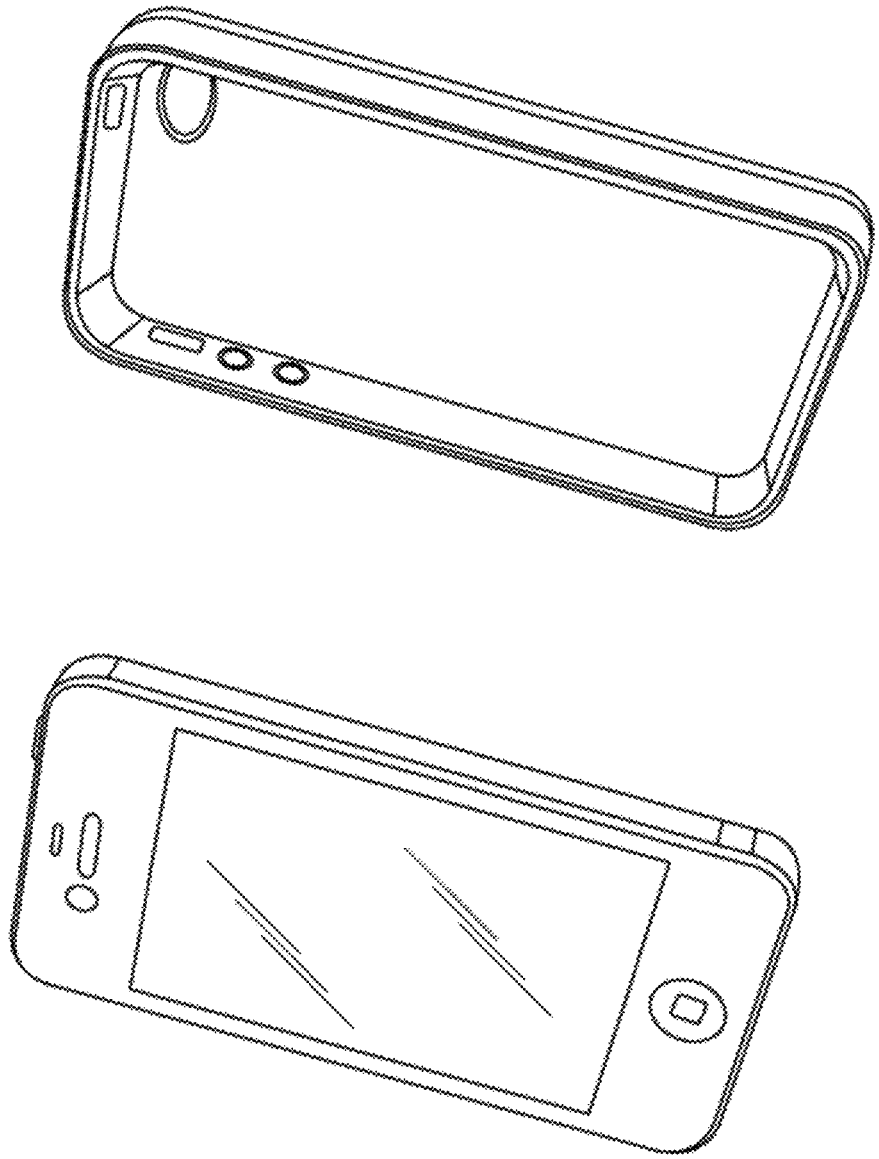
FIGS. 19A-19K show a wearable device that can be mounted on various objects, such as a mobile device.
Figure 19C:
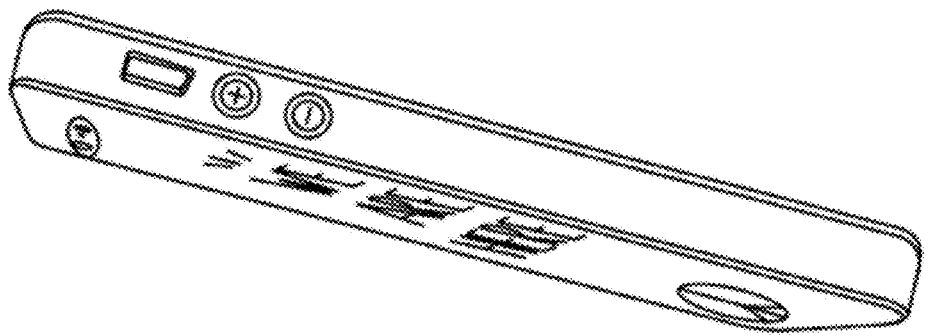
Figure 19B:
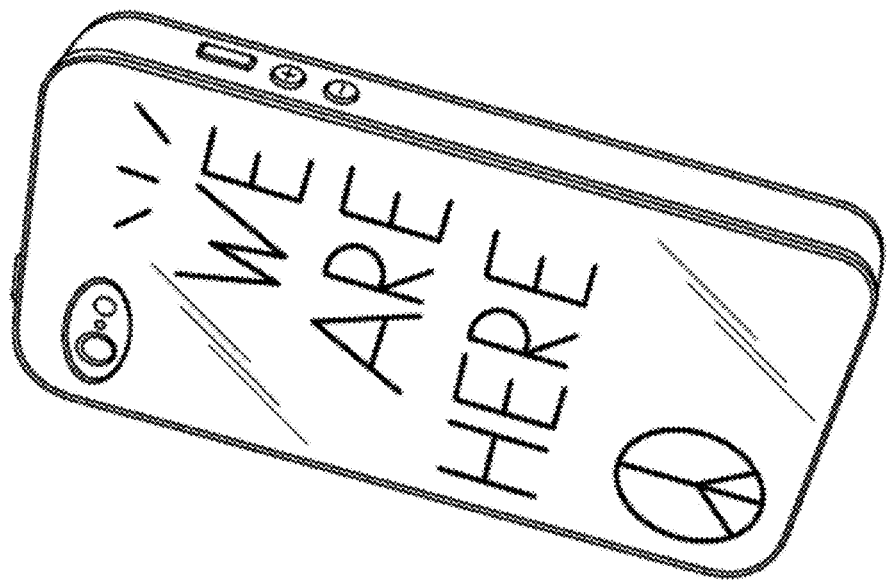
Figure 19E:
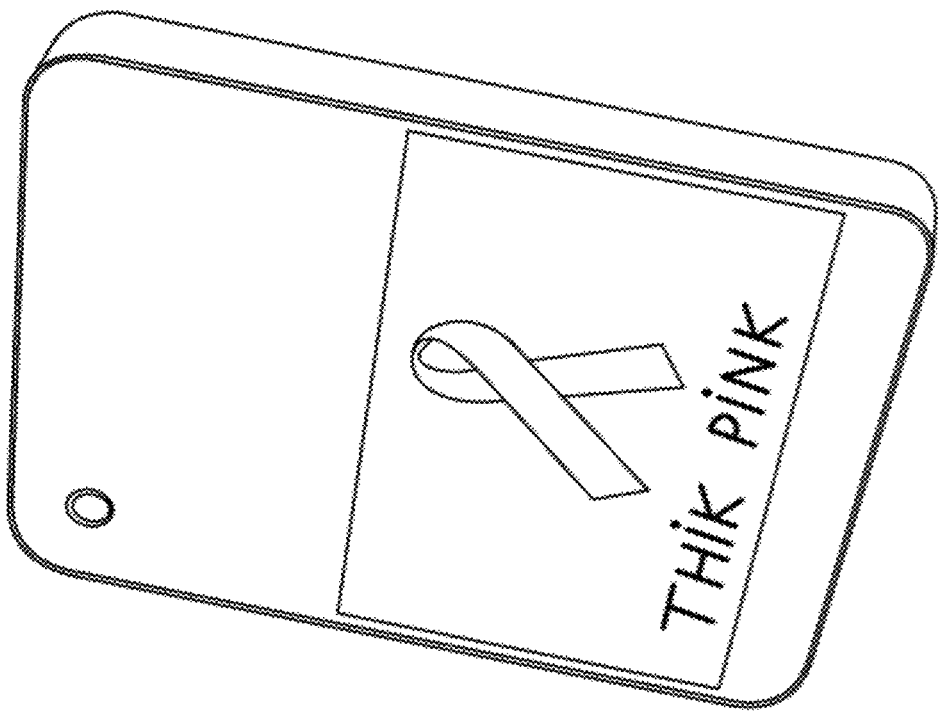
Figure 19D:
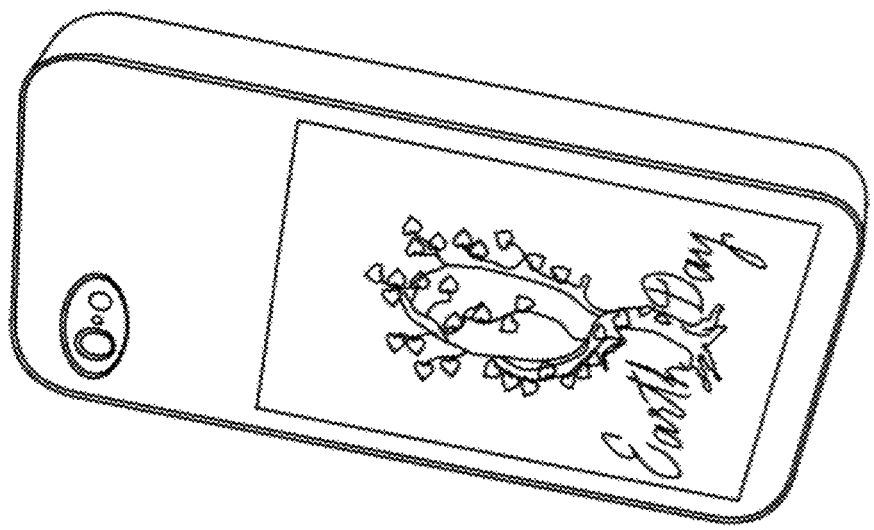
Figure 19G:
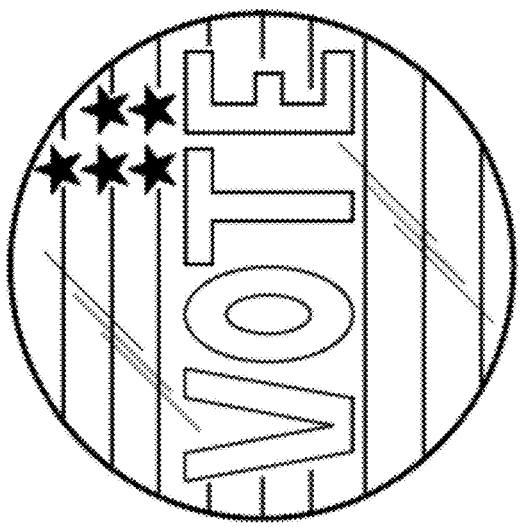
Figure 19F:
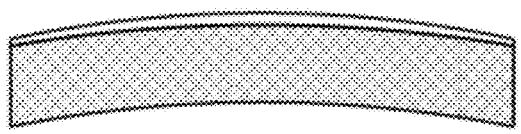

The display device can have a curved or non-linear profile. The display device can be flexible. FIGS. 19F and 19G show a display device that is curvilinear. From a side, the display device has a non-linear profile.

Figure 19H:
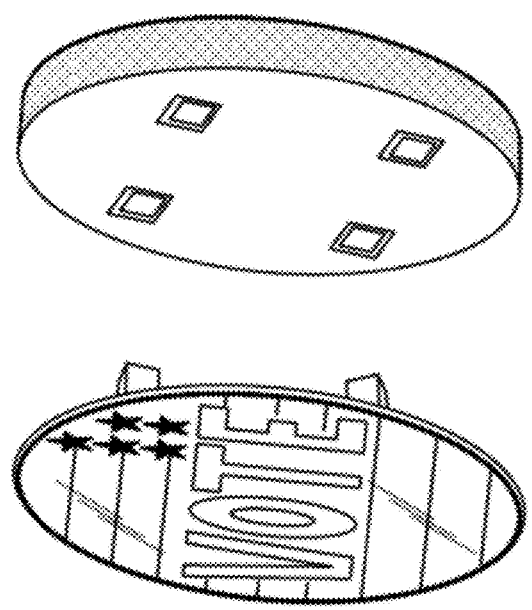
Figure 19J:
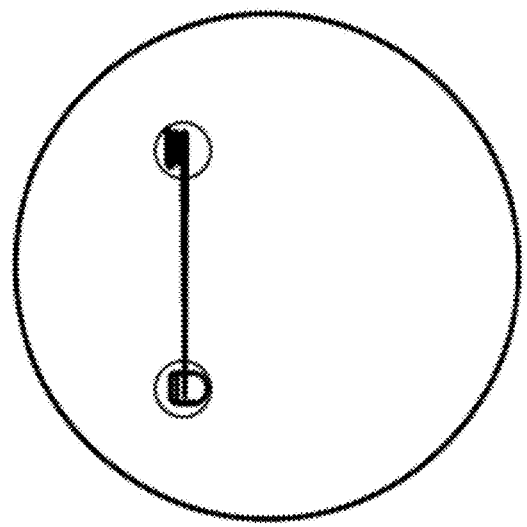
Figure 19I:
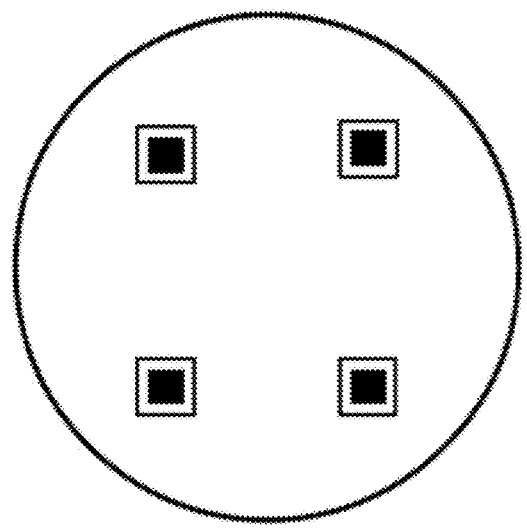
Figure 19K:
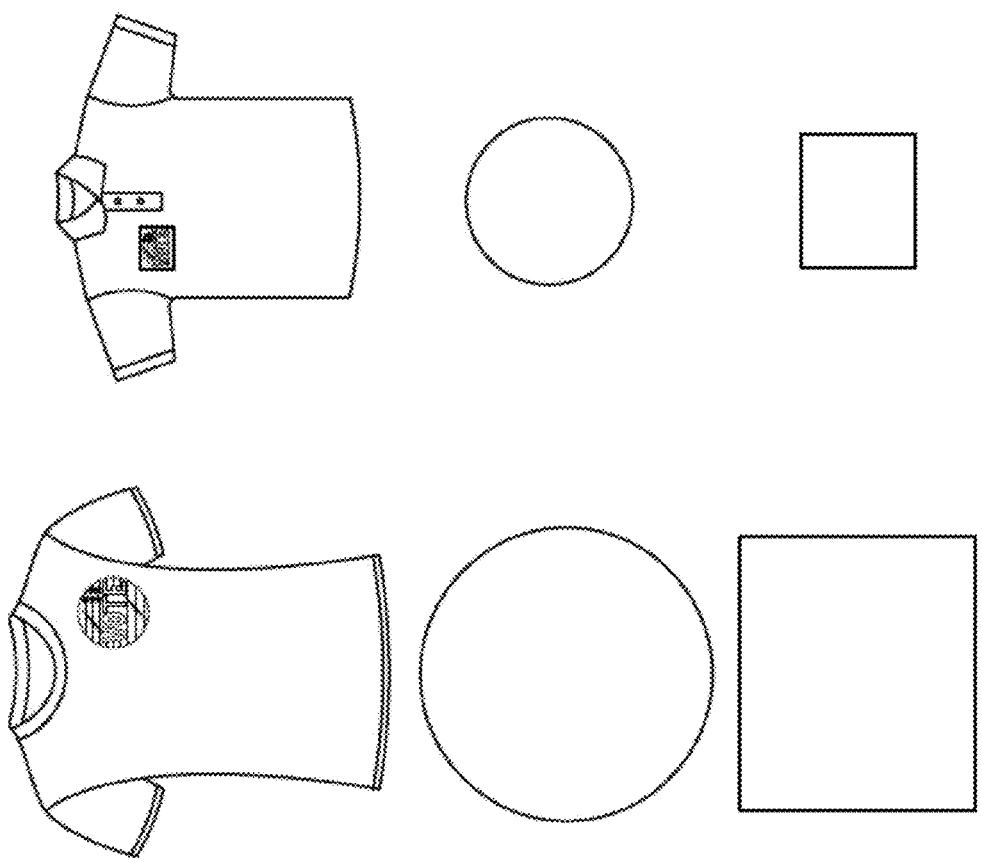

FIGS. 19H-19J shows a display device with a display that is removable from a support member. The display can have mating pins that enable the display to securely mate with the support member. The support member can have a pin that allows the support member to be mounted on an article of clothing, as shown in FIG. 19K.

In one embodiment the mobile device uses Bluetooth® and/or WiFi to interact and communication with the wearable device screen.

In one embodiment the wearable device is configured to interpret certain Bluetooth profiles, which are definitions of possible applications and specify general behaviors that Bluetooth enabled devices use to communicate with other Bluetooth devices. These profiles include settings to parametrize and to control the communication from start. Adherence to profiles saves the time for transmitting the parameters anew before the bi-directional link becomes effective. There are a wide range of Bluetooth profiles that describe many different types of applications or use cases for devices In various embodiments the mobile device and the wearable device are able to have the following: wireless control of and communication between a mobile phone and a wearable device; wireless networking between wearable devices in a confined space and where little bandwidth is required; transfer of files, contact details, calendar appointments, and reminders between devices with OBEX; replacement of previous wired RS-232 serial communications; for low bandwidth applications where higher USB bandwidth is not required and cable-free connection desired; sending small advertisements from Bluetooth-enabled wearable device advertising hoardings to other, discoverable, Bluetooth devices; dial-up internet access on wearable devices using the mobile device; short range transmission of health sensor data from wearable devices; real-time location systems (RTLS) for wearable devices; and personal security applications. Wi-Fi can also be utilized with similar applications for the wearable device.

In one embodiment the wearable device can be coupled to a Bluetooth adapter that enables the wearable device to communicate with the mobile device.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

Computer Control Systems

Figure 20:
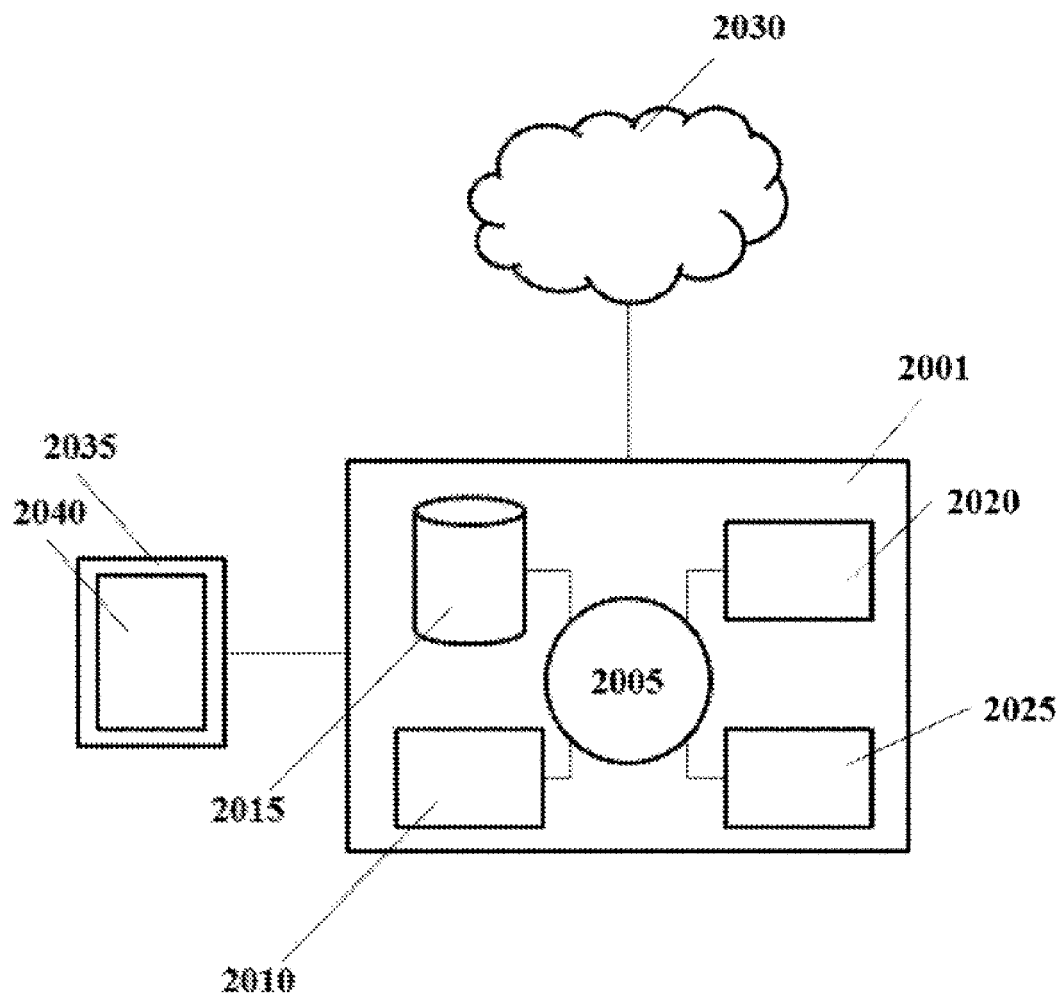
FIG. 20 shows a computer control system that is programmed or otherwise configured to implement methods provided herein.

The present disclosure provides computer control systems that are programmed to implement methods of the disclosure. FIG. 20 shows a computer system 2001 that is programmed or otherwise configured to implement methods of the present disclosure. The computer system 2001 includes a central processing unit (CPU, also "processor" and "computer processor" herein) 2005, which can be a single core or multi core processor, or a plurality of processors for parallel processing. The computer system 2001 also includes memory or memory location 2010 (e.g., random-access memory, read-only memory, flash memory), electronic storage unit 2015 (e.g., hard disk), communication interface 2020 (e.g., network adapter) for communicating with one or more other systems, and peripheral devices 2025, such as cache, other memory, data storage and/or electronic display adapters. The memory 2010, storage unit 2015, interface 2020 and peripheral devices 2025 are in communication with the CPU 2005 through a communication bus (solid lines), such as a motherboard. The storage unit 2015 can be a data storage unit (or data repository) for storing data. The computer system 2001 can be operatively coupled to a computer network ("network") 2030 with the aid of the communication interface 2020. The network 2030 can be the Internet, an internet and/or extranet, or an intranet and/or extranet that is in communication with the Internet. The network 2030 in some cases is a telecommunication and/or data network. The network 2030 can include one or more computer servers, which can enable distributed computing, such as cloud computing. The network 2030, in some cases with the aid of the computer system 2001, can implement a peer-to-peer network, which may enable devices coupled to the computer system 2001 to behave as a client or a server.

The CPU 2005 can execute a sequence of machine-readable instructions, which can be embodied in a program or software. The instructions may be stored in a memory location, such as the memory 2010. The instructions can be directed to the CPU 2005, which can subsequently program or otherwise configure the CPU 2005 to implement methods of the present disclosure. Examples of operations performed by the CPU 2005 can include fetch, decode, execute, and writeback.

The CPU 2005 can be part of a circuit, such as an integrated circuit. One or more other components of the system 2001 can be included in the circuit. In some cases, the circuit is an application specific integrated circuit (ASIC).

The storage unit 2015 can store files, such as drivers, libraries and saved programs. The storage unit 2015 can store user data, e.g., user preferences and user programs. The computer system 2001 in some cases can include one or more additional data storage units that are external to the computer system 2001, such as located on a remote server that is in communication with the computer system 2001 through an intranet or the Internet.

The computer system 2001 can communicate with one or more remote computer systems through the network 2030. For instance, the computer system 2001 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 2001 via the network 2030.

Methods as described herein can be implemented by way of machine (e.g., computer processor) executable code stored on an electronic storage location of the computer system 2001, such as, for example, on the memory 2010 or electronic storage unit 2015. The machine executable or machine readable code can be provided in the form of software. During use, the code can be executed by the processor 2005. In some cases, the code can be retrieved from the storage unit 2015 and stored on the memory 2010 for ready access by the processor 2005. In some situations, the electronic storage unit 2015 can be precluded, and machine-executable instructions are stored on memory 2010.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 2001, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 2001 can include or be in communication with an electronic display 2035 that comprises a user interface (UI) 2040 for providing, for example, an application (app) to permit a user to select media for display. Examples of UI's include, without limitation, a graphical user interface (GUI) and web-based user interface.

Apps of the present disclosure can provide various features and enable various benefits. An app may be about expressing what a user cares about, learning about causes and connecting to others and creating a social experience around causes, philanthropy and self-expression. The user may wear and share what the user cares about, connect and take action to make a social impact. The app may be a visual social network, enabling the user to provide an expression to other individuals. This may be to create awareness, flow resources and create movements around social impact. The app may allow a user to set monthly or other time frame goals around learning, donating, and educating others, about new charities and organizations, causes and opportunities (e.g., philanthropic opportunities). The app may enable a user to express what the user cares about, learning, connecting around various interests of the user.

The app can be used to create expression, share existing expressions, buy and sell expressions, connect and donate to charities, meet and connect with people who share similar interests around causes, such as causes that may benefit society and the world. The app can focus on causes that may positively impact humanity, from improving education to minimizing or addressing various social issues (e.g., animal rights, human rights, pollution, etc.).

The app can provide a marketplace for expressions. The app can enable various experiences. In some examples, the app can allow users in a stadium to be part of a light show; the app can allow GPS to guide individuals to meet based on proximity and shared interests; the app can allow for a user to create a moderated slide-show of expressions; and the app can enable and stimulate global and local conversations around various topics and interests.

The app can be used with a display device (e.g., wearable device) of the present disclosure. Alternatively, the app can be used without the display device. The app can allow the user to connect to a display device so that the user can wear and share one or more expressions that the user is "expressing" on the app. The app can allow the user to invite friends to join an expression, movement, or cause (e.g., philanthropic cause), and can allow the user to post on social media.

Methods and systems of the present disclosure can be implemented by way of one or more algorithms. An algorithm can be implemented by way of software upon execution by the central processing unit 2005.

Figure 21:
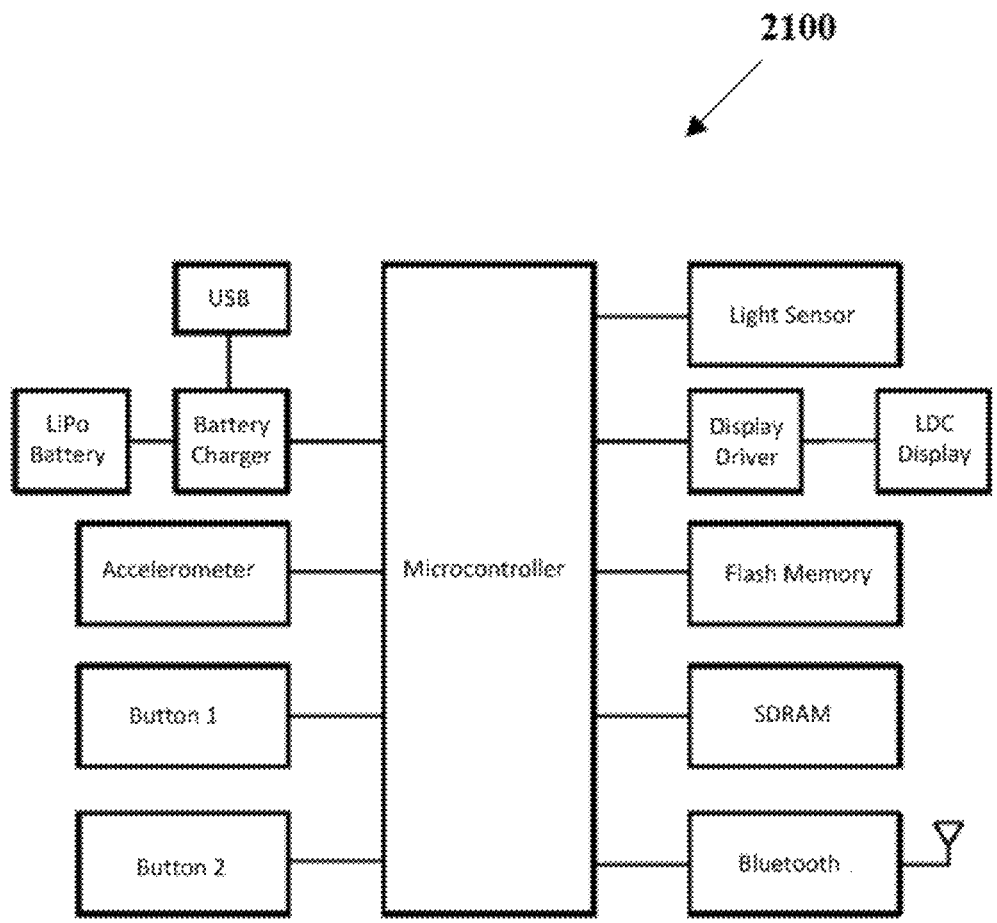
FIG. 21 shows a control unit.

FIG. 21 shows a control unit 2100. The control unit 2100 includes a microcontroller that is in communication with various other units, including a battery (e.g., lithium ion polymer battery), a battery charger that is in communication with a universal serial bus (USB) port, an accelerometer, a first button, a second button, Bluetooth, a first memory (e.g., synchronous dynamic random access memory, or SDRAM), a second memory (e.g., flash memory), a display driver, liquid crystal display (LCD), and a light sensor. The control unit 2100 can be integrated with a display device or system of the present disclosure. For example, the control unit 2100 can be integrated as a circuit board of a display device (e.g., button display).

Example 1

Figure 22A:
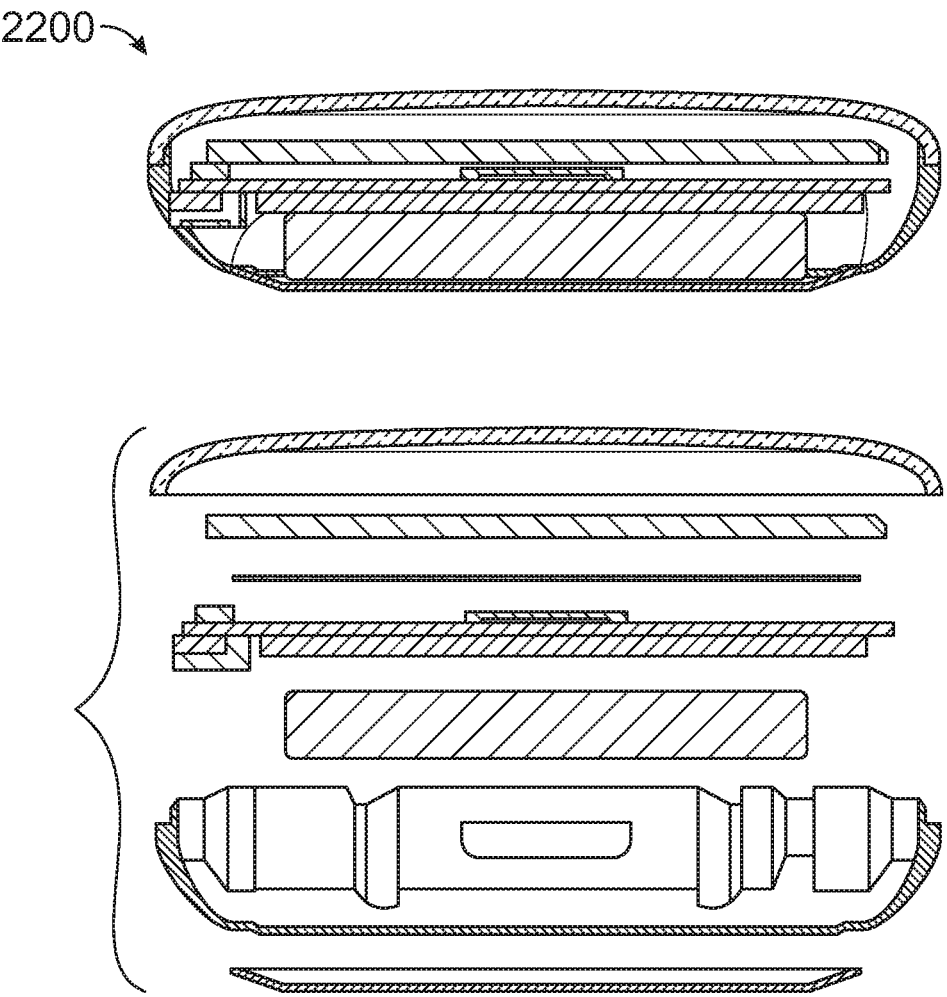
FIGS. 22A-22D show a display device that is configured to display media selected by a user.

FIGS. 22A-22D show a display device 2200 that is configured to display media selected by a user. FIG. 22A shows an exploded side view of the display device. The display device includes a circular display, printed circuit board assembly (PCBA), battery, a back housing (or carrier) and steel cover. The display device has a thickness of about 13.48 millimeter. The internal components (i.e., display, PCBA and battery) have a thickness of about 9.88 mm.

Figure 22B:
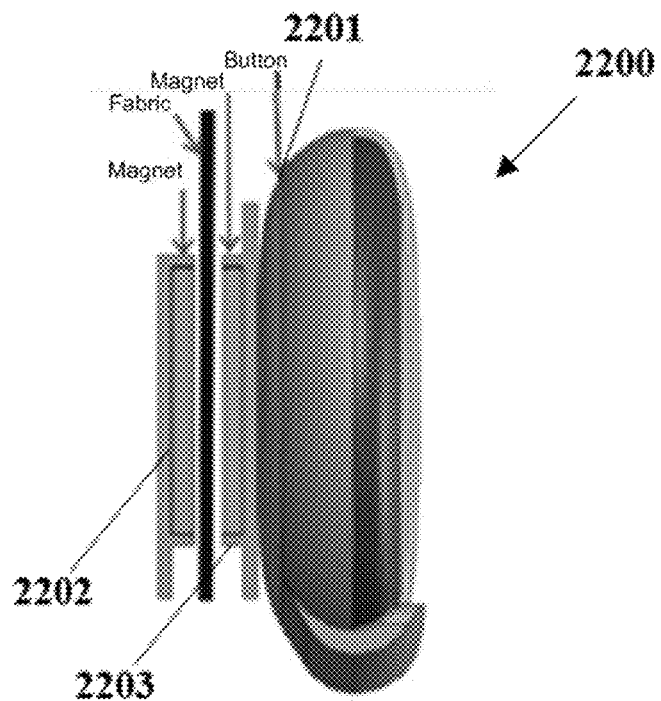
Figure 22C:
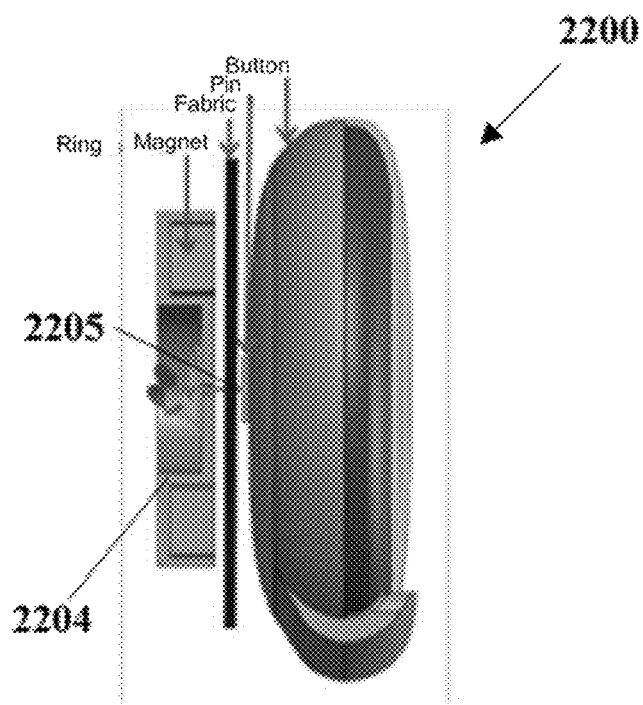

With reference to FIGS. 22B and 22C, the display device 2200 includes a button 2201, a first magnet 2202 and second magnet 2203. The first magnet 2202 and second magnet 2203 have opposite polarities, which can enable the display device 2200 to be secured against an object, such as a fabric. As an alternative, the display device 2200 can include a ring 2204 that mates with a pin 2205, which can enable the display device 2200 to be secured against the object.

Figure 22D:
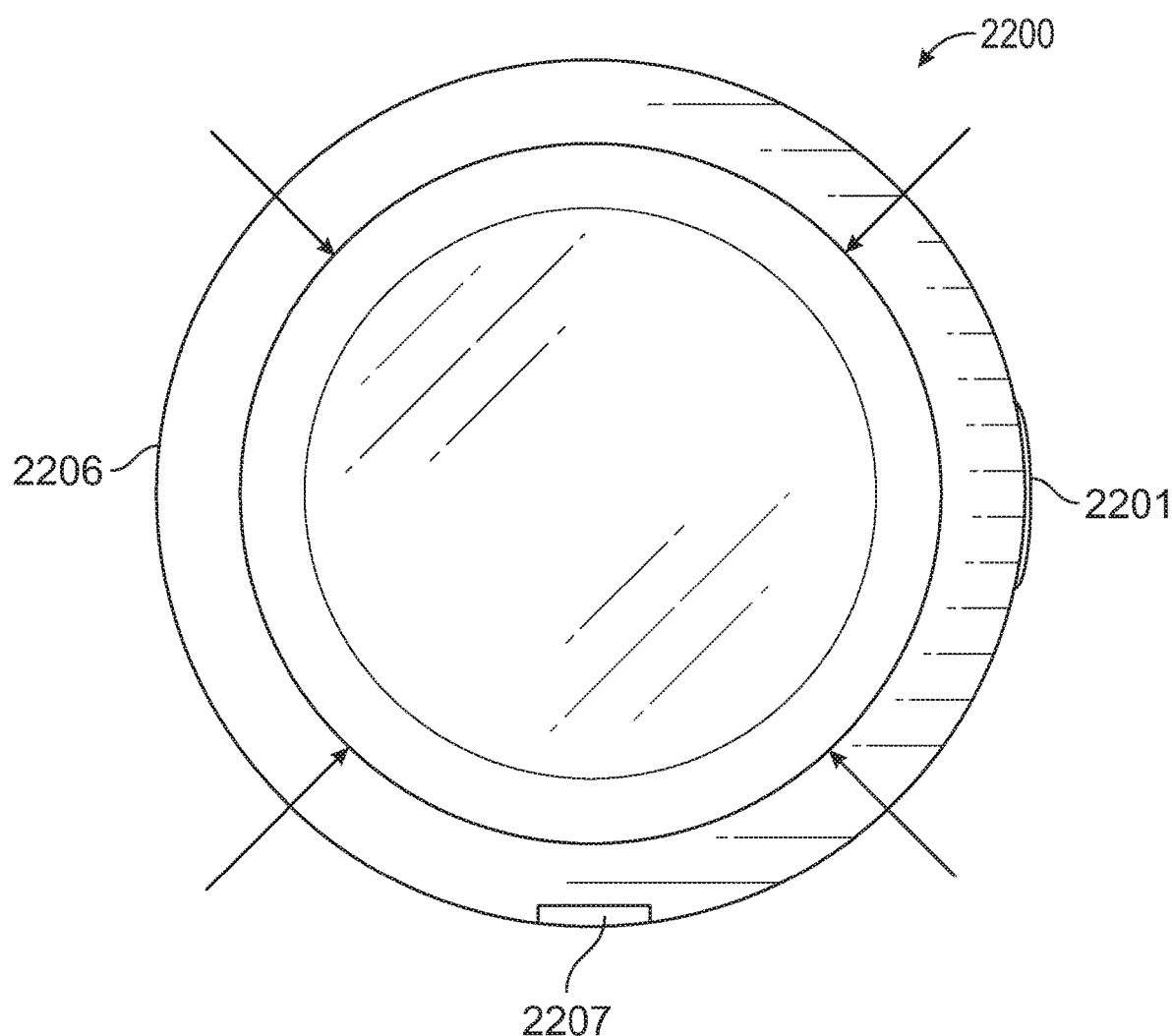

FIG. 22D shows various components of the display device 2200. The display device 2200 includes the button 2201, an antenna 2206 and USB port 2207. The USB port 2207 can be used to charge the battery of the display device 2200.

Figure 23A:
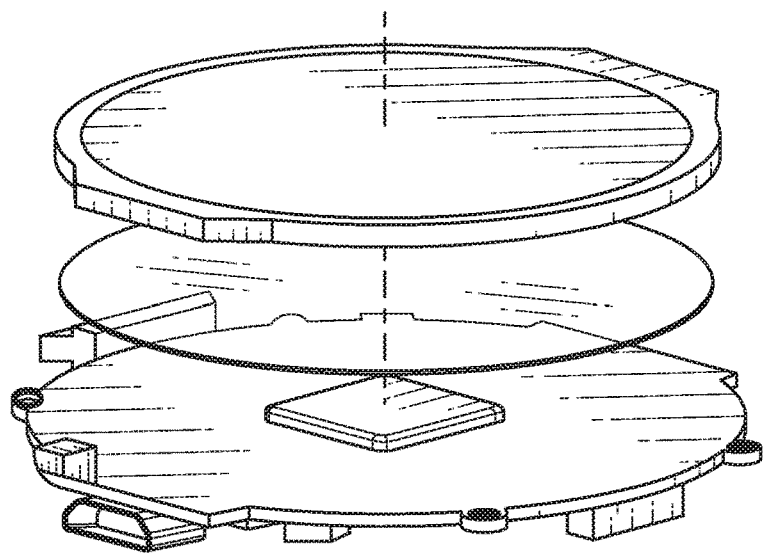
FIGS. 23A-23E show various stages of construction of a display device.
Figure 23B:
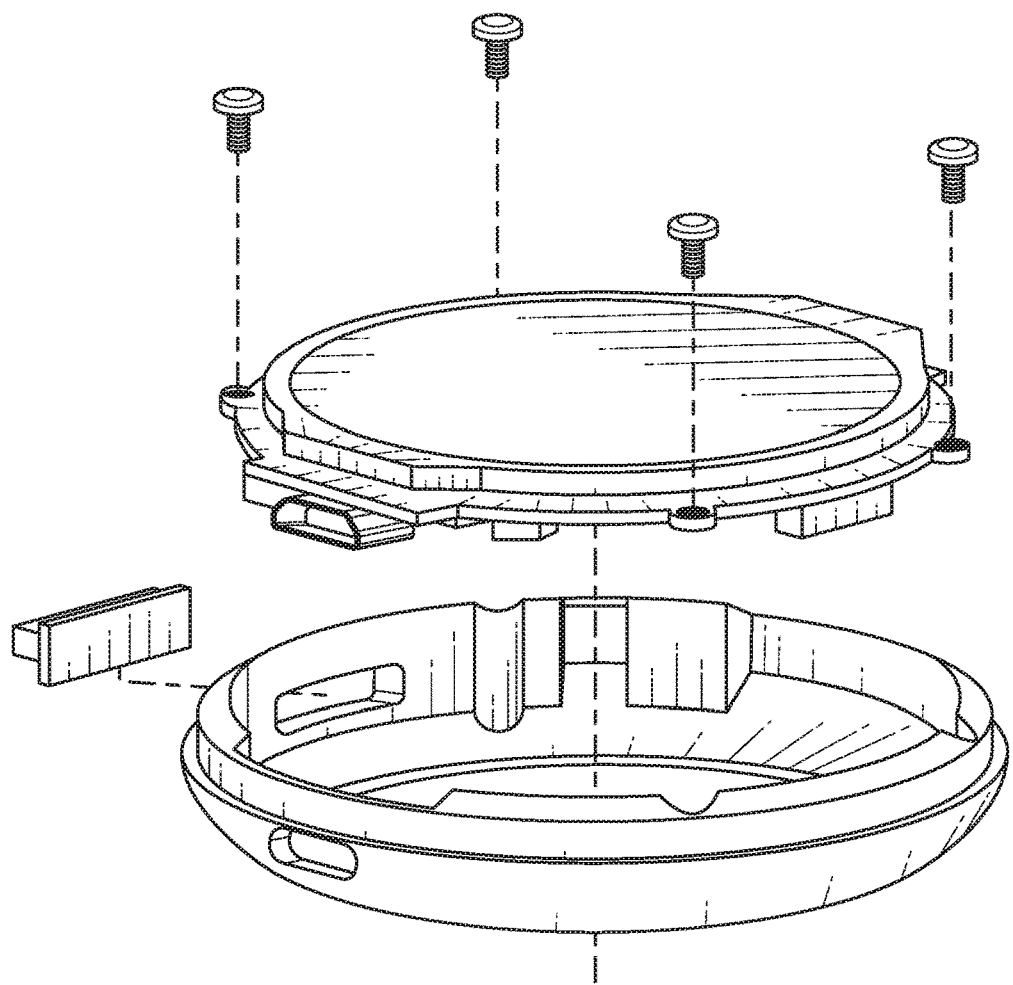

FIGS. 23A-23E show various stages of construction of a display device, such as the display device 2200. FIG. 23A shows a circular display screen of the display device 2200. As shown in FIG. 23B, the display screen can be secured in the back housing of the display device 2200.

Figure 23C:
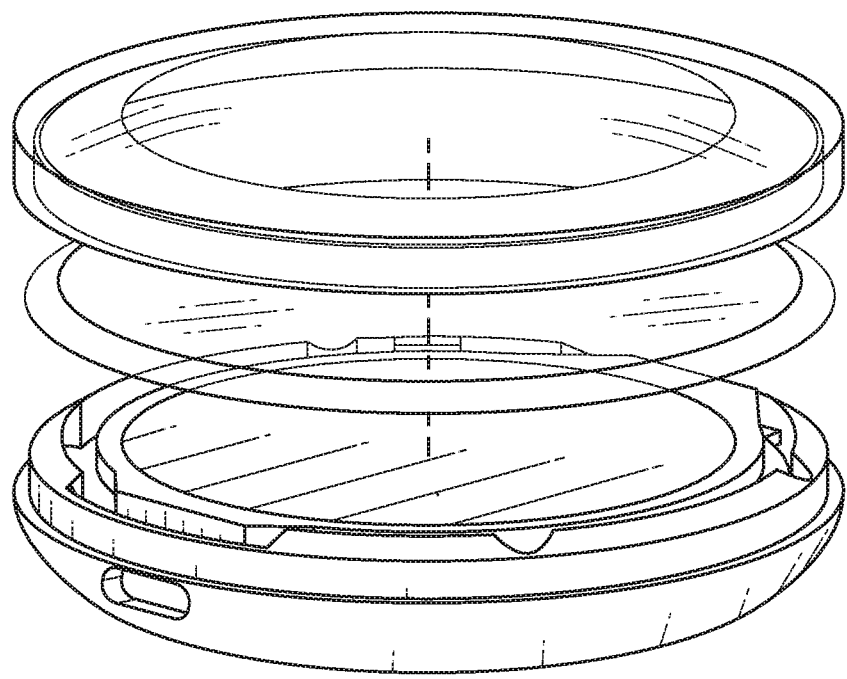
Figure 23D:
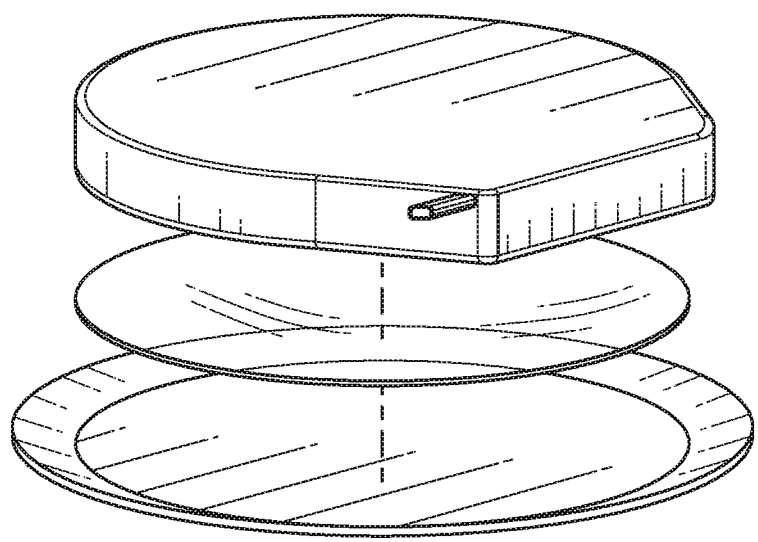
Figure 23E:
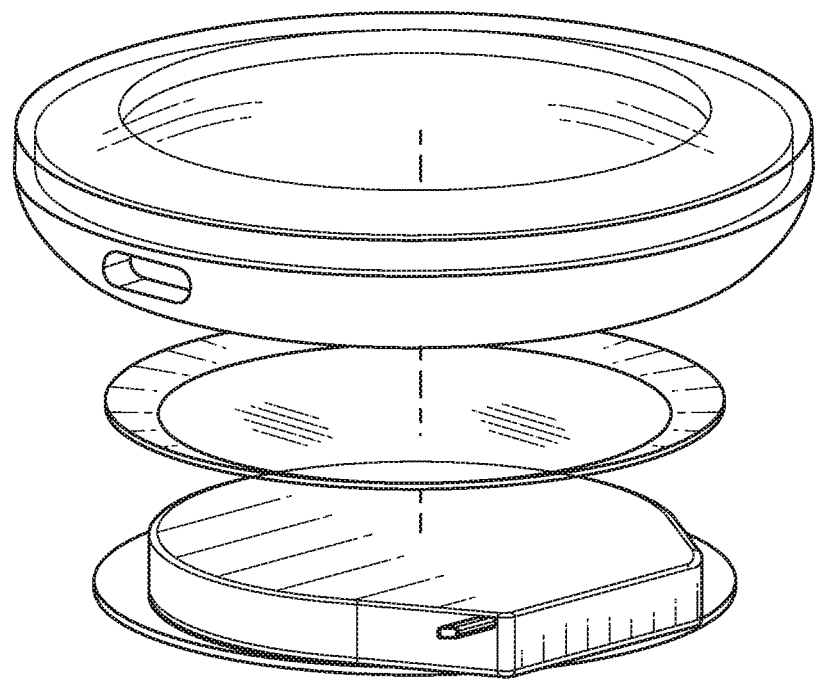

With reference to FIG. 23A, the display screen is connected to the PCBA. A bottom surface of the display screen is coupled to the top of the PCBA. In FIG. 23B, the button is inserted into the carrier and the PCBA is secured to the carrier using screws. In FIG. 23C, a lens is secured to a top surface of the carrier using adhesive. In FIG. 23D, the battery is secured to the top surface of the steel bottom cover. The assembly is completed by securing the steel plate to the lip on the bottom surface of the carrier, as shown in FIG. 23E.

Figure 24:
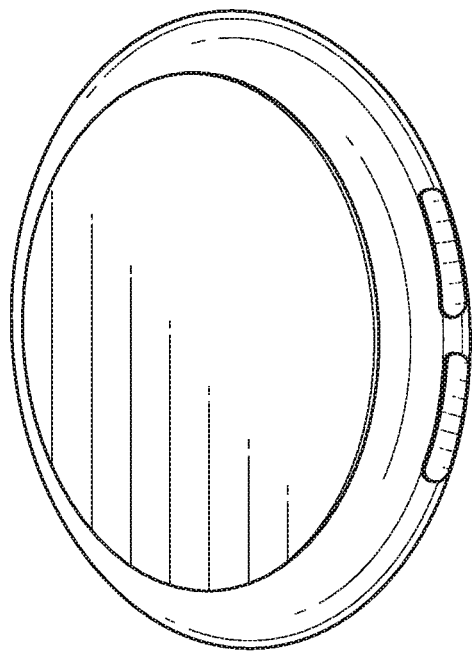
FIG. 24 shows a display device with a display screen.

FIG. 24 shows another display device with a display screen. The display device also includes two side buttons.

Figure 25:
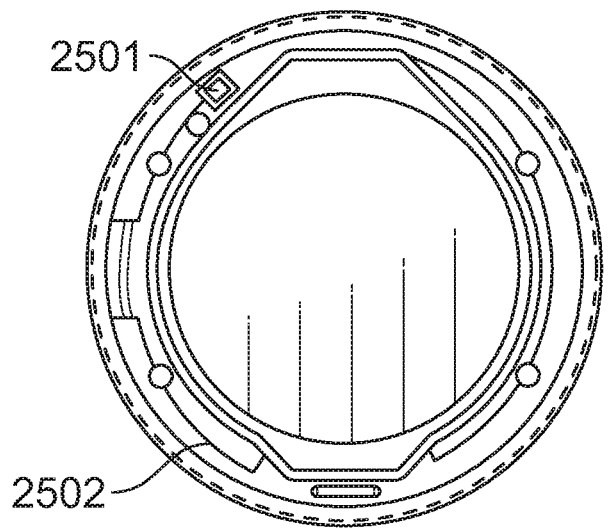
FIG. 25 shows a display device with a flex connector and active touch area.

As another example, FIG. 25 shows a display device with a flex connector 2501 and active touch area 2502. This display device may be suitable for use with a display screen that is a touchscreen, such as a capacitive touchscreen.

The display screens of the present disclosure may be configured for use with gestures, such as swiping across a display screen. For example, media may be selected by a user by swiping on the display screen. As another example, the user may scroll through media by swiping from left to right, right to left, top to bottom, or bottom to top.

Example 2

Figure 26:
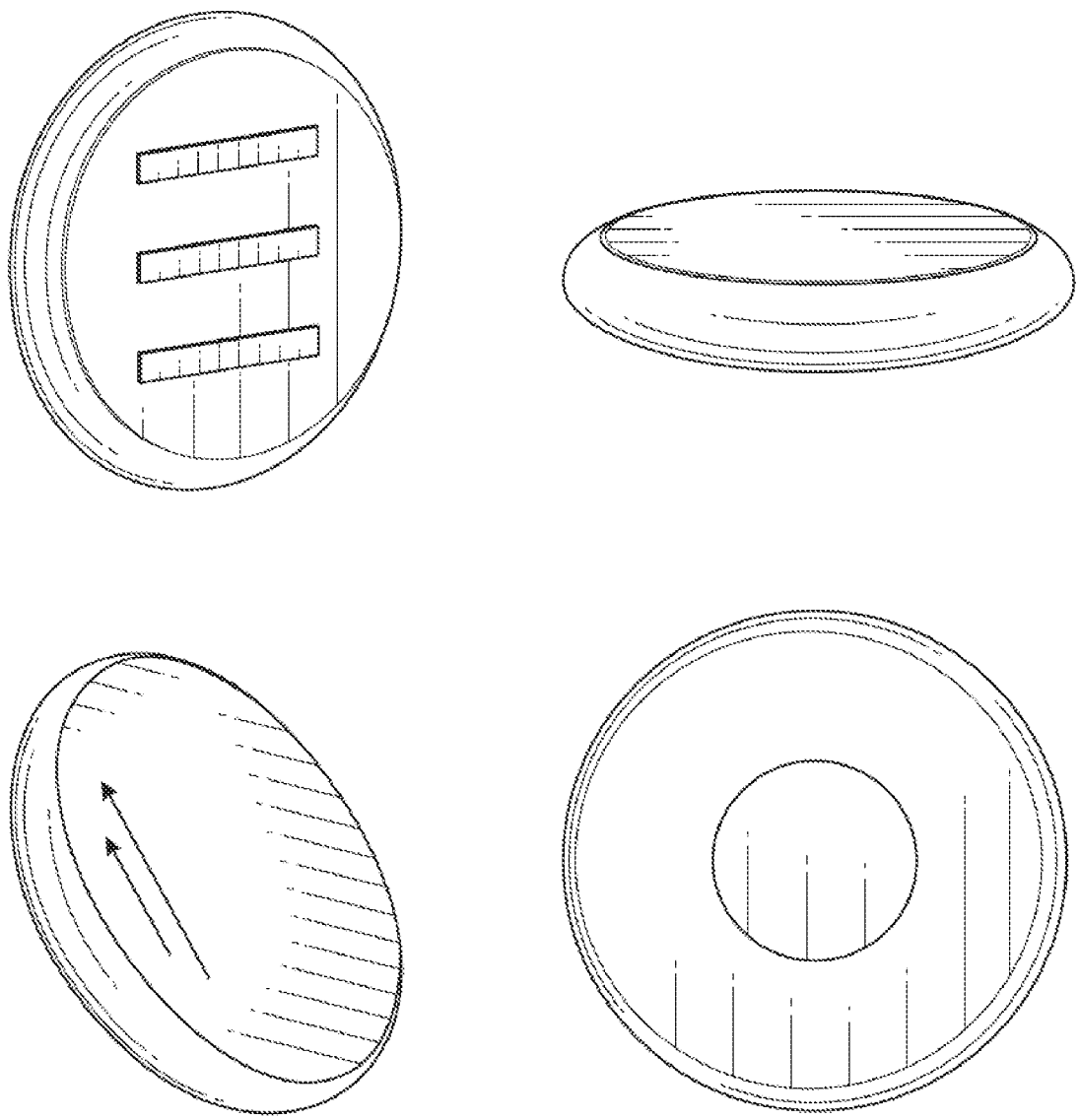
FIG. 26 shows an example of a wearable device that is a button.
Figure 30:
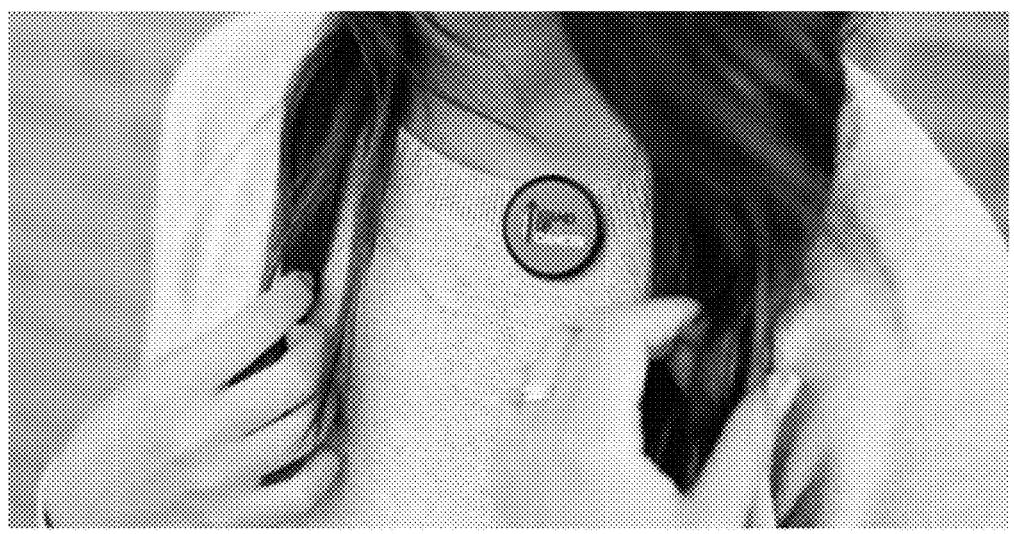
FIG. 30 shows a user wearing a wearable device on a shirt of the user.

The present disclosure provides various non-limiting examples of wearable devices. FIG. 26 shows examples of a wearable device of a user that is in the form of a button. A display screen of the wearable device shows expressions (e.g., three bands or "STAND UP TO CANCER" with arrows, and "Save the Planet"), including media (e.g., arrows, trees and bicycle). The expressions may be retrieved from an electronic device of the user. The expressions may be created on the electronic device or downloaded from another system or device, such as a server. FIG. 30 shows the user wearing the wearable device on a shirt of the user.

Figure 27:
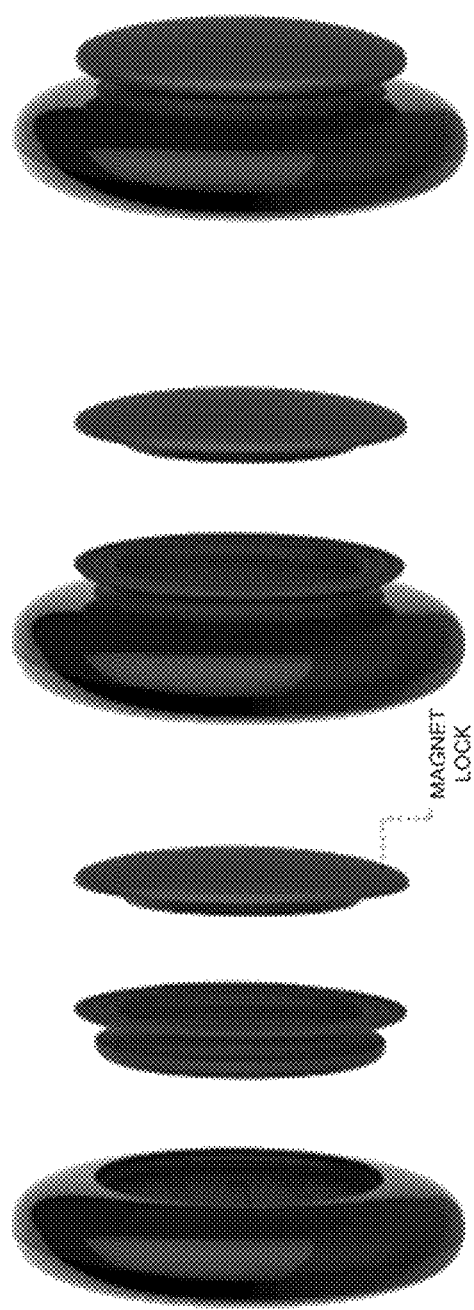
FIG. 27 shows an example of a wearable device with a magnetic attachment.

FIG. 27 shows a wearable device with a magnetic attachment, including a magnetic lock. The magnetic attachment can permit the wearable device to be secured against an article of clothing of the user.

Figure 28:
FIG. 28 shows an example of a wearable device with a clip.

FIG. 28 shows a wearable device with a clip. The clip can permit the wearable device to be secured against an article of clothing of the user, or another object (e.g., bag).

Figure 29:
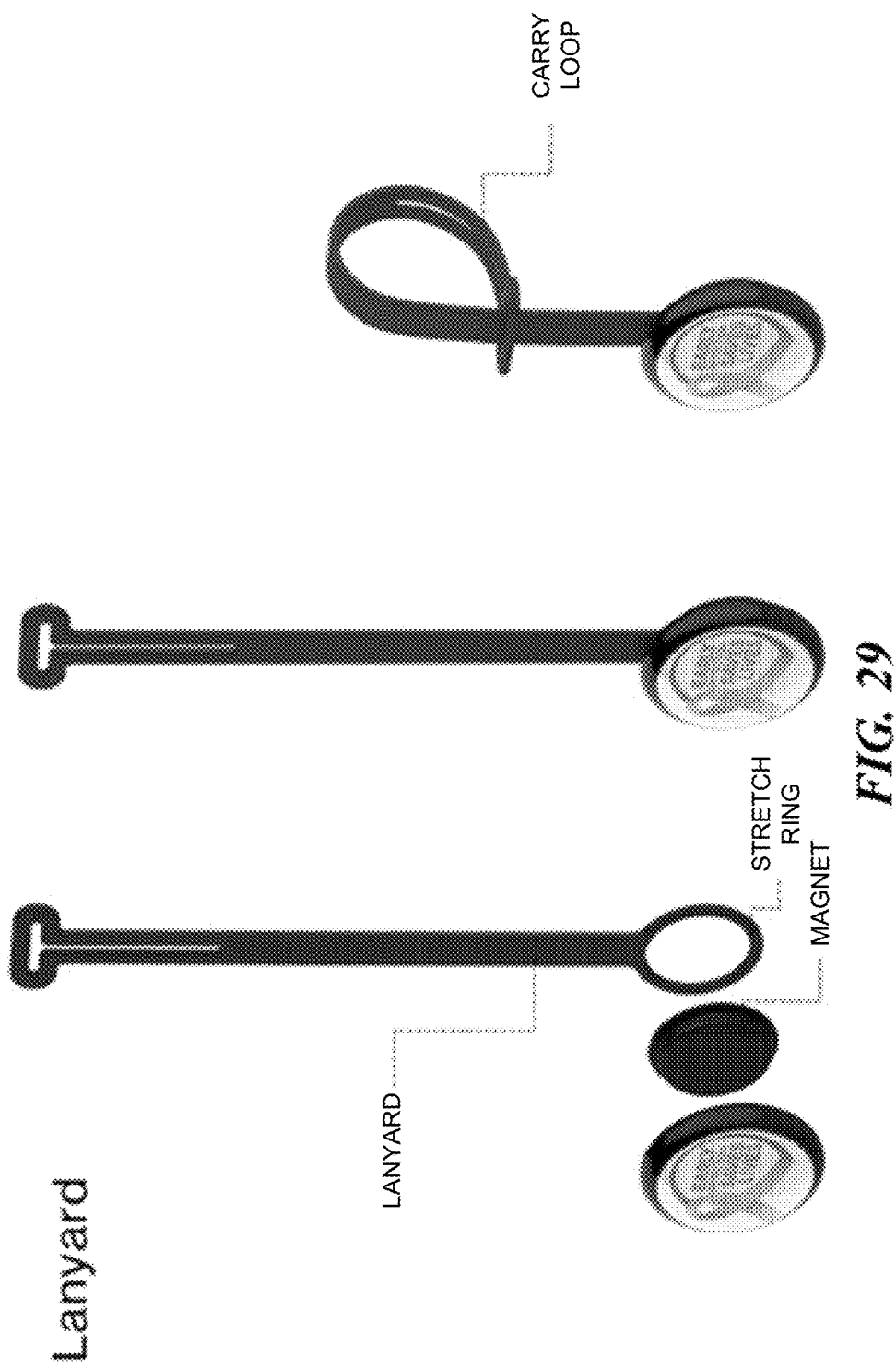
FIG. 29 shows an example of a wearable device with a lanyard.

FIG. 29 shows a wearable device with a lanyard. The lanyard can permit the wearable device to be secured against the user or another object (e.g., bag).

Figure 31:
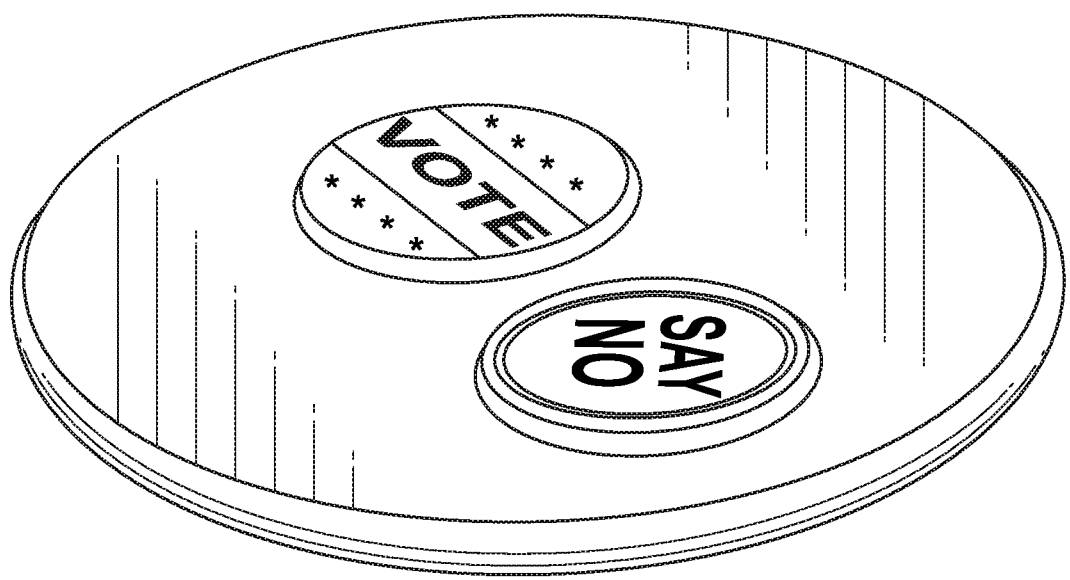
FIG. 31 shows a charger for charging a wearable device.

FIG. 31 shows a charger with an inductive charging area for charging a wearable device. The user may deposit the wearable device in the charging area for automatic charging.

Figure 32A:
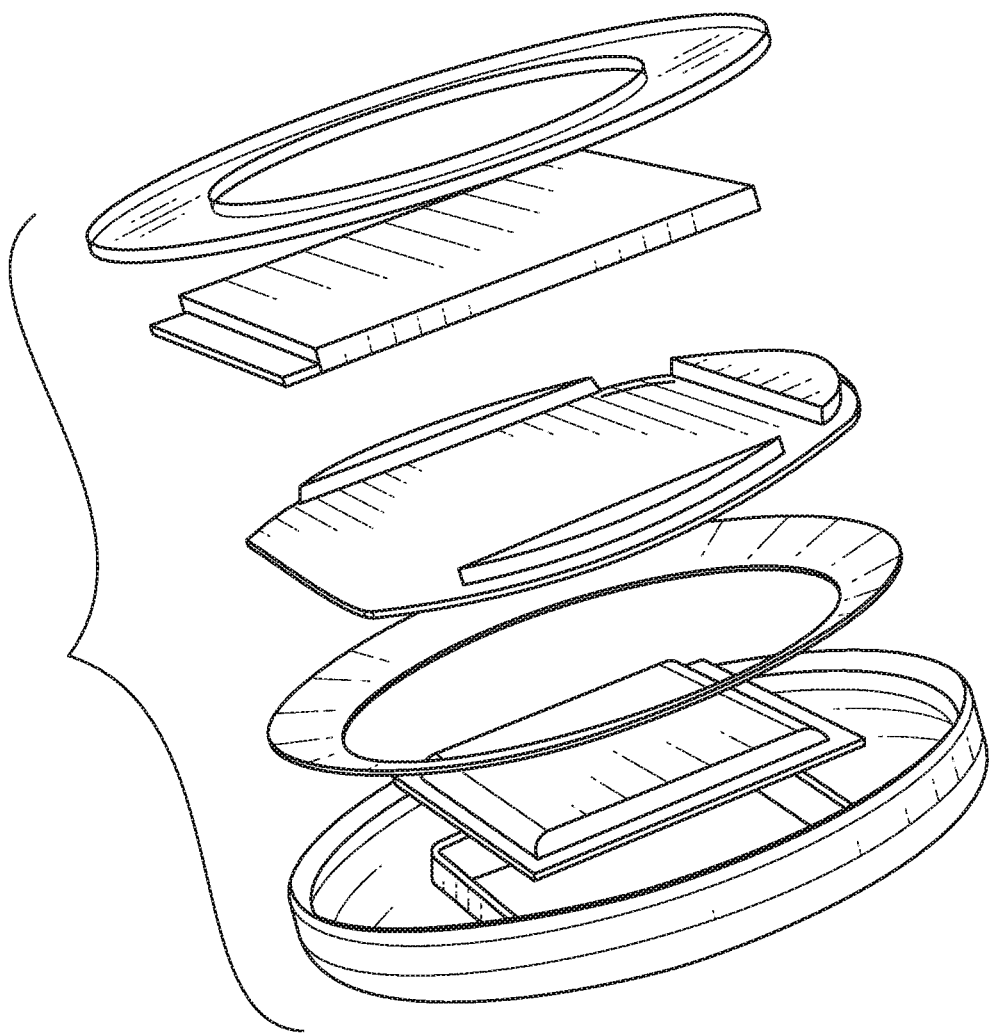
FIGS. 32A and 32B show exploded views of another example of a wearable device.
Figure 32B:
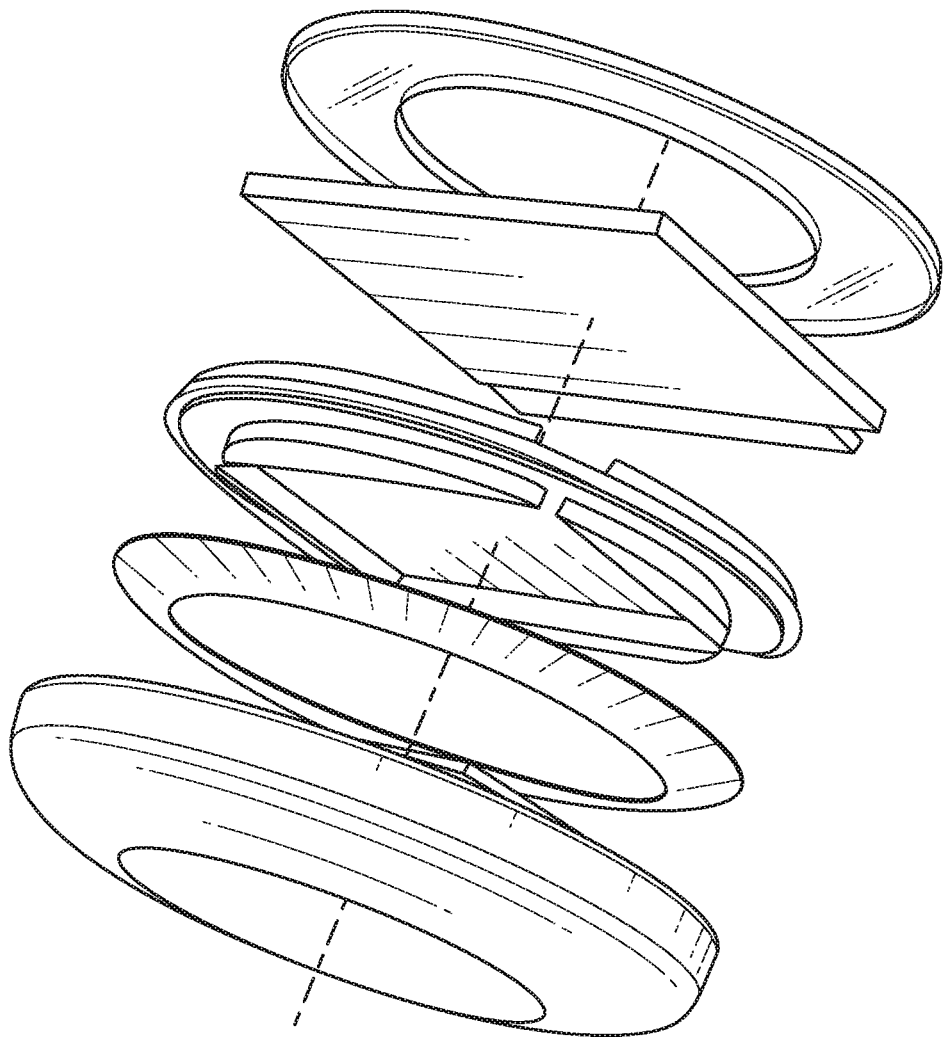

FIGS. 32A and 32B show exploded views of another example of a wearable device. The wearable device includes a light emitting diode (LED) display, which can be an OLED. The wearable device can include a charge coil for inductive charging.

Figure 33A:
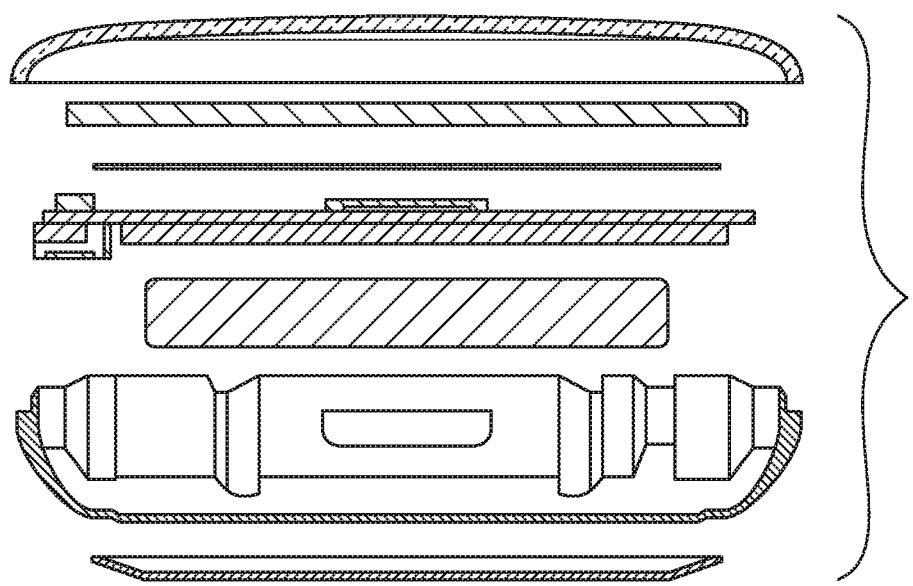
FIGS. 33A and 33B show exploded side and cross-section views, respectively, of another example of a wearable device.
Figure 33B:
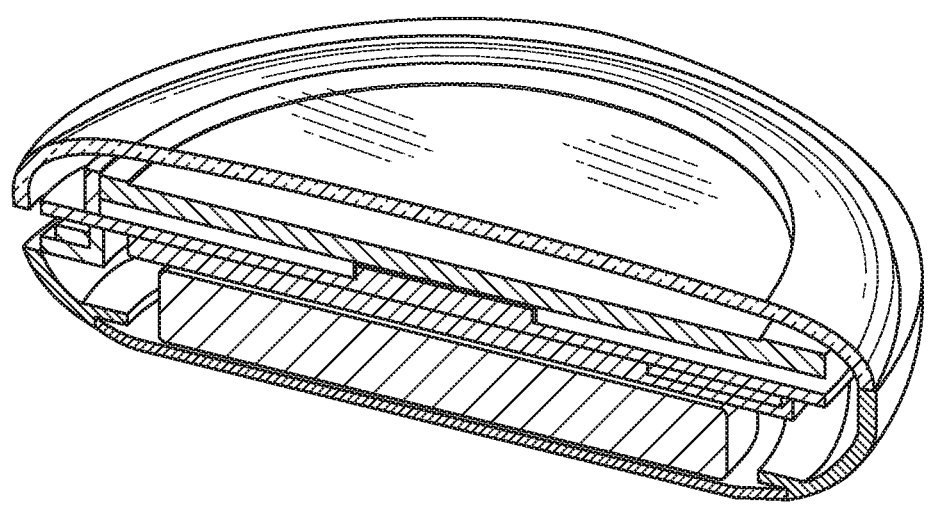

FIGS. 33A and 33B show exploded side and cross-section views, respectively, of another example of a wearable device. The wearable device includes a 1 millimeter (mm) lens adjacent to a 1.47 mm display.

Figure 34A:
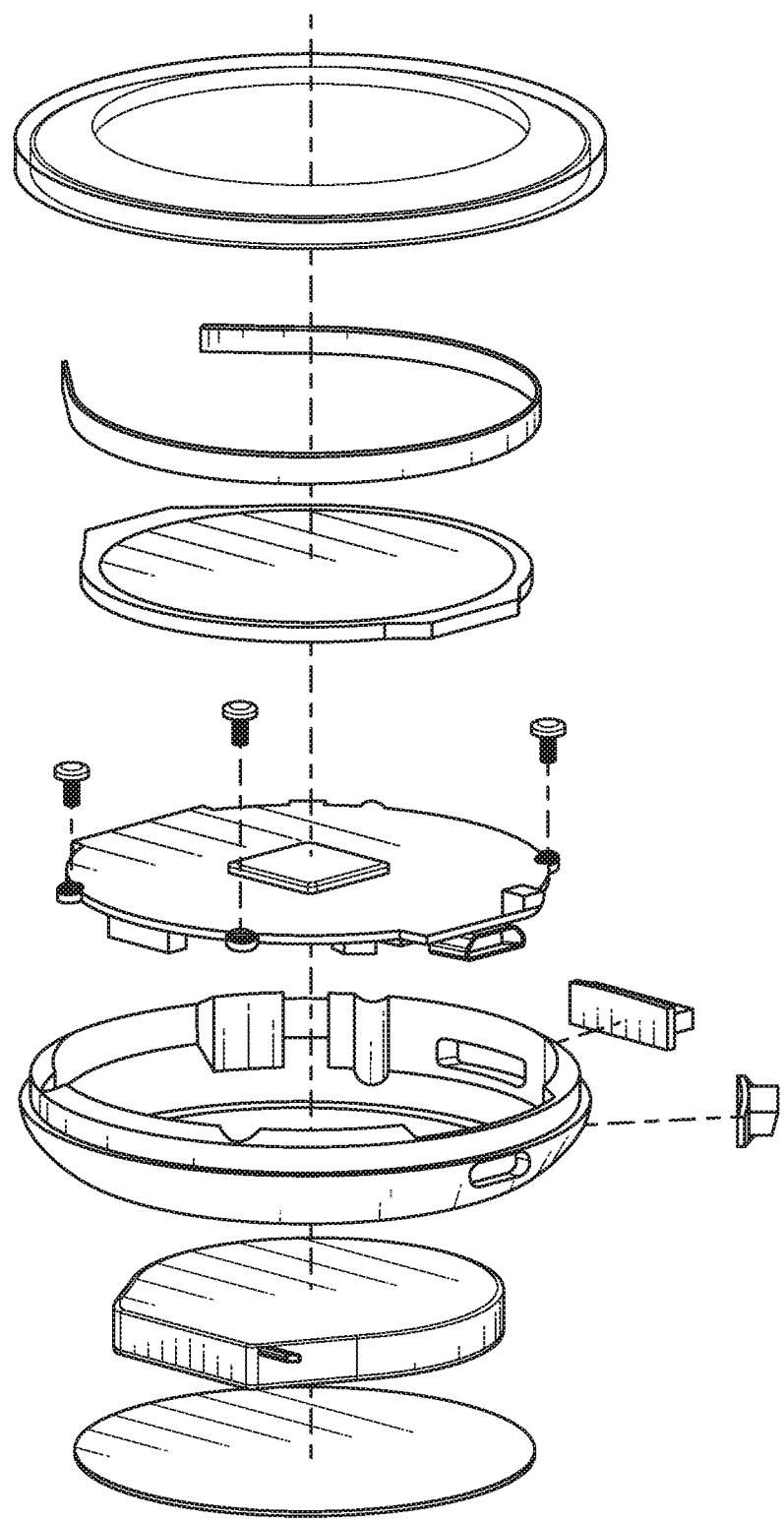
FIGS. 34A and 34B show schematics of another example of a wearable device.
Figure 34B:
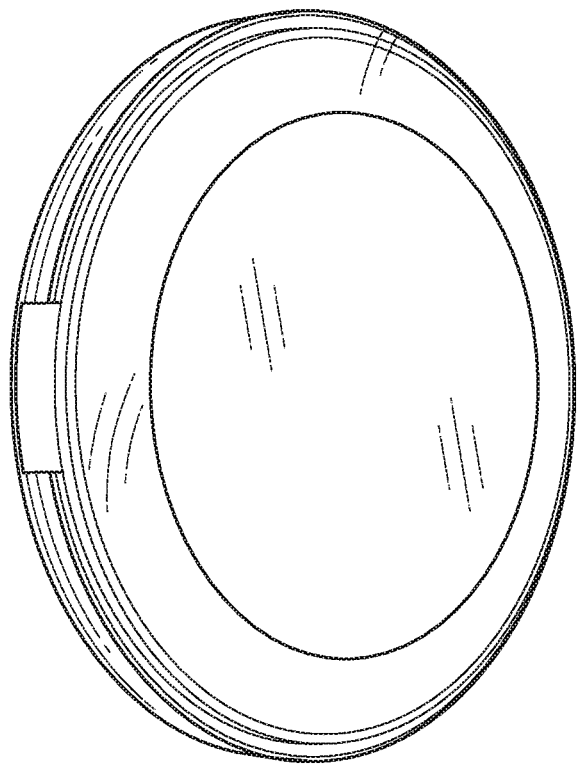

FIGS. 34A and 34B show another example of a wearable device. FIG. 34A is an exploded side view of the wearable device. FIG. 34B is an angled view of the wearable device. The wearable device is in the form of a round button, though other shapes may be used.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

Other Applications of the Wearable Displays

Embodiments of the display system described herein can be coupled with useful software and/or hardware to provide additional functionality. In various applications, the display device may be paired with and controlled by software that is executed on a mobile device that is coupled to the display. Alternatively, the software and communications capabilities may be built directly into the wearable display, which may then act as a standalone device. Any number of architectures are possible for achieving the following applications of a wearable device, as described.

Application 1: Proximity Triggered Behaviors: Peer to Peer

In one application, two people wearing who are both wearing the wearable display (i.e., beams) are located near each other. Using proximity, data, content, and filters, algorithms, as implemented for example on a mobile device of each person, the devices determine the that the two people are near each other, query each other's device for common interest information (subject to any privacy rules), and then sends an image or video to each user's wearable display to show the other person the common interest.

A certain physical distance may constitute when two users are "near" each other.

Users can configure their app to identify, pick and define interests, and then associate specific Beams, GIFs, and slideshows to each interest.

The BEAM and app combination broadcast and listen, so that when two users are near each other, and they share an interest in common, it will trigger their BEAM to display the content they have associated to that interest.

For instance, if I identify climate change as an interest, I may choose to associate the following Beams to it, to be triggered to display when I am near another user who is also interested in climate change: Solar Power, GreenPeace, my school where I studied geology, a documentary film called "An Inconvenient Truth", an image of my bike with "Bike to Work" title, an image of CA Firefighters and the title "California Strong", an image of Save the Rainforest, etc.

When I am near another user who also shares "climate change" as an interest, by BEAM device automatically begins displaying the content I have chosen.

Similarly, the other user near me has the same behavior— their BEAM also begins displaying the content they have associated with their interest in "Climate Change".

Both users' BEAMS could also have an indicator of this interest as a title that periodically displays that is generic, such as the title "Climate Change" on a solid color background, so that both users would notice that each other's content is all related to their shared interest in Climate Change.

Noticing each other's BEAMS showing "Climate Change" and related content, these two people in the real world now learn that they have a shared interest, and simply by observing each other's BEAMs, they'll gain an insight into the other person, have meaningful reason to engage, have a conversation, learn about new things that are related to a topic they already care about, and create real community.

This is a great ice breaker between strangers who might not otherwise be inclined to talk or even notice each other, breaking down barriers, and providing connective tissue and new bonds for community.

A user can define multiple interests, each with its own related content. Content may be totally unique for a specific interest, or may appear in multiple interests. For instance, my interests could be: Climate Change, Cycling, Micro Finance, Travel, Italian, Sundance, SF Giants, Soccer I may have a Beam for my school in several of these—I studied Environmental Engineering at Standard so it is related to Climate Change, but I also played soccer at Stanford so it is in that interest as well.

Advanced feature—the BEAM App searches social media for other similar interests by reviewing content, tags, key words that both users have posted, and for the additional matches of interests, the app will then find and/or create content that represents additional similar interests and display that as well.

Application 2: Proximity Triggered Behaviors: Business to Peer

A different use case for Beams triggered by my physical location is when I am near a store, café, restaurant, or bar, etc., and I automatically receive Beams to me that are related to that establishment, with some form of incentive or value, such as a combination of a cause that requires donation and a related offer or promotion that it unlocks.

For instance, I walk by a Starbucks and automatically receive a Beam that I can donate to for $3 and then go into Starbucks and get a free coffee. Imagine that Starbucks has teamed up with the non-profit "charity: water" which is helping the communities in Sumatra where many of their coffee beans come from. The Beam I receive is a large logo for charity:water with a small Starbucks logo on it, and the staff at Starbucks knows that anyone wearing it is entitled to a free coffee. If I donate a few dollars to that cause, I get a Beam that I can display and get a free coffee in the Starbucks. So instead of paying $3 for the coffee, I've donated to a cause and get the coffee for free.

Once inside of Starbucks, wearing the Beam I just donated for and earned my free coffee, I may notice others wearing the same Beam and strike up a conversation with them about that cause, creating new community.

In the BEAM app I could also see how many other people have done this, how much total has been raised for this cause, I can send this Beam to friends who could then also donate to it and get a free coffee at Starbucks themselves.

When I donate for this Beam and wear it, it is also posted in the newsfeed on the BEAM App, so others users can discover it, support the cause, and take advantage of the offer.

Further, when in the Starbucks, I may see or automatically receive additional Beams and offers and content from the Barista that is ringing me up, and if I act on them, or donate, or Beam one of them myself, it could trigger another action automatically.

Application 3: Proximity Triggered Behaviors: BEAM-ERS Near Me

In another application, the Beam app (running, e.g., on a connected mobile device or on the wearable display itself) is aware of who else is Beaming near me and can display that to me, whether with some form of an actual map, or simply a list of people that are within a certain radius.

I could choose to sort that list by proximity (closeness), or by degree of similarity to me (highest overlap of interests), or other. I can set preferences of whether I want to be discoverable by others or be private. I can set preferences for the degree to which my interests are discoverable by others—ranging from a) just the content I've created on BEAM, to b) all of my public social media history.

This enables users to create real world communities based on what they are BEAMING, and the Beams identify you as such.

In various examples, I can see who in my vicinity is beaming which things and connect to them. I can click on a user and go straight to their profile to see their Beams, follow them, and/or subscribe to them. I can do a search in the app for Beams or for People, and in addition to search results for Beams and People on the platform, I can also see results for those users near me.

Application 4: Events & Conferences—Booth Teams

Proximity based features for a conference or event setting can enable various capabilities, such as:

When a user walks near a booth or area the user automatically receives relevant content, which can be, e.g., sent to the mobile app and then displayed on the BEAM.

Call and response type automated BEAMING—between people working the booth and attendees walking up.

AI based BEAMING that takes as input the interests and/or content of those people (attendees) approaching or in your booth, and that triggers related content to be displayed on the BEAMS of the team of people working the booth. For instance, I have an Enterprise SaaS company with a product line that has five different products, each with specific name, tagline, benefits, attributes, stats, testimonials, pictures. Each of the five Products appeals to a specific demographic, solves a specific need, addresses people with specific interests. The AI in the BEAM app detects which Product slideshow to play based on the interests, needs, and demographic of the attendees in the booth.

The Booth Team BEAMS display custom content to engage the people in and near the booth, in a customized manner.

Similar to "Abandoned cart" technology on the web that recognizes when shoppers return to a site where they have started but not completed a purchase yet, there can also be AI and triggers that are aware of attendees duration at the booth in proximity, return visits, intervals, and more. It could trigger messaging that is custom (e.g. Welcome Back), it could trigger offers that are programmed or based on number of visits, or time of visit, and other inputs.

I can set my beam to meet only CFOs and then the event hosting company can take data and set it up within our partnership content push program and have CFOs with a certain type of BEAM appear when CFO approaching, or marketing people. Corporate sponsors can load and have BEAMs rotate real time to everyone's beams at a conference.

Also, BEAMs can be access badges depending on what you paid for when you get close it changes to allow for VIP access.

In a related application for casinos, BEAMs can tell dealers about your poker playing and dealers can use BEAMs to share info about the casino and bets and opportunities. All these cases are live content push from partners and also back end into data base to find and use code and algorithms.

Application 5: Events & Conferences—Attendee Personal Broadcast/Dynamic AI-Customized Resume People attending a conference may want to have the content on their BEAM device change and be customized based on who they are near. Their BEAM can be a dynamic resume, adjusting the content and customizing a slideshow based on who they are near. It could pick the most relevant Beams I've created that may be for different companies I've worked at, different stats of my accomplishments, different testimonials emphasizing different attributes or skills or characteristics, logos of different partners or clients I've worked with or served.

If I am near an employer who is hiring, my BEAM can display content that is most relevant to that company, or industry, or role.

Further, just like in the Peer to Peer use case, it can also customize content based on common interests I may have with people from that company, or from hiring manager or recruiter there.

Application 6: AR & VR

In another application, a user moves the connected mobile device near the BEAM, which triggers content to be displayed (e.g., photos of my family), interactions and/or clues to a current game, information about me, such as interests, avatars, badges, or donation opportunities for the causes I care about and have donated to.

Application 7: Gaming

A BEAM SDK and open platform for game developers can enable a massive variety of utility and use case and interactions with BEAM displays and BEAM AI to be used in mobile gaming in the real world.

Examples include:

Pokemon Go on your BEAM

Stratego (board game) interactions

Puzzle pieces, where in a group setting, people need to arrange so that each of their BEAMS represent a puzzle piece fitting together. The puzzle could be an image where each person's BEAM is like one jigsaw puzzle piece, or it could be a more abstract concept rather than a jigsaw puzzle, but rather each BEAM could be a specific part in an engine, a specific molecule in an atom, a component of a Ven diagram component. Each BEAM could be a Letter in a word, each beam could be a word and people assemble themselves to form a sentence, each beam could be a sentence or a meme, and people assemble to form a whole story or larger meaning. BEAMS could be countries on the world stage, resources used to create or build, ingredients used for cooking a dish. Each BEAM could represent a specific sound, or instrument, or frequency of vibration, and when combined with other BEAMS they make up a song, a band, or a harmonic convergence.

Scavenger hunt or treasure hunt, where each person's BEAM contains a plethora of content, and as you come into proximity with others, you are progressing thru the hunt.

A game could have a set of images and the user assigns a value to each one, and then when in proximity to another user, their BEAMS engage in a version of the card game "War" using their images and values of the game.

Massively Multiplayer Online Role Playing Games could take life on BEAMS with avatars, AI characters, environments, interactions, badges, and rules-based engagements, symbiotic engagements, combative engagements, and more.

Application 8: Dating

Dating platforms could be integrated on BEAM so that their database of people, attributes, and algorithms all determine content that you BEAM, tied to proximity to others you are matched to.

For example, if I am at a party or in a bar and my app detects that I am near a match who is also wearing a BEAM, both of our BEAMS could display the same content—a specific color screen or flash pattern, which indicates we are a match and should connect. There could be visual indications of how strong the match is, how much we have in common. The same system could also be used for conferences.

Application 9: Haptics

In another application, the BEAM device vibrates or otherwise provides haptic feedback to convey various events with different vibrations, such as:

When new content that I am interested is BEAMED

When other users like, comment, or BEAM a BEAM I have created and BEAMED.

When users follow me, subscribe to me, or BEAM STREAM me

Application 10: Video

BEAM devices can display video, and be equipped with chip and codec to process and display high quality and smooth playing video, while making it fast and easy for the app to send video to the BEAM device.

Application 11: Microphone

BEAMs could be equipped with microphones, that can be in "always listening" mode and accept voice commands, as an extension to various AI's such as Siri, Amazon Echo, Google Alexa, Microsoft Watson, and more.

Visual content can be displayed as a result of voice input. A verbal command can invoke listening mode, and the user could then give instructions to search for or create content and display it. For example, a user could say "Hi Beam" (the initial command), "make me a slideshow about the Stanford football team" or "make me a Beam about Rosa Parks" or "make me a beam of a beautiful waterfall and add the word Gratitude"

The microphone could have other interaction with your phone, such as answering calls.

Application 12: Camera

The BEAM could have a built in camera (facing out) so it can capture what you see. Taking a picture could be invoked with button press, voice command, a setting in the app to take a picture at a constant interval (e.g. every 10 minutes). It could record video.

It could record video and automatically transmit it to the cloud if you feel you are in danger and what to record whatever happens, or whoever approaches you.

By recording video and taking pictures in a hands free mode it enables a more authentic and less disruptive capture of a special moment, such as for parents interacting with young children.

Application 13: Holograms

BEAMS could be able to project holograms and deliver 3D messages, 3D characters, tell stories, show scenes, and basically blow people's minds.

Application 14: Stadium BEAMING

When at a concert, or sporting event, or other event in a densely populated setting, my BEAM could be part of the light show at a concert, part of the wave at a sporting event, part of the message at a campaign rally. When worn on a cap, and viewed from above, such as a stadium, each BEAM could be a single pixel in a large image or message or display, that can be viewed from fans above, or broadcast cameras above.

Application 15: Multi Purpose BEAM at an Amusement Park or Theme Park

Theme parks from Movie studios, with branded digital content and merchandise, and a wide variety of physical areas, could all interact with my BEAM:

Tickets—My BEAM could serve as my ticket and be scanned or trigger my admittance. This could be for the park at large, or specific areas, rides, exhibits, booths, access points, etc.

Payments—My BEAM could facilitate how I make purchases

Receive Content—I could receive Beams of content, badges, characters, items, tools, clues, etc. as I go through the park and rides.

The BEAM could use and interact with RFID, Beacons, pushed content, and various AI and algorithm based behaviors to engage me as customer, to entertain me, and to allow me to consume and receive content.

Enterprise Applications of the Wearable Displays

Embodiments of the display system described herein can be coupled with useful software and/or hardware to provide functionality in an enterprise context. Examples of such functionalities are described below.

Application 1: Wearable Display Enterprise Namespaces

Companies, businesses, institutions, and other enterprises can create or request and receive a custom and private wearable display namespaces or platforms. In such embodiments, content transmitted to and displayed by wearable displays associated with an enterprise is accessible only to wearable displays associated with the enterprise. Likewise, content that is available to wearable displays of the general public might not be available to the wearable displays associated with the enterprise. In other words, content available to a set of wearable displays associated with an enterprise may not be available to wearable displays outside the enterprise and vice versa.

In some embodiments, an administrator associated with an enterprise can create accounts associated with wearable displays of the enterprise, can grant wearable display permissions to particular users within the enterprise, can invite users to join the enterprise namespace, can change or establish characteristics of the namespace (e.g., name the namespace, add a logo associated with the namespace, etc.), and can define or edit content that can be shared within the namespace and displayed by wearable displays associated with the enterprise.

When a wearable display is added to the namespace of an enterprise, a user account of the wearable display can be associated with the namespace. For instance, a unique identifier associated with the user account (such as an email address, code, alphanumeric identifier, or the like) can be associated with the namespace. Further, the enterprise can allow users to enable 2-step account verification to ensure that a rightful owner of an email address is the only user that can accept or create a user account within the enterprise namespace.

Beneficially, by enabling users within an enterprise to use a wearable display within the context of a private namespace, any content displayed by a wearable display within the namespace can be displayed only by other wearable display devices within the namespace, or can be visible within social media feeds of users associated with the namespace (or within feeds associated with the namespace itself).

Application 2: Real-time Publishing Content Within Enterprise Namespaces

An enterprise can publish content in real-time to all wearable displays associated with the enterprise, or associated with the namespace of the enterprise. For instance, a manager, marketing representative, public relations representative, or the like can select one or more content items for display by all wearable displays associated with the enterprise, beneficially enabling a uniform communication medium within the enterprise. For example, a manager can broadest a content item to a wearable display worn by each member of a sales team, allowing the manager to communicate a current sale or opportunity to anyone speaking with a member of the sales team. The content items can be broadcast, for instance via WiFi or Bluetooth, without requiring a different phone to be paired to each wearable display.

Application 3: Advance Publishing Content Within Enterprise Namespaces

An enterprise can schedule in advance the publishing of content to all wearable displays associated with the enterprise, or associated with the namespace of the enterprise. For instance, a set of content items can be selected for display, and a time can be selected for each content item to be displayed. The content items and associated display times can be provided to each wearable display in advance (e.g., ahead of the display of any one of the content items), or each content item in the selected set of content items can be broadcast to the wearable displays within the enterprise as each associated display time approaches (e.g., a few seconds ahead of each display time). Content items can be scheduled for display in advance as part of a campaign, which can be customized such that different sets of content items can be displayed based on a location of each wearable device, by an identity or position of users of each wearable device, by time or date, or by any suitable criteria.

Application 4: Automated Content Publishing Within Enterprise Namespaces

Software associated with the wearable displays can be synchronized with software associated with an enterprise, for instance an API associated with an enterprise, data of the enterprise, social media platforms of the enterprise, accounts associated with the enterprise, and the like. Such embodiments beneficially enable users within the enterprise to establish a set of rules that, when satisfied, result in content items being sent to wearable displays for display without the explicit input from a user. For instance, a user can establish a rule with two requirements 1) a user of a wearable display is outside of a location associated with the enterprise, and 2) during work hours. Continuing with this example, the purpose of such a set of rules may be to have a set of content items be displayed whenever an employee is on a sales or service house call. In such embodiments, a logo for the enterprise, an image identifying a current sales promotion, or a customer service phone number may be displayed when the user associated with the wearable display is outside a location associated with the enterprise during work hours (and not otherwise). By enabling the automated publishing of content items on wearable displays in such a manner, a significant reduction in required effort by individuals within the enterprise responsible for the display of content on wearable displays associated with enterprise can be realized.

Application 5: Wearable Display Portal and Usage Tracking

An enterprise can access a web portal or dashboard associated with wearable displays of the enterprise. The portal or dashboard can display information identifying content items that are displayed by the wearable displays within the enterprise, content item campaigns associated with the wearable displays, interactions with or views of the wearable displays, or any other suitable metric associated with the wearable displays. This information can be filtered by wearable display, by associated user, by user title, or enterprise group, by time, by campaign, or by any other suitable metric.

Application 6: Sponsored Content Within Enterprise Namespaces

Wearable displays within an enterprise can display content that is sponsored or selected by an entity other than the enterprise. The sponsored content can be pre-loaded onto the wearable displays (e.g., during manufacturing or configuring), can be broadcasted to the wearable displays by a device associated with the sponsoring entity (for instance, in real-time or when the wearable displays synchronize with an enterprise system or feed), and/or can be included within content item sets provided by the enterprise (e.g., as part of a slideshow of content provided by the enterprise). In some embodiments, each wearable display associated with an enterprise is associated with a set of properties (for instance, a title of a wearer of the wearable display or an enterprise group within the enterprise), and sponsored content can be targeted based on one or more of the set of properties (e.g., sponsored content can be displayed by wearable devices of everyone within the Human Resources group of the enterprise). The wearable displays associated with the enterprise can be configured such that sponsored content cannot be deleted or modified.

For example, the New York Mets can provide a wearable display to each season ticket holder. These wearable displays can be pre-loaded with Mets content, advertiser content, player stats, logos, and the like. Then, during Mets' games, a sponsoring entity can select content for display on wearable displays associated with an identifier corresponding to the Mets and based on a location of the wearable displays (e.g., all wearable displays located within the Mets' stadium). Such content (such as promotional content) can be broadcast by broadcasting devices within the stadium, or to mobile devices that are coupled to the wearable displays such that the mobile devices configured the wearable displays to display the sponsored content.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

It should be noted that although various embodiments of buttons are described herein, the capabilities and functionalities of buttons can apply equally to other types of wearable display devices, including digital badges, digital jewelry, digital apparel, and the like.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

The invention claimed is:

1. A wearable display device system for centralized content distribution within an enterprise, comprising:
a plurality of wearable display devices, each comprising a display enclosed within a housing, a wireless receiver enclosed with the housing and configured to receive viewable media objects, and a controller configured to display received viewable media objects on the display, wherein each of the plurality of wearable display devices is associated with one or more enterprise groups; and
a centralized media server communicatively coupled to the plurality of wearable display devices via an enterprise network, configured to:
receive a request to provide a selected set of viewable media objects to a set of wearable display devices associated with a selected enterprise group;
access the selected set of viewable media objects stored by the centralized media server; and
wirelessly transmit the accessed set of viewable media objects, an identifier representative of the selected enterprise group, and a set of display instructions via the enterprise network, wherein each wearable display device of the plurality of wearable display device associated with the selected enterprise group is configured to, in response to receiving the identifier representative of the selected enterprise group, display the set of viewable media objects based on the set of display instructions.

2. The system of claim 1, wherein wearable display devices that are not associated with the selected enterprise group is unable to display the set of viewable media objects.

3. The system of claim 1, wherein the enterprise groups and the wearable display devices associated with each enterprise group are defined by an enterprise administrator via the centralized media server.

4. The system of claim 3, wherein the set of viewable media objects is selected by the enterprise administrator.

5. The system of claim 3, wherein the centralized media server is further configured to enable the enterprise administrator to perform additional operations including one or more of: adding wearable display devices to enterprise groups, removing wearable display devices from enterprise groups, creating or assigning wearable display device user accounts in association with the enterprise, granting wearable display device permissions to one or more users within the enterprise, defining content that can be displayed by wearable display device associated with each enterprise group or by wearable display devices within the enterprise, and editing content for display by the wearable display devices.

6. The system of claim 1, wherein each enterprise group is associated with a group namespace, and wherein the identifier representative of the enterprise group comprises the group namespace associated with the enterprise group.

7. The system of claim 1, wherein the enterprise comprises a company, wherein the selected enterprise group comprises a set of employees of the company, and wherein the set of viewable media objects is selected by a manager of the company.

8. The system of claim 7, wherein the set of employees comprises a sales team, and wherein the selected set of viewable media objects comprise images detailing product or sale information.

9. The system of claim 1, wherein the selected set of viewable media objects comprises one or more of: images, videos, a single viewable media object, and a plurality of viewable media objects.

10. The system of claim 1, wherein the selected set of viewable objects is stored by the centralized media server, by a storage device within the enterprise, or by a storage device external to the enterprise.

11. The system of claim 1, wherein the set of display instructions specify one or more of: an order in which the selected set of viewable media objects are to be displayed by each wearable display device, a start time for displaying each of the selected set of viewable media objects, a future start time at which the set of viewable media objects start to be displayed, and a duration that each of the selected set of viewable media objects is to be displayed.

12. The system of claim 1, wherein the selected set of viewable media objects and the selected enterprise group are selected more than a threshold amount of time before the request to provide the selected set of viewable media objects is received.

13. The system of claim 1, wherein the selected set of viewable media objects is selected based on one or more of: a location of one or more wearable display devices associated with the selected enterprise group, an identity of one or more users wearing the wearable display devices associated with the selected enterprise group, and a current time or date.

14. The system of claim 1, wherein the selected set of viewable media objects is selected automatically by the centralized media server without explicit input from a user in response to one or more wearable display devices associated with the selected enterprise group satisfying a predefined set of requirements.

15. The system of claim 1, wherein each wearable display device is associated with a set of properties, and wherein the selected set of viewable media objects can be selected for display by a subset of wearable digital buttons by a sponsoring entity based on one or more of the set of properties of the subset of wearable display devices.

16. A centralized media server for broadcasting content to wearable digital buttons within an enterprise, comprising:
a database configured to store viewable media objects;
an interface configured to receive a request to broadcast a set of viewable media objects to a set of wearable digital buttons;
a wireless transceiver; and
a controller configured to, in response to receiving the request, access the set of viewable media objects from the database and configured the wireless transceiver to broadcast the accessed set of viewable media and a set of display instructions to the set of wearable digital buttons, each of the set of wearable digital buttons comprising a display, a wireless receiver to wirelessly receive the broadcasted set of viewable media objects, and a controller to configure the display to display the set of viewable media objects according to the set of display instructions.

17. The centralized media server of claim 16, wherein the interface is further configured to display, via a client device, a graphic user interface to a user within the enterprise, the graphic user interface configured to display the stored viewable media objects and to enable the user to select one or more of the stored viewable media objects for inclusion in the set of viewable media objects.

18. The centralized media server of claim 17, wherein the graphic user interface is further configured to enable the user to perform one or more of: viewing a representation of each wearable digital button within the enterprise, filtering the representations of wearable digital buttons within the enterprise based on a property or characteristic of the wearable digital buttons, selecting the set of wearable digital buttons, selecting the set of display instructions, editing viewable media objects, deleting viewable media objects, and publishing viewable media objects.

19. A method for broadcasting content to wearable digital buttons within an enterprise, comprising:
- receiving, by a centralized media server, a request to provide a set of viewable media objects to a set of wearable digital buttons within the enterprise;
- accessing, by the centralized media server, the set of viewable media objects; and
- providing, by the centralized media server, the set of viewable media objects, an identity of each of the set of wearable digital buttons, and a set of display instructions such that each of the set of wearable digital buttons is configured to display via a display of the wearable digital button the set of viewable media objects based on the set of display instructions, and such that wearable digital buttons within the enterprise that are not included within the set of wearable digital buttons are unable to display the set of viewable media objects.

20. The method of claim 19, wherein a wearable digital button of the set of wearable digital buttons is communicatively coupled to the centralized media server via a wireless connection or a wired connection, and wherein the wearable digital button receives the set of viewable media objects and recharges via the wireless connection or the wired connection.

* * * * *